US010180606B2

(12) United States Patent
Mullins et al.

(10) Patent No.: US 10,180,606 B2
(45) Date of Patent: Jan. 15, 2019

(54) CONNECTORS FOR SMART WINDOWS

(71) Applicant: View, Inc., Milpitas, CA (US)

(72) Inventors: Dennis Mullins, Milpitas, CA (US);
Trevor Frank, San Jose, CA (US);
Jason Satern, Morgan Hill, CA (US);
Travis D. Wilbur, Capitola, CA (US);
Mark Sawyer, Stockton, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 15/228,992

(22) Filed: Aug. 4, 2016

(65) Prior Publication Data

US 2016/0344148 A1 Nov. 24, 2016
US 2018/0301858 A9 Oct. 18, 2018

Related U.S. Application Data

(63) Continuation-in-part of application No. PCT/US2015/014479, filed on Feb. 4, 2015, and a
(Continued)

(51) Int. Cl.
*G02F 1/153* (2006.01)
*G02F 1/1345* (2006.01)
(Continued)

(52) U.S. Cl.
CPC ............ *G02F 1/13452* (2013.01); *E06B 3/42* (2013.01); *E06B 3/66* (2013.01); *E06B 9/24* (2013.01);
(Continued)

(58) Field of Classification Search
CPC ...... H01R 13/73; H01R 25/14; H01R 25/142; G02F 1/153; G02F 1/1533; G02F 1/155;
(Continued)

(56) References Cited

U.S. PATENT DOCUMENTS 253,392 A 2/1882 Jones et al.
2,121,753 A 6/1938 Cornell, Jr.
(Continued)

FOREIGN PATENT DOCUMENTS

CN 1380991 A 11/2002
CN 1822951 A 8/2006
(Continued)

OTHER PUBLICATIONS

Preliminary Amendment filed Apr. 6, 2015 in U.S. Appl. No. 14/512,297.
(Continued)

*Primary Examiner* — Joseph P Martinez
(74) *Attorney, Agent, or Firm* — Weaver Austin Villeneuve & Sampson LLP; Brian D. Griedel

(57) ABSTRACT

This disclosure provides connectors for smart windows. A smart window may incorporate an optically switchable pane. In one aspect, a window unit includes an insulated glass unit including an optically switchable pane. A wire assembly may be attached to the edge of the insulated glass unit and may include wires in electrical communication with electrodes of the optically switchable pane. A floating connector may be attached to a distal end of the wire assembly. The floating connector may include a flange and a nose, with two holes in the flange for affixing the floating connector to a first frame. The nose may include a terminal face that present two exposed contacts of opposite polarity. Pre-wired spacers improve fabrication efficiency and seal integrity of insulated glass units. Electrical connection systems include those embedded in the secondary seal of the insulated glass unit.

12 Claims, 32 Drawing Sheets

Related U.S. Application Data continuation-in-part of application No. 14/363,769, filed as application No. PCT/US2012/068950 on Dec. 11, 2012, now Pat. No. 9,671,665, application No. 15/228,992, which is a continuation-in-part of application No. 14/823,969, filed on Aug. 11, 2015, which is a continuation of application No. 14/152,873, filed on Jan. 10, 2014, now Pat. No. 9,158,173, which is a continuation of application No. 13/213,057, filed on Dec. 6, 2011, now Pat. No. 8,711,465.

(60) Provisional application No. 61/421,154, filed on Dec. 8, 2010, provisional application No. 61/435,914, filed on Jan. 25, 2011.

(51) Int. Cl.
*E06B 9/24* (2006.01)
*E06B 3/66* (2006.01)
*E06B 3/42* (2006.01)
*H01R 25/14* (2006.01)

(52) U.S. Cl.
CPC .... *G02F 1/1533* (2013.01); *E06B 2009/2464* (2013.01); *H01R 25/142* (2013.01)

(58) Field of Classification Search
CPC . G02F 1/161; E06B 7/00; E06B 3/667; E06B 7/28; E06B 3/66304; E06B 9/24; E06B 2009/2464; E06B 3/66; E06B 3/42
See application file for complete search history.

(56) References Cited

U.S. PATENT DOCUMENTS

| | | | |
|---|---|---|---|
| 4,306,140 A | 12/1981 | Stromquist | |
| 4,937,423 A | 6/1990 | Yoshihara et al. | |
| 4,941,302 A | 7/1990 | Barry | |
| 5,017,755 A | 5/1991 | Yahagi et al. | |
| 5,124,833 A | 6/1992 | Barton et al. | |
| 5,170,108 A | 12/1992 | Peterson et al. | |
| 5,313,761 A | 5/1994 | Leopold | |
| 5,379,146 A | 1/1995 | Defendini | |
| 5,384,653 A | 1/1995 | Benson et al. | |
| 5,657,149 A | 8/1997 | Buffat et al. | |
| 5,657,150 A | 8/1997 | Kallman et al. | |
| 5,724,175 A | 3/1998 | Hichwa et al. | |
| 5,822,107 A | 10/1998 | Lefrou et al. | |
| 5,877,936 A | 3/1999 | Nishitani et al. | |
| 5,948,195 A | 9/1999 | Thomas | |
| 6,001,487 A | 12/1999 | Ladang et al. | |
| 6,039,390 A | 3/2000 | Agrawal et al. | |
| 6,045,896 A | 4/2000 | Boire et al. | |
| 6,055,088 A | 4/2000 | Fix et al. | |
| 6,068,720 A | 5/2000 | McHugh | |
| 6,176,715 B1 | 1/2001 | Buescher | |
| 6,204,953 B1 | 3/2001 | Zieba et al. | |
| 6,261,641 B1 | 7/2001 | Zieba et al. | |
| 6,337,758 B1 | 1/2002 | Beteille et al. | |
| 6,369,935 B1 | 4/2002 | Cardinal et al. | |
| 6,407,847 B1 | 6/2002 | Poll et al. | |
| 6,420,071 B1 | 7/2002 | Lee et al. | |
| 6,529,308 B2 | 3/2003 | Beteille et al. | |
| 6,559,411 B2 | 5/2003 | Borgeson et al. | |
| 6,567,708 B1 | 5/2003 | Bechtel et al. | |
| 6,795,226 B2 | 9/2004 | Agrawal et al. | |
| 6,897,936 B1 | 5/2005 | Li et al. | |
| 6,919,530 B2 | 7/2005 | Borgeson et al. | |
| 6,950,221 B1 | 9/2005 | Terada et al. | |
| 7,002,720 B2 | 2/2006 | Beteille et al. | |
| 7,033,655 B2 | 4/2006 | Beteille et al. | |
| 7,230,748 B2 | 6/2007 | Giron et al. | |
| 7,259,730 B2 | 8/2007 | O'Keeffe | |
| 7,362,491 B2 | 4/2008 | Busick et al. | |
| 7,531,101 B2 | 5/2009 | Beteille | |
| 7,586,664 B2 | 9/2009 | O'Shaughnessy et al. | |
| 7,710,671 B1 | 5/2010 | Kwak et al. | |
| 7,719,751 B2 | 5/2010 | Egerton et al. | |
| 7,869,114 B2 | 1/2011 | Valentin et al. | |
| 7,894,119 B2 | 2/2011 | Valentin et al. | |
| 7,929,194 B2 | 4/2011 | Legois et al. | |
| 7,941,982 B2 | 5/2011 | Merica | |
| 8,035,882 B2 | 10/2011 | Fanton et al. | |
| 8,213,074 B1 | 7/2012 | Shrivastava et al. | |
| 8,254,013 B2 | 8/2012 | Mehtani et al. | |
| 8,643,933 B2 | 2/2014 | Brown et al. | |
| 8,669,503 B2 | 3/2014 | Johnson et al. | |
| 8,711,465 B2 | 4/2014 | Bhatnagar et al. | |
| 8,800,221 B1 | 8/2014 | Header | |
| 8,810,889 B2 | 8/2014 | Brown et al. | |
| 9,019,588 B2 | 4/2015 | Brown et al. | |
| 9,436,054 B2 | 9/2016 | Brown et al. | |
| 9,482,922 B2 | 11/2016 | Brown et al. | |
| 9,671,665 B2 | 6/2017 | Brown et al. | |
| 9,690,162 B2 | 6/2017 | Brown et al. | |
| 9,728,920 B2 | 8/2017 | Brown et al. | |
| 9,769,459 B2 | 9/2017 | Thompson et al. | |
| 2002/0075552 A1* | 6/2002 | Poll | E06B 3/66 359/275 |
| 2003/0111447 A1 | 6/2003 | Corkum et al. | |
| 2003/0191546 A1 | 10/2003 | Bechtel et al. | |
| 2003/0227663 A1 | 12/2003 | Agrawal et al. | |
| 2004/0047050 A1 | 3/2004 | Bauer et al. | |
| 2004/0208600 A1 | 10/2004 | Guenter et al. | |
| 2004/0257633 A1 | 12/2004 | Agrawal et al. | |
| 2005/0002081 A1 | 1/2005 | Beteille et al. | |
| 2005/0166495 A1 | 8/2005 | Cho et al. | |
| 2006/0077511 A1 | 4/2006 | Poll et al. | |
| 2006/0187608 A1 | 8/2006 | Stark | |
| 2006/0283084 A1 | 12/2006 | Johnson | |
| 2007/0020442 A1 | 1/2007 | Giron et al. | |
| 2007/0067048 A1 | 3/2007 | Bechtel et al. | |
| 2007/0103761 A1 | 5/2007 | Giron et al. | |
| 2007/0133078 A1 | 6/2007 | Fanton et al. | |
| 2007/0236180 A1 | 10/2007 | Rodgers | |
| 2007/0248756 A1 | 10/2007 | Krisko et al. | |
| 2008/0239452 A1 | 10/2008 | Xu et al. | |
| 2009/0016715 A1 | 1/2009 | Furey | |
| 2009/0058295 A1 | 3/2009 | Auday et al. | |
| 2009/0067031 A1 | 3/2009 | Piroux et al. | |
| 2009/0097098 A1 | 4/2009 | Piroux | |
| 2009/0110918 A1 | 4/2009 | Jacquiod et al. | |
| 2009/0114928 A1 | 5/2009 | Messere et al. | |
| 2009/0130409 A1 | 5/2009 | Reutler et al. | |
| 2009/0148642 A1 | 6/2009 | Mauser et al. | |
| 2009/0153208 A1 | 6/2009 | Lynch | |
| 2009/0157358 A1 | 6/2009 | Kim | |
| 2009/0174300 A1 | 7/2009 | Jousse et al. | |
| 2009/0181203 A1 | 7/2009 | Valentin et al. | |
| 2009/0251758 A1 | 10/2009 | Valentin et al. | |
| 2009/0262411 A1 | 10/2009 | Karmhag et al. | |
| 2009/0297806 A1 | 12/2009 | Dawson-Elli et al. | |
| 2009/0323160 A1 | 12/2009 | Egerton et al. | |
| 2009/0323162 A1 | 12/2009 | Fanton et al. | |
| 2010/0208326 A1 | 8/2010 | Kwak et al. | |
| 2010/0243427 A1 | 9/2010 | Kozlowski et al. | |
| 2010/0245973 A1 | 9/2010 | Wang et al. | |
| 2011/0043885 A1 | 2/2011 | Lamine et al. | |
| 2011/0048614 A1 | 3/2011 | Veerasamy et al. | |
| 2011/0051221 A1 | 3/2011 | Veerasamy | |
| 2011/0059275 A1 | 3/2011 | Stark | |
| 2011/0094585 A1 | 4/2011 | Debije et al. | |
| 2011/0148218 A1 | 6/2011 | Rozbicki et al. | |
| 2011/0211247 A1 | 9/2011 | Kozlowski et al. | |
| 2011/0216389 A1 | 9/2011 | Piroux et al. | |
| 2011/0249314 A1 | 10/2011 | Wang et al. | |
| 2011/0260961 A1 | 10/2011 | Burdis | |
| 2011/0266137 A1 | 11/2011 | Wang et al. | |
| 2011/0266138 A1 | 11/2011 | Wang et al. | |
| 2011/0267672 A1 | 11/2011 | Sbar et al. | |
| 2011/0267674 A1 | 11/2011 | Wang et al. | |
| 2011/0267675 A1 | 11/2011 | Wang et al. | |
| 2011/0279882 A1 | 11/2011 | Chan et al. | |
| 2011/0292488 A1 | 12/2011 | McCarthy et al. | |

(56) References Cited

U.S. PATENT DOCUMENTS

| | | |
|---|---|---|
| 2011/0299149 A1 | 12/2011 | Park et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0147449 A1 | 6/2012 | Bhatnagar et al. |
| 2012/0194895 A1 | 8/2012 | Podbelski et al. |
| 2012/0200908 A1 | 8/2012 | Bergh et al. |
| 2012/0239209 A1 | 9/2012 | Brown et al. |
| 2012/0268803 A1 | 10/2012 | Greer et al. |
| 2012/0300280 A1 | 11/2012 | Murphy et al. |
| 2012/0327499 A1 | 12/2012 | Parker et al. |
| 2013/0157493 A1 | 6/2013 | Brown |
| 2013/0241299 A1 | 9/2013 | Snyker et al. |
| 2013/0278988 A1 | 10/2013 | Jack et al. |
| 2013/0319756 A1 | 12/2013 | Snyker et al. |
| 2014/0000191 A1 | 1/2014 | Snyker et al. |
| 2014/0041933 A1 | 2/2014 | Snyker et al. |
| 2014/0160550 A1 | 6/2014 | Brown et al. |
| 2014/0170863 A1 | 6/2014 | Brown |
| 2014/0192393 A1 | 7/2014 | Bhatnagar et al. |
| 2014/0247475 A1 | 9/2014 | Parker et al. |
| 2014/0349497 A1 | 11/2014 | Brown et al. |
| 2014/0355097 A1 | 12/2014 | Brown et al. |
| 2015/0092260 A1 | 4/2015 | Parker et al. |
| 2015/0103389 A1 | 4/2015 | Klawuhn et al. |
| 2015/0118869 A1 | 4/2015 | Brown et al. |
| 2015/0219975 A1 | 8/2015 | Phillips et al. |
| 2016/0357083 A1 | 12/2016 | Brown et al. |
| 2017/0045795 A1 | 2/2017 | Brown et al. |
| 2017/0117674 A1 | 4/2017 | Brown et al. |
| 2017/0219908 A1 | 8/2017 | Brown et al. |
| 2017/0250163 A1 | 8/2017 | Wilbur et al. |
| 2018/0314100 A1 | 11/2018 | Mullins et al. |

FOREIGN PATENT DOCUMENTS

| | | |
|---|---|---|
| CN | 202108407 U | 1/2012 |
| DE | 102006042538 | 3/2008 |
| EP | 2136409 | 12/2009 |
| EP | 2348357 | 7/2011 |
| GB | 1437198 | 5/1976 |
| JP | 2000-257352 A | 9/2000 |
| JP | 2001-193364 | 7/2001 |
| JP | 2004-504630 A | 12/2004 |
| JP | 2007-516147 A | 6/2007 |
| JP | 2009-544997 A | 12/2009 |
| TW | 526383 B | 4/2003 |
| WO | WO2002/008826 A1 | 1/2002 |
| WO | WO2005/076061 | 8/2005 |
| WO | WO2006/133298 A2 | 12/2006 |
| WO | WO2006/133298 A3 | 12/2007 |
| WO | WO2008/043951 | 4/2008 |
| WO | WO 2009/097001 A1 | 8/2009 |
| WO | WO2009/145876 | 12/2009 |
| WO | WO2009/148861 | 12/2009 |
| WO | WO 2010/077409 A2 | 7/2010 |
| WO | WO2011/010067 | 1/2011 |
| WO | WO2011/028253 | 3/2011 |
| WO | WO2011/028254 | 3/2011 |
| WO | WO2011/050291 | 4/2011 |
| WO | WO2011/109688 | 9/2011 |
| WO | WO2012/145155 | 10/2012 |
| WO | WO2013/090264 | 6/2013 |
| WO | WO2013/109881 | 7/2013 |
| WO | WO2013/177575 | 11/2013 |
| WO | WO2014/032023 | 2/2014 |
| WO | WO2014/169253 | 10/2014 |
| WO | WO2015/120063 | 8/2015 |

OTHER PUBLICATIONS

U.S. Appl. No. 15/243,816, filed Aug. 22, 2016, entitled Connectors for Smart Windows.
Preliminary Amendment filed Aug. 23, 2016 for U.S. Appl. No. 15/243,816.
U.S. Appl. No. 15/217,873, filed Jul. 22, 2016 entitled Connectors for Smart Windows.
Preliminary Amendment filed Aug. 18, 2016 for U.S. Appl. No. 15/217,873.
Preliminary Amendment filed Feb. 23, 2015 in U.S. Appl. No. 14/423,085.
U.S. Office Action dated Nov. 3, 2014 in U.S. Appl. No. 13/456,056.
U.S. Office Action dated Oct. 6, 2014 in U.S. Appl. No. 13/968,258.
U.S. Final Office Action dated Jun. 5, 2015 in U.S. Appl. No. 13/968,258.
U.S. Office Action dated Jan. 21, 2016 in U.S. Appl. No. 13/968,258.
U.S. Notice of Allowance dated Jun. 20, 2016 in U.S. Appl. No. 13/968,258.
U.S. Office Action dated Jul. 11, 2013 in U.S. Appl. No. 13/312,057.
U.S. Notice of Allowance dated Dec. 13, 2013 in U.S. Appl. No. 13/312,057.
U.S. Office Action dated Jan. 30, 2015 in U.S. Appl. No. 14/152,873.
U.S. Notice of Allowance dated May 19, 2015 in U.S. Appl. No. 14/152,873.
U.S. Office Action dated Mar. 31, 2015 in U.S. Appl. No. 14/196,895.
U.S. Notice of Allowance dated Sep. 18, 2013 in U.S. Appl. No. 13/326,168.
U.S. Notice of Allowance dated Jun. 13, 2014 in U.S. Appl. No. 14/103,660, and allowed claims.
U.S. Notice of Allowance dated Oct. 9, 2014 in U.S. Appl. No. 14/325,290.
U.S. Notice of Allowance dated Feb. 25, 2015 in U.S. Appl. No. 14/325,290.
Office Action dated Feb. 4, 2015 for U.S. Appl. No. 14/591,851.
Final Office Action dated Sep. 11, 2015 for U.S. Appl. No. 14/591,851.
Notice of Allowance dated May 9, 2016 for U.S. Appl. No. 14/591,851.
Notice of Allowance (corrected) dated Jun. 30, 2016 for U.S. Appl. No. 14/591,851.
Notice of Allowance (2nd corrected) dated Aug. 9, 2016 for U.S. Appl. No. 14/591,851.
U.S. Office Action dated Jun. 27, 2016 for U.S. Appl. No. 14/363,769.
U.S. Notice of Allowance dated Nov. 18, 2016 for U.S. Appl. No. 14/363,769.
U.S. Office Action dated Jul. 15, 2016 for U.S. Appl. No. 14/401,081.
International Search Report and Written Opinion dated Aug. 12, 2013 for PCT/US2013/037644.
International Preliminary Report on Patentability dated Jun. 11, 2014 for PCT/US2013/037644.
International Search Report and Written Opinion dated Jul. 23, 2012, from PCT/US2011/063534.
International Preliminary Report on Patentability dated Jun. 20, 2013, from PCT/US2011/063534.
International Search Report and Written Opinion dated Apr. 1, 2013 from PCT/US2012/068950.
International Preliminary Report on Patentability dated Jun. 26, 2014 from PCT/US2012/068950.
International Search Report and Written Opinion dated May 18, 2015 for PCT/US2015/014479.
International Preliminary Report on Patentability dated Aug. 9, 2016 for PCT/US2015/014479.
International Search Report and Written Opinion for PCT/2013/042765 dated Aug. 23, 2013.
International Preliminary Report on Patentability for PCT/2013/042765 dated Dec. 4, 2014.
International Search Report and Written Opinion dated Nov. 22, 2013 for PCT/US2013/056506.
International Preliminary Report on Patentability dated Mar. 5, 2015 for PCT/US2013/056506.
International Search Report and Written Opinion dated Aug. 19, 2014 for PCT/US2014/033870.
EP Office Action dated Nov. 4, 2013 for EP Application No. 11846667.1.
European Search Report dated Mar. 3, 2014 for EP Application No. 11846667.1.

(56) References Cited

OTHER PUBLICATIONS

European Search Report dated Apr. 2, 2015 for EP Application No. 12858168.3.
European Office Action dated Jul. 1, 2016 for EP Application No. 12858168.3.
Partial European Search Report dated Mar. 21, 2016 for EP Application No. 13830992.7.
Extended European Search Report dated Jul. 15, 2016 for EP Application No. 13830992.7.
CN Office Action dated Jun. 3, 2015 in CN Application No. 201280069715.1.
CN Office Action dated Mar. 11, 2016 in CN Application No. 201280069715.1.
TW Office Action dated Oct. 28, 2016 in TW Application No. 101147237.
Ernst, Randi, "Gas Filling of IG Units" by FDR Design, Inc. (undated), 37 pages.
Armstrong, Dave, "Smart, energetic glass could take over" in *Earth Times*, [http://www.earthtimes.org/energy/smart-energetic-glass-take-over/2866/] Apr. 12, 2015.
"'Smart glass' changes colour and produces electricity", ZeeNewsIndia.com [http://zeenews.india.com/news/sci-tech/smart-glass-changes-colour-and-produces-electricity_1577561.html] Apr. 12, 2015.
Boylestad, R., et al., "Electronic devices and circuit theory (7th Edition)," 1999, pp. 76-82.
McManis, C., "H-Bridges: theory and practice," Chuck's Robotics Notebook, 2004, 3 pp.
McWane, J., "Introduction to Electronics Technology (2nd Edition)," 1981, p. 12 & pp. 228-233.
Westinghouse User's Manual, "LD-325 Series," 2010, 67 pp.
U.S. Appl. No. 15/394,637, filed Dec. 29, 2016, Brown et al.
Preliminary Amendment filed Jan. 12, 2017 for U.S. Appl. No. 15/394,637.
U.S. Notice of Allowance dated Mar. 17, 2017 for U.S. Appl. No. 15/394,637.
Preliminary Amendment filed Jun. 22, 2017 for U.S. Appl. No. 15/493,003.
U.S. Notice of Allowance dated Feb. 15, 2017 for U.S. Appl. No. 15/217,873.
U.S. Notice of Allowability (Corrected) dated May 10, 2017 for U.S. Appl. No. 14/363,769.
U.S. Final Office Action dated Jan. 10, 2017 for U.S. Appl. No. 14/401,081.
U.S. Office Action dated May 4, 2017 for U.S. Appl. No. 14/401,081.
European Office Action dated Mar. 13, 2017 for EP Application No. 12858168.3.
U.S. Final Office Action dated Sep. 25, 2017 for U.S. Appl. No. 14/401,081.
Preliminary Amendment filed Sep. 26, 2017 for U.S. Appl. No. 15/597,041.
U.S. Notice of Allowance dated Oct. 5, 2017 for U.S. Appl. No. 15/493,003.
U.S. Notice of Allowance dated Dec. 5, 2017 for U.S. Appl. No. 15/243,816.
U.S. Office Action dated Dec. 15, 2017 in U.S. Appl. No. 14/423,085.
European Office Action dated Dec. 8, 2017 in EP Application No. 13830992.7.
U.S. Notice of Allowance dated Mar. 28, 2018 for U.S. Appl. No. 15/597,041.
U.S. Notice of Allowance dated Apr. 11, 2018 for U.S. Appl. No. 15/243,816.
U.S. Notice of Allowance dated Jan. 31, 2018 for U.S. Appl. No. 15/493,003.
U.S. Office Action dated Mar. 8, 2018 for U.S. Appl. No. 14/401,081.
CN Office Action dated Mar. 29, 2018 in CN Application No. 201610921855.7.
U.S. Notice of Allowance dated Jul. 19, 2018 for U.S. Appl. No. 15/597,041.
U.S. Notice of Allowance dated Jul. 23, 2018 for U.S. Appl. No. 15/493,003.
U.S. Final Office Action dated Jul. 5, 2018 for U.S. Appl. No. 14/401,081.
U.S. Final Office Action dated Aug. 8, 2018 for U.S. Appl. No. 14/423,085.
"Velux" Skylights brochure, known as of Jan. 31, 2014, 4 pp.
Preliminary Amendment filed Jun. 26, 2018 for U.S. Appl. No. 16/016,450.
U.S. Appl. No. 16/016,450, filed Jun. 22, 2018, Mullins et al.
TW Office Action dated Aug. 23, 2018 in TW Application No. 106129194.
U.S. Notice of Allowance dated Aug. 23, 2018 for U.S. Appl. No. 15/243,816.
U.S. Final Office Action dated Aug. 8, 2018 in U.S. Appl. No. 14/423,085.
European Office Action dated Jul. 18, 2018 in EP Application No. 13830992.7.
U.S. Appl. No. 16/163,445, filed Oct. 17, 2018, Wilbur et al.
U.S. Appl. No. 16/168,720, filed Oct. 23, 2018, Brown et al.

* cited by examiner

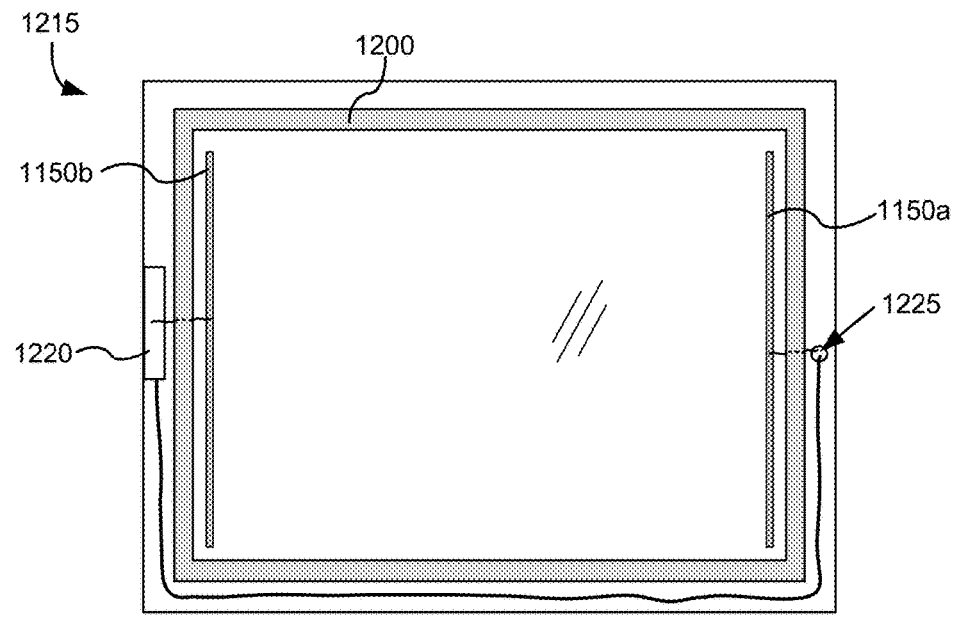
Fig. 12B
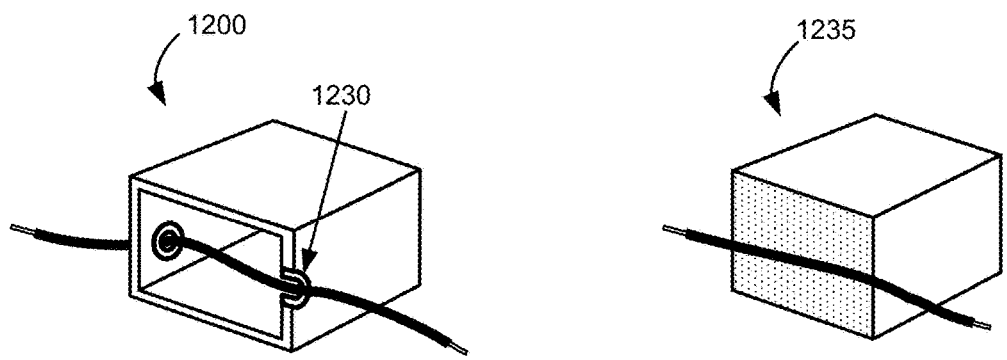
Fig. 12C   Fig. 12D

CONNECTORS FOR SMART WINDOWS

CROSS-REFERENCES TO RELATED APPLICATIONS

This application is a continuation-in-part of International Application PCT/US2015/014479 (designating the United States), titled "CONNECTORS FOR SMART WINDOWS" and filed on Feb. 4, 2015, which claims priority to and benefit of U.S. Provisional Patent Application No. 61/935,757, titled "CONNECTORS FOR SMART WINDOWS" and filed on Feb. 4, 2014 and U.S. patent application Ser. No. 14/363,769, titled "CONNECTORS FOR SMART WINDOWS" and filed on Jun. 6, 2014. This application is also a continuation-in-part of U.S. patent application Ser. No. 14/363,769, titled "CONNECTORS FOR SMART WINDOWS" and filed on Jun. 6, 2014. U.S. patent application Ser. No. 14/363,769 is a national stage application under 35 U.S.C. § 371 to International PCT Application No. PCT/US12/68950 (designating the United States), titled "CONNECTORS FOR SMART WINDOWS" and filed on Dec. 11, 2012, which claims priority to and benefit of U.S. patent application Ser. No. 13/326,168 (now U.S. Pat. No. 8,643,933), titled "CONNECTORS FOR SMART WINDOWS" and filed on Dec. 14, 2011. This application is also a continuation-in-part of U.S. patent application Ser. No. 14/823,969, titled "SPACERS FOR INSULATED GLASS UNITS" and filed on Aug. 11, 2015, which is a continuation application of U.S. patent application Ser. No. 14/152,873 (now U.S. Pat. No. 9,158,173), titled "SPACERS FOR INSULATED GLASS UNITS" and filed on Jan. 10, 2014. U.S. patent application Ser. No. 14/152,873 is a continuation of U.S. patent application Ser. No. 13/312,057 (now U.S. Pat. No. 8,711,465), titled "SPACERS FOR INSULATED GLASS UNITS" and filed on Dec. 6, 2011, which claims priority to U.S. Provisional Patent Application No. 61/421,154, titled "IMPROVED SEPARATORS FOR INSULATED GLASS UNITS" and filed on Dec. 8, 2010 and to U.S. Provisional Patent Application No. 61/435,914, titled "SEPARATORS FOR INSULATED GLASS UNITS" and filed on Jan. 25, 2011. All of these applications are hereby incorporated by reference in their entirety and for all purposes.

FIELD

The disclosed embodiments relate generally to optically switchable devices, and more particularly to connectors for optically switchable windows.

BACKGROUND

Various optically switchable devices are available for controlling tinting, reflectivity, etc. of window panes. Electrochromic devices are one example of optically switchable devices generally. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide (WO3). Tungsten oxide is a cathodic electrochromic material in which a coloration transition, transparent to blue, occurs by electrochemical reduction.

Electrochromic materials may be incorporated into, for example, windows for home, commercial, and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause it to darken; reversing the voltage causes it to lighten. This capability allows for control of the amount of light that passes through the window, and presents an enormous opportunity for electrochromic windows to be used not only for aesthetic purposes but also for energy-savings.

With energy conservation being foremost in modern energy policy, it is expected that growth of the electrochromic window industry will be robust in the coming years. An important aspect of electrochromic window engineering is how to integrate electrochromic windows into new and existing (retrofit) applications. Of particular import is how to deliver power to the electrochromic glazings through framing and related structures.

SUMMARY

Connectors for optically switchable devices, including electrochromic devices, are disclosed herein. A connector and an electrochromic device may be associated with or incorporated in an insulated glass unit (IGU), a window assembly, or a window unit, in some embodiments.

In one embodiment, a window unit includes an IGU including an optically switchable pane. A wire assembly is attached to an edge of the IGU and includes wires in electrical communication with distinct electrodes of the optically switchable pane. A floating connector is attached to the distal end of the wire assembly, with the floating connector being electrically coupled to the optically switchable pane. The floating connector includes a flange and a nose extending from the flange by a distance approximately equal to a thickness of a first frame in which the IGU is to be mounted. The nose includes a terminal face presenting, at least, two exposed contacts of opposite polarities. Other contacts may be present, e.g., for communication to a logic circuit in the window unit. The floating connector further includes two holes in the flange for affixing the floating connector to the first frame. The two holes in the flange are arranged with respect to the nose such that the nose is closer to one of the holes than the other, thereby requiring that the two exposed contacts be arranged in a defined orientation when the floating connector is affixed to the first frame. In other embodiments, the floating connector includes an asymmetric element in the shape of the nose and/or the flange that permits installation in only one way.

In another embodiment, a window assembly includes an IGU including an optically switchable pane. A first connector is mounted to the IGU in a sealant of the IGU. The first connector includes exposed contacts electrically coupled to leads extending from the optically switchable pane and through the IGU, e.g., around the perimeter of a spacer of the IGU and to the first connector. The first connector further includes a first ferromagnetic element which itself may be magnetized. A wire assembly is configured to be detachably mounted to the IGU through the first connector. The wire assembly includes at least two wires extending from and electrically coupled to a second connector. The second connector includes a surface having contacts and the surface is shaped for mechanical engagement to the first connector. The second connector further includes a second ferromagnetic element, which itself may be magnetized. At least one of the first and second ferromagnetic elements is magnetized such that the first and second connectors may magnetically engage one another to provide electrical communication between their respective contacts.

In another embodiment, a window system includes a first IGU. The first IGU includes a first optically switchable pane and a first connector in electrical communication with electrodes of the first optically switchable pane. A first coupling unit includes two connectors linked by a flexible ribbon cable, with a first of the two connectors being configured to mate with the first connector.

Certain embodiments include pre-wired spacers, electrical connection systems for IGUs that include at least one optical device and the IGUs that include such systems. In some embodiments, onboard controllers are part of the electrical connection systems. Many components of the electrical connection systems may be embedded within the secondary seal. Electrical connection systems described herein may include components for providing electrical powering to the IGU at virtually any location about the perimeter of the IGU. In this way, the installer in the field is given maximum convenience and flexibility when installing IGUs having optical devices, e.g. electrochromic devices.

Certain embodiments pertain to an electrical connection system for a sliding door. The electrical connection system comprises a guide and a shuttle. The guide comprises a recess within which pass one or more wires for electrical communication between at least a power source and an optically switchable device in the sliding door or window. The guide further comprises an outer surface and a lengthwise slot in the outer surface. The shuttle is configured to couple to the sliding door or window and slideably engage with the lengthwise slot in the guide. The shuttle is further configured to pass the one or more wires from the sliding door or window, through a body of the shuttle into the recess in the guide, wherein during movement of the sliding door or window, the one or more wires are protected from interaction with one or more moving components. In some cases, electrical connection system a flexible member affixed at one end to the shuttle. The one or more wires are coupled to the flexible member and the flexible member comprises a bend portion allowing the flexible member to pass back over itself and reside substantially parallel to the length of, and inside, the guide. In one example, the one or more wires are a ribbon cable and the flexible member is a spring steel tape. In another example, the flexible member is a chain guide made of a non-electrically conducting material, and the one or more wires reside within the body of the chain guide.

Certain embodiments pertain to an electrical connection system for a sliding door or window where the electrical connection system comprises a frame bracket configured to couple to the sliding door or window and a base bracket configured to couple to a header of the sliding window or door, or to a base rail. The frame bracket and the base bracket are configured to house opposing ends of an IGU connector cable. In one embodiment, the electrical connection system further comprises a chain guide configured to house a middle portion of the IGU connector cable between the frame bracket and the base bracket.

These and other features and advantages will be described in further detail below, with reference to the associated drawings.

BRIEF DESCRIPTION OF THE DRAWINGS

FIGS. 12A-D depict aspects of pre-wired spacers.

DETAILED DESCRIPTION

It should be understood that while the disclosed embodiments focus on electrochromic (EC) windows (also referred to as smart windows), the concepts disclosed herein may apply to other types of switchable optical devices, including liquid crystal devices, suspended particle devices, and the like. For example, a liquid crystal device or a suspended particle device, instead of an electrochromic device, could be incorporated in any of the disclosed embodiments.

An IGU can include the transparent portion of a "window." In the following description, an IGU may include two substantially transparent substrates, for example, two panes of glass, where at least one of the substrates includes an electrochromic device disposed thereon, and the substrates have a separator (or "spacer") disposed between them. One or more of these substrates may itself be a structure having multiple substrates. An IGU is typically hermetically sealed, having an interior region that is isolated from the ambient environment. A window assembly may include an IGU, electrical connectors for coupling the one or more electrochromic devices of the IGU to a window controller, and a frame that supports the IGU and related wiring.

In order to orient the reader to embodiments for delivering power to one or more electrochromic devices in an IGU and/or window assembly, an exemplary description of a powering curve for transitioning an electrochromic window is presented.

Figure 1:
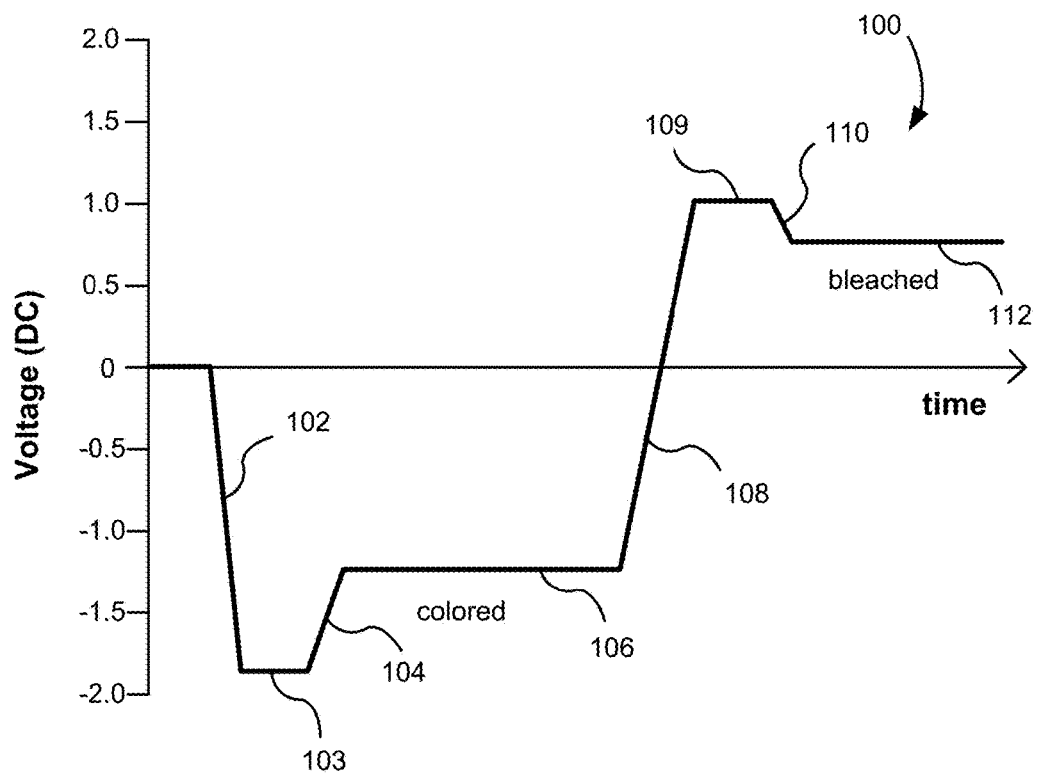
FIG. 1 shows an example of a voltage profile for driving optical state transitions for an electrochromic device.

FIG. 1 shows an example of a voltage profile for driving optical state transitions for an electrochromic device. The magnitude of the DC voltages applied to an electrochromic device may depend in part on the thickness of the electrochromic stack of the electrochromic device and the size (e.g., area) of the electrochromic device. A voltage profile, 100, includes the following sequence: a negative ramp, 102, a negative hold, 103, a positive ramp, 104, a negative hold, 106, a positive ramp, 108, a positive hold, 109, a negative ramp, 110, and a positive hold, 112. Note that the voltage remains constant during the length of time that the device remains in its defined optical state, i.e., in negative hold 106 and positive hold 112. Negative ramp 102 drives the device to the colored state and negative hold 106 maintains the device in the colored state for a desired period of time. Negative hold 103 may be for a specified duration of time or until another condition is met, such as a desired amount of charge being passed sufficient to cause the desired change in coloration, for example. Positive ramp 104, which increases the voltage from the maximum in negative voltage ramp 102, may reduce the leakage current when the colored state is held at negative hold 106.

Positive ramp 108 drives the transition of the electrochromic device from the colored to the bleached state. Positive hold 112 maintains the device in the bleached state for a desired period of time. Positive hold 109 may be for a specified duration of time or until another condition is met, such as a desired amount of charge being passed sufficient to cause the desired change in coloration, for example. Negative ramp 110, which decreases the voltage from the maximum in positive ramp 108, may reduce leakage current when the bleached state is held at positive hold 112.

Further details regarding voltage control algorithms used for driving optical state transitions in an electrochromic device may be found in U.S. patent application Ser. No. 13/049,623 (now U.S. Pat. No. 8,254,013), titled "CONTROLLING TRANSITIONS IN OPTICALLY SWITCHABLE DEVICES," filed Mar. 16, 2011, which is hereby incorporated by reference in its entirety.

Figure 2:
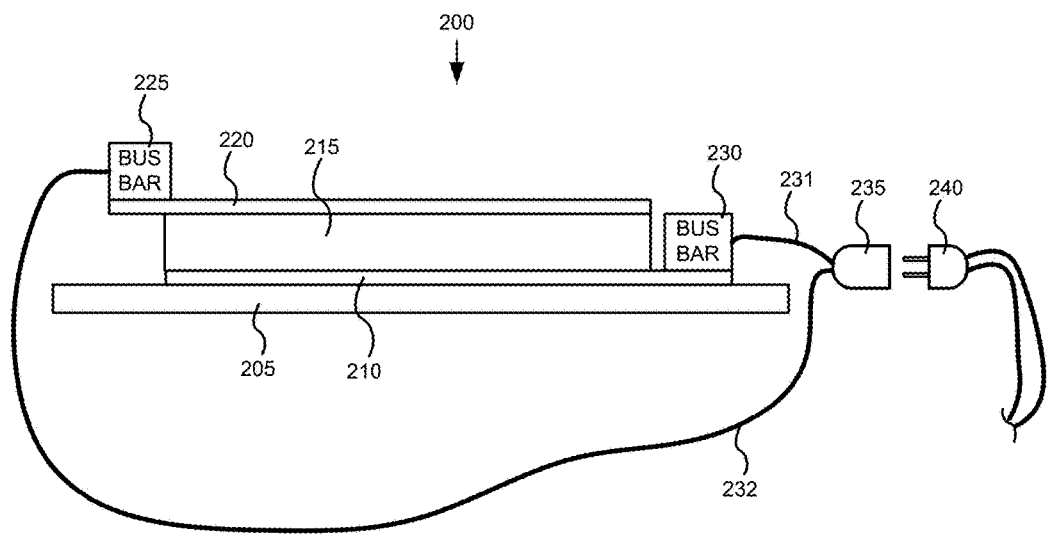
FIG. 2 is a cross-sectional schematic of an electrochromic device.

To apply voltage control algorithms, there may be associated wiring and connections to the electrochromic device being powered. FIG. 2 shows an example of a cross-sectional schematic drawing of an electrochromic device, 200. Electrochromic device 200 includes a substrate, 205. The substrate may be transparent and may be made of, for example, glass. A first transparent conducting oxide (TCO) layer, 210, is on substrate 205, with first TCO layer 210 being the first of two conductive layers used to form the electrodes of electrochromic device 200. Electrochromic stack 215 may include (i) an electrochromic (EC) layer, (ii) an ion-conducting (IC) layer, and (iii) a counter electrode (CE) layer to form a stack in which the IC layer separates the EC layer and the CE layer. Electrochromic stack 215 is sandwiched between first TCO layer 210 and a second TCO layer, 220, TCO layer 220 being the second of two conductive layers used to form the electrodes of electrochromic device 200. First TCO layer 210 is in contact with a first bus bar, 230, and second TCO layer 220 is in contact with a second bus bar, 225. Wires, 231 and 232, are connected to bus bars 230 and 225, respectively, and form a wire assembly (not shown) which terminates in a connector, 235. Wires of another connector, 240, may be connected to a controller that is capable of effecting a transition of electrochromic device 200, e.g., from a first optical state to a second optical state. Connectors 235 and 240 may be coupled, such that the controller may drive the optical state transition for electrochromic device 200.

Further details regarding electrochromic devices may be found in U.S. patent application Ser. No. 12/645,111, titled "FABRICATION OF LOW DEFECTIVITY ELECTROCHROMIC DEVICES," filed Dec. 22, 2009. Further details regarding electrochromic devices may also be found in U.S. patent application Ser. No. 12/645,159, filed Dec. 22, 2009, U.S. patent application Ser. No. 12/772,055 (now U.S. Pat. No. 8,300,298) filed Apr. 30, 2010, U.S. patent application Ser. No. 12/814,277 filed Jun. 11, 2010, and U.S. patent application Ser. No. 12/814,279 filed Jun. 11, 2010, each titled "ELECTROCHROMIC DEVICES;" each of the aforementioned are hereby incorporated by reference in their entireties.

Figure 3:
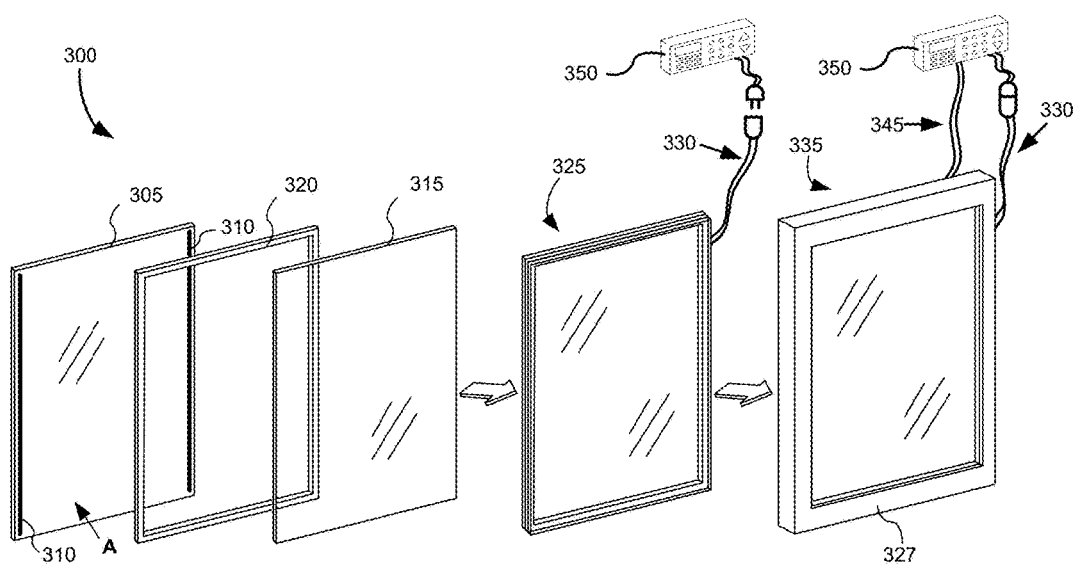
FIG. 3 shows examples of the operations for fabricating an IGU including an electrochromic pane and incorporating the IGU into a frame.

In accordance with voltage algorithms and associated wiring and connections for powering an electrochromic device, there are also aspects of how the wired electrochromic glazing is incorporated into an IGU and how the IGU is incorporated into, e.g., a frame. FIG. 3 shows examples of the operations for fabricating an IGU, 325, including an electrochromic pane, 305, and incorporating the IGU 325 into a frame, 327. Electrochromic pane 305 has an electrochromic device (not shown, but for example on surface A) and bus bars, 310, which provide power to the electrochromic device, is matched with another glass pane, 315. The electrochromic pane may include, for example, an electrochromic device similar to the electrochromic device shown in FIG. 2, as described above. In some embodiments, the electrochromic device is solid state and inorganic.

During fabrication of IGU 325, a separator, 320 is sandwiched in between and registered with glass panes 305 and 315. IGU 325 has an associated interior space defined by the faces of the glass panes in contact with separator 320 and the interior surfaces of the separator. Separator 320 may be a sealing separator, that is, the separator may include a spacer and sealing material (primary seal) between the spacer and each glass pane where the glass panes contact the separator.

A sealing separator together with the primary seal may seal, e.g. hermetically, the interior volume enclosed by glass panes 305 and 315 and separator 320 and protect the interior volume from moisture and the like. Once glass panes 305 and 315 are coupled to separator 320, a secondary seal may be applied around the perimeter edges of IGU 325 in order to impart further sealing from the ambient environment, as well as further structural rigidity to IGU 325. The secondary seal may be a silicone based sealant, for example.

IGU 325 may be wired to a window controller, 350, via a wire assembly, 330. Wire assembly 330 includes wires electrically coupled to bus bars 310 and may include other wires for sensors or for other components of IGU 325. Insulated wires in a wire assembly may be braided and have an insulated cover over all of the wires, such that the multiple wires form a single cord or line. In some cases, the wire assembly may include a "pigtail" connector as described herein. IGU 325 may be mounted in frame 327 to create a window assembly, 335. Window assembly 335 is connected, via wire assembly 330, to window controller, 350. Window controller 350 may also be connected to one or more sensors in frame 327 with one or more communication lines, 345. During fabrication of IGU 325, care must be taken, e.g., due to the fact that glass panes may be fragile but also because wire assembly 330 extends beyond the IGU glass panes and may be damaged. An example of such a scenario is depicted in FIG. 4.

Figure 4:
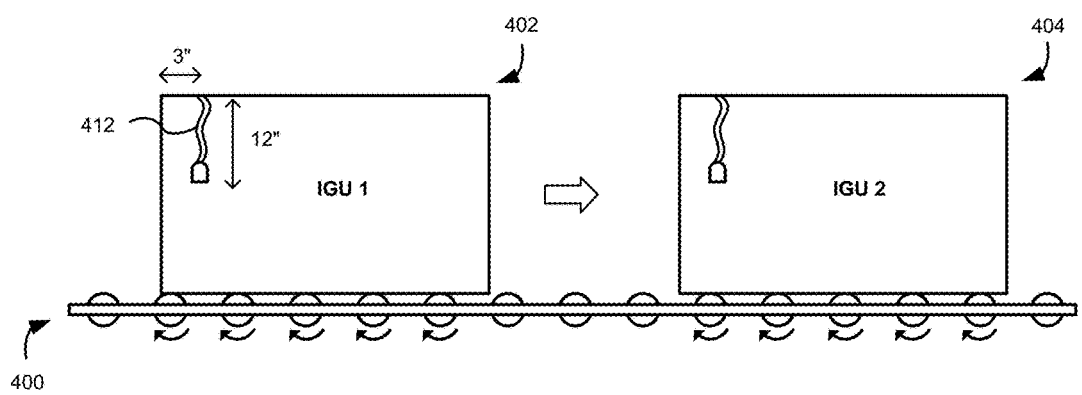
FIG. 4 shows an example of a manner in which an IGU including an electrochromic pane may be transported during fabrication and/or testing of the IGU.

FIG. 4 shows an example of the manner in which an IGU including an electrochromic pane may be transported during the fabrication process for the IGU. As shown in FIG. 4, IGUs, 402 and 404, may be transported and handled on a transport system, 400, in a manner in which an IGU rests on its edge. For example, transport system 400 may include a number of rollers such that IGUs may easily be translated along an assembly or testing line. Handling an IGU in a vertical manner (i.e., with the IGU resting on its edge) may have the advantage of the IGU having a smaller footprint on a manufacturing floor. Each IGU may include a wire assembly, 412, with a connector (e.g., pigtail connector) that provides electrical contact to the bus bars and the electrochromic stack in each IGU. The wire assembly may be about 12 inches long such that the wire does not interfere with transport system 400, e.g., when the IGU vertical dimension as it rests on transport system 400 is about 12 inches or more. The wire assembly also may be offset from an edge of the IGU by about 3 inches, e.g., to ensure that when installed in a frame the wires do not interfere with blocks or other means of securing the IGU in the frame. During transport on transport system 400, the wire assembly, although sized to avoid contact with transport system 400, may catch on other features of a fabrication facility or be inadvertently held while the IGU is still moving along transport system 400. When the wire assembly is permanently attached to the IGU as shown in FIGS. 3 and 4, the wire assembly may be inadvertently detached from the IGU or otherwise damaged. This may include damaging the wiring within the secondary seal of the IGU. When this happens, the entire IGU may need to be replaced. Since typically the electrochromic glazing(s) of the IGU are the most expensive feature, it is unacceptably costly to dispose of the entire IGU as a result of damaging the wiring component of the IGU assembly due to external portions of the wiring. Embodiments described herein avoid such a result.

Figure 5A:
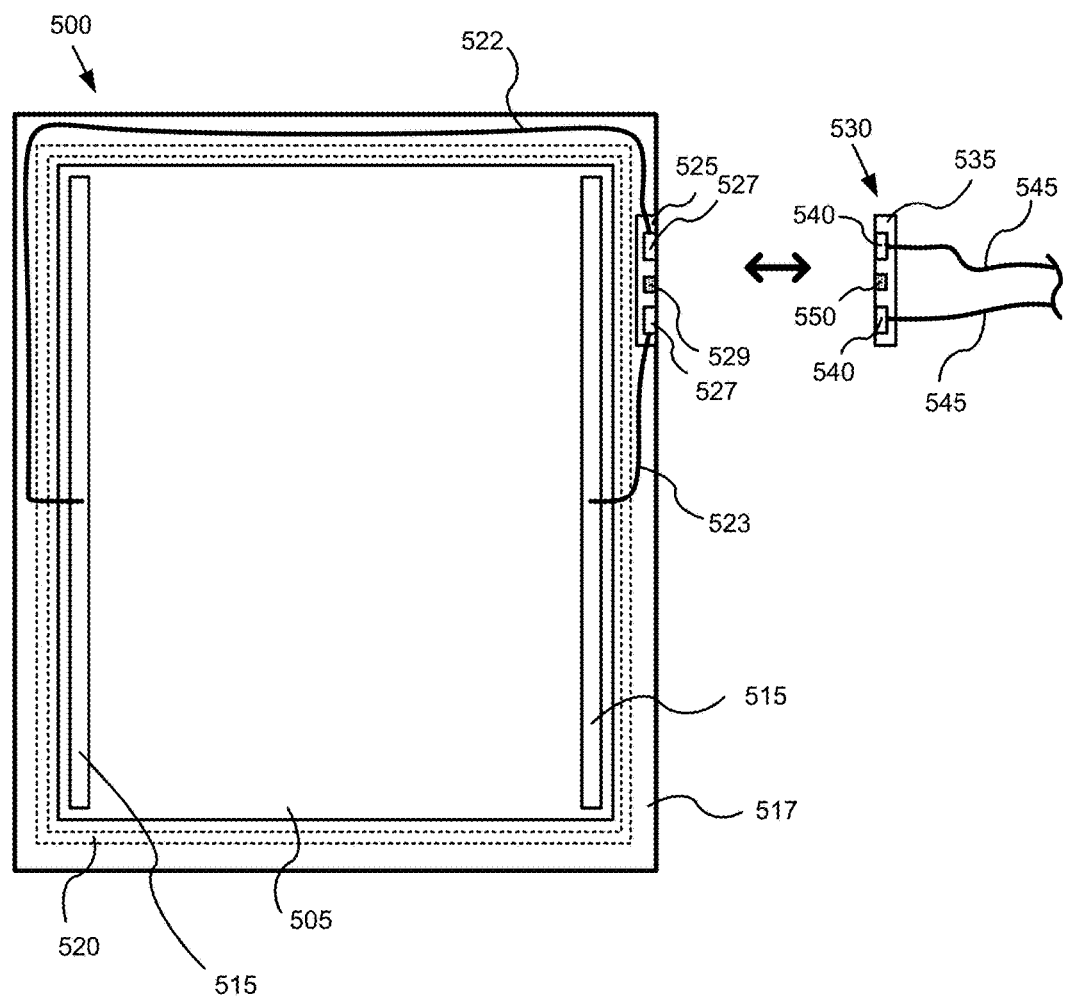
FIG. 5A is a schematic diagram of an IGU including an electrochromic pane and an associated wire assembly.

FIG. 5A is a schematic diagram of an IGU, 500, including an electrochromic pane, 505, and an associated wire assembly, 530. IGU 500 includes electrochromic pane 505 which includes bus bars, 515, which are in electrical communication with an electrochromic device, 517 (for an exemplary cross-section see FIG. 2). Electrochromic pane 505 is matched with another pane (not shown) and attached to the other pane with a separator, 520 (indicated by the dotted lines). The area of electrochromic pane 505 outside of separator 520 is a secondary sealing area, while electrochromic device lies within the perimeter of separator 520 (which forms the primary seal against the glass panes of the IGU). In the assembled IGU, the secondary sealing area is typically filled with a sealing compound (as described in relation to FIG. 3) to form a secondary seal. Wires, 522 and 523, are connected to bus bars 515 and extend through IGU 500 from bus bars 515, through or under spacer 520, and within the secondary seal to a first connector, 525. Wires 522 and 523 may be positioned such that they do not appear in the viewable region of the panes. For example, the wires may be enclosed in the sealing separator or the secondary seal as depicted. In some embodiments, and as depicted, first connector 525 may be housed substantially within the secondary seal. For example, first connector 525 may be surrounded by the secondary sealant on all sides except for the face of first connector 525 having two pads, 527. The first connector may be housed substantially within the secondary seal in different manners. For example, in some embodiments, the first connector may be housed substantially within the secondary seal and be recessed relative to the edges of the glass panes. In some embodiments, first connector 525 may be housed substantially within the secondary seal and protrude beyond the edges of the glass panes. In other embodiments, first connector 525 may itself form part of the secondary seal, e.g., by sandwiching between the glass panes with sealant disposed between itself and the glass panes.

As noted above, first connector 525 includes two pads 527. The two pads are exposed and provide electrical contact to wires 522 and 523. In this example, first connector 525 further includes a ferromagnetic element, 529. Wire assembly 530 includes a second connector, 535, configured to mate with and provide electrical communication with pads 527. Second connector 535 includes a surface having two pads, 540, that provide electrical contact to wires, 545, of the wire assembly. Second connector 535 further includes a ferromagnetic element, 550, configured to register and mate with ferromagnetic element 529 of the first connector.

Pads 540 of second connector 535 are configured or shaped for mechanical and electrical contact with pads 527 of first connector 525. Further, at least one of ferromagnetic elements 529 of first connector 525 or 550 of second connector 535, respectively, may be magnetized. With at least one of ferromagnetic elements 529 or 550 being magnetized, first connector 525 and second connector 535 may magnetically engage one another and provide electrical communication between their respective pads. When both ferromagnetic elements are magnetized, their polarity is opposite so as not to repel each other when registered. A distal end (not shown) of the wire assembly 530 may include terminals, sometimes provided in a plug or socket, that allow the wire assembly to be connected to a window controller. In one embodiment, a distal end of wire assembly 530 include a floating connector, e.g., as described in relation to FIGS. 6 and 7.

In one embodiment, rather than a pad to pad contact (e.g., 527 to 540 as in FIG. 5A) for the first and second connectors, a pad to spring-type pin configuration is used. That is, one connector has a pad electrical connection and the other connector has a corresponding spring-type pin, or "pogo pin"; the spring-type pin engages with the pad of the other connector in order to make the electrical connection. In one embodiment, where ferromagnetic elements are also included, the magnetic attraction between the ferromagnetic elements of the first and second connectors is sufficiently strong so as to at least partially compress the spring mechanism of the pogo pin so as to make a good electrical connection when engaged. In one embodiment, the pads and corresponding pogo pins are themselves the ferromagnetic elements.

In some embodiments, first connector 525, second connector 535, or the terminals or connector at the distal end of the wire assembly (e.g. a floating connector) may include a memory device and/or an integrated circuit device. The memory device and/or integrated circuit device may store information for identifying and/or controlling electrochromic pane 505 in IGU 500. For example, the device may contain a voltage and current algorithm or voltage and current operating instructions for transitioning electrochromic pane 505 from a colored stated to a bleached state or vice versa. The algorithm or operating instructions may be specified for the size, shape, and thickness of electrochromic pane 505, for example. As another example, the device may contain information that identifies the shape or size of electrochromic pane 505 to a window controller such that electrochromic pane 505 may operate in an effective manner. As yet another example, the device may contain information specifying a maximum electric signal and a minimum electric signal that may be applied to electrochromic pane 505 by a window controller. Specifying maximum and minimum electric signals that may be applied to the electrochromic pane may help in preventing damage to the electrochromic pane.

In another example, the memory and/or integrated circuit device may contain cycling data for the electrochromic device to which it is connected. In certain embodiments, the memory and/or integrated circuit device includes part of the control circuitry for the one or more electrochromic devices of the IGU. In one embodiment, individually, the memory and/or integrated circuit device may contain information and/or logic to allow identification of the electrochromic device architecture, glazing size, etc., as described above, e.g., during a testing or initial programming phase when in communication with a controller and/or programming device. In one embodiment, collectively, the memory and/or integrated circuit device may include at least part of the controller function of the IGU for an external device intended as a control interface of the installed IGU.

Further, in embodiments in which first connector 525 includes the memory device and/or the integrated circuit device, damage to the electrochromic pane may be prevented because the device is part of IGU 500. Having the maximum and minimum electric signals that may be applied to electrochromic pane 505 stored on a device included in first connector 525 means that this information will always be associated with IGU 500. In one example, a wiring assembly as described herein includes five wires and associated contacts; two of the wires are for delivering power to the electrodes of an electrochromic device, and the remaining three wires are for data communication to the memory and/or integrated circuit device.

Wire assembly 530 described with respect to FIG. 5A may be easily attachable to, and detachable from, IGU 500. Wire assembly 530 also may aid in the fabrication and handling of an IGU because wire assembly 530 is not permanently attached to the IGU and will therefore not interfere with any fabrication processes. This may lower the manufacturing costs for an IGU. Further, as noted above, in some IGUs that include wire assemblies that are permanently attached to the IGU, if the wire assembly becomes damaged and/or separated from the IGU, the IGU may need to be disassembled to reconnect the wire assembly or the IGU may need to be replaced. With a detachable wire assembly, an IGU may be installed and then the wire assembly attached, possibly precluding any damage to the wire assembly. If a wire assembly is damaged, it can also be easily replaced because it is modular.

Additionally, the detachable wire assembly allows for the replacement or the upgrade of the wire assembly during the installed life of the associated IGU. For example, if the wire assembly includes a memory chip and/or a controller chip that becomes obsolete or otherwise needs replacing, a new version of the assembly with a new chip can be installed without interfering with the physical structure of the IGU to which it is to be associated. Further, different buildings may employ different controllers and/or connectors that each require their own special wire assembly connector (each of which, for example, may have a distinct mechanical connector design, electrical requirements, logic characteristics, etc.). Additionally, if a wire assembly wears out or becomes damaged during the installed life of the IGU, the wire assembly can be replaced without replacing the entire IGU.

Figure 5B:
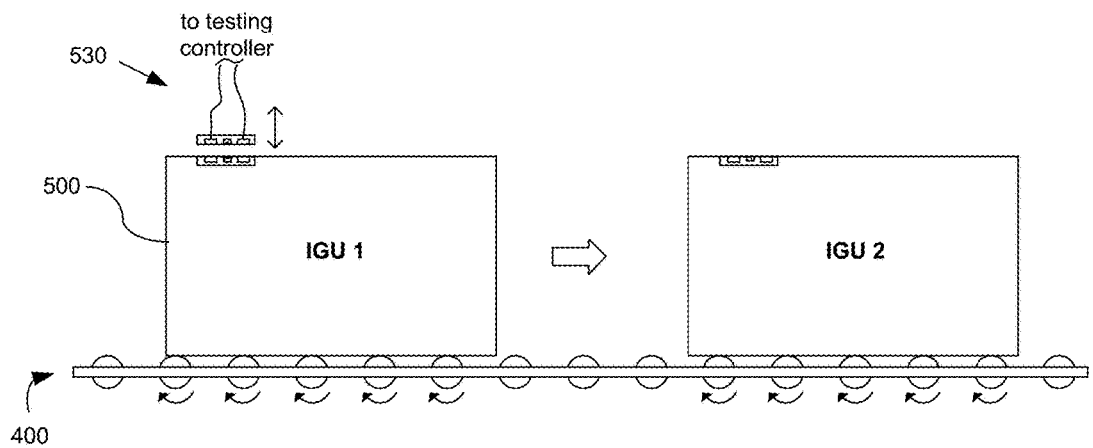
FIG. 5B shows an example of the manner in which an IGU including an electrochromic pane may be transported during fabrication and/or testing of the IGU.

Another advantage of a detachable wire assembly is shown in FIG. 5B. FIG. 5B is a schematic diagram of an IGU 500 on a transport system 400 and an associated wire assembly. The IGU 500 includes an electrochromic pane and a connector. The transport system 400 may include a number of rollers such that IGU 500 may easily be moved, as described above. The portion of transport system 400 shown in FIG. 5B may reside in a testing region of the manufacturing floor, for example, after the IGU is fabricated. With IGU 500 including a connector and a wire assembly 530 with a connector capable of being magnetically coupled to one another as described in FIG. 5A, IGU 500 may be easily tested. For example, testing of the IGU may be performed automatically by dropping wire assembly 530 including a connector that includes a ferromagnetic element on to an edge of the IGU. The connector of the wire assembly may connect with the connector of the IGU, with little or no physical alignment needed, e.g., due to arrangement of one or more ferromagnetic elements in the mating connectors. For example, the testing connector end may simply be dangled near the IGU; the registration and connection between the connectors being accomplished by magnetic attraction and alignment making it "snap" into place automatically. The IGU may then be tested, for example, by a testing controller coupled to the other end of the wire assembly 530. Testing may include, for example, activating the electrochromic pane and assessing the electrochromic pane for possible defects. The wire assembly may then be removed from the IGU by a force sufficient to overcome the magnetic attraction between the two connectors. In certain embodiments, the external connector may require appropriate flexible supports to prevent the wiring to the external connector from experiencing the stress of pulling the connectors apart. The wire assembly may then be ready to engage the next IGU moving along the manufacturing line.

In certain embodiments, each of the first and second connectors includes at least two ferromagnetic elements. In a specific embodiment, each of the first and second connectors includes two ferromagnetic elements. A "double" magnetic contact allows for more secure connections. Magnets such as neodymium based magnets, e.g., comprising Nd2Fe14B, are well suited for this purpose because of their relatively strong magnetic fields as compared to their size.

As described above, the two ferromagnetic elements may be part of the electrical pads, or not. In one embodiment, the two ferromagnetic elements in each of the first and the second connectors are themselves magnets, where the poles of the magnets of each of the first and second connectors that are proximate when the connectors are registered, are opposite so that the respective magnets in each of the first and second connectors attract each other.

Figure 5C:
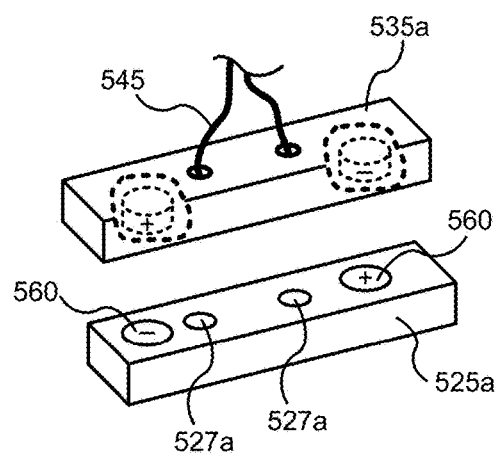
FIG. 5C depicts a first connector and second connector, each having two ferromagnetic elements.

FIG. 5C depicts a first connector (IGU and wiring to the first connector not shown), 525a, having two magnets, 560, one with the positive pole exposed and one with the negative pole exposed. The surfaces of electrical contacts, 527a, are also depicted. A second connector, 535a, has corresponding magnets where the poles facing the exposed poles of magnets 560 are opposite so as to attract magnets 560. Second connector also has wires, 545, that lead to a power source such as a controller (electrical pads on connector 535a are not depicted). Using such a connector configuration assures that the electrical connections (the pads in this example) will align correctly due to the magnetic poles attracting only when the opposite poles are proximate each other. In one embodiment, this arrangement is used where the pad-to-pad or pad-to-pogo-pin electrical connections are so magnetized and poles so configured.

Figure 5D:
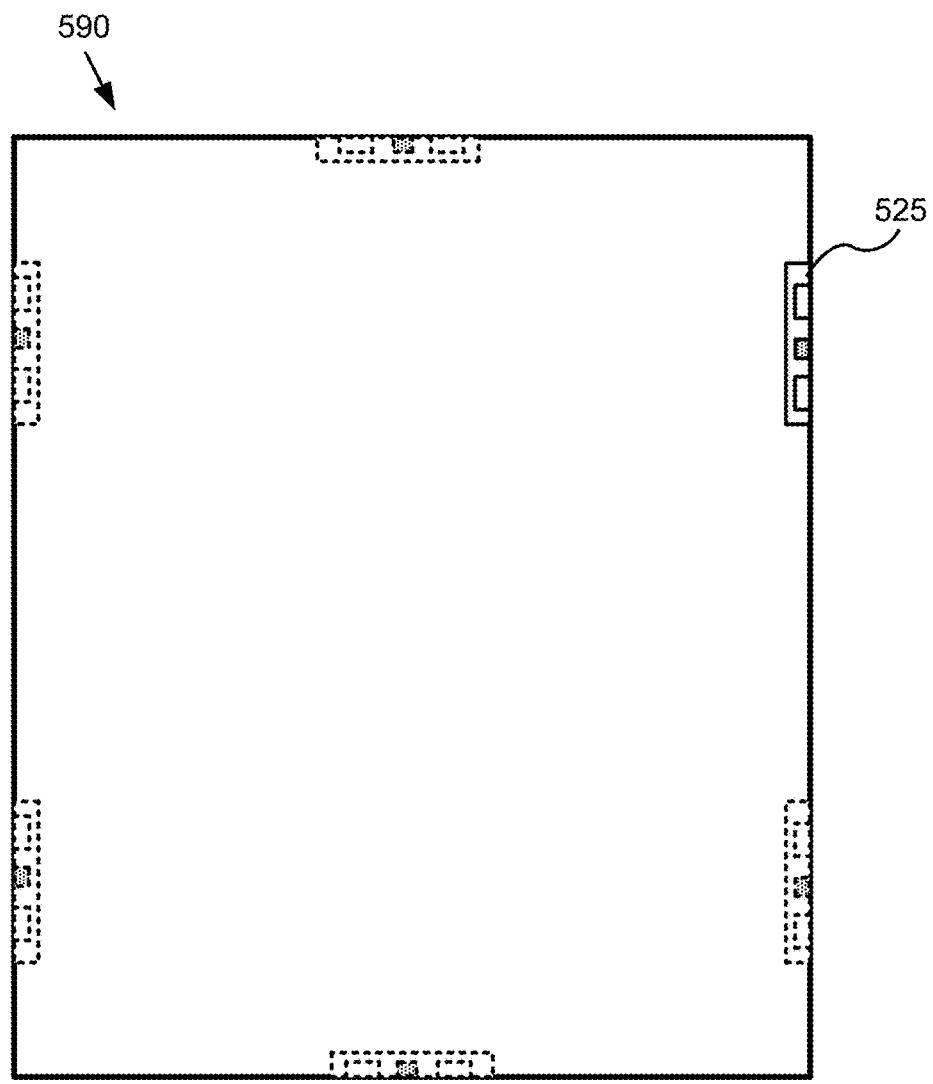
FIG. 5D depicts an IGU with two or more redundant connectors embedded in the secondary seal.

When installing an IGU in some framing systems, e.g., a window unit or curtain wall where multiple IGUs are to be installed in proximity, it is useful to have flexibility in where the electrical connection is made to each IGU. This is especially true since typically the electrochromic glazing of the IGUs is always placed on the outside of the installation, facing the external environment of the installation. Given this configuration, having the connectors in the same position within the secondary seal of the IGUs of the installation requires much more wiring to the controller. However, for example, if the electrical connectors in the IGUs (as described herein) can be positioned more proximate to each other, then less wiring is needed from the IGU to the framing system in which the IGUs are installed. Thus, in some embodiments, IGU 500 may include more than one first connector 525, that is, redundant connectors are installed. For example, referring to FIG. 5D, an IGU 590 might include not only a first connector 525 at the upper right hand side, but also (as indicated by the dotted line features) another connector at the lower left hand side or at the lower right hand side or the upper left hand side or in the top or bottom portion of the IGU. In this example, the connectors are all within the secondary seal. The exact position on each edge is not critical; the key is having more than one connector that feeds the same electrochromic device so that when installing the IGU, there is flexibility in where to attach the external connector to the IGU. When IGU 590 is mounted in a frame holding 2, 4, 6, or more IGUs similar to IGU 590, for example, having multiple first connectors included within each IGU 590 allows for more convenient routing of the wires (e.g., wires 545 as in FIG. 5A associated with each wire assembly 530) in the frame due to the flexibility of having multiple redundant first connectors to which the second connector may be coupled. In one embodiment, the IGU has two first connectors, in another embodiment three first connectors, in yet another embodiment four first connectors. In certain embodiments there may be five or six first connectors. Although the number of connectors may impact production costs, this factor may be more than compensated for by the higher degree of flexibility in installation, e.g., in an expensive and sophisticated curtain wall installation where volume to accommodate wiring is often limited and installing multiple first connectors during fabrication is relatively easy.

In some embodiments, the IGU, e.g. 500 or 590, may include two electrochromic panes. In these embodiments, the first connector may include four pads (or corresponding pad to pin contacts) to provide contacts to the bus bars of each of the electrochromic panes (i.e., each electrochromic pane would include at least two bus bars). Additional pads for control and communication with the electrochromic device and/or onboard controller may also be included, e.g., four pads for bus bar wiring and three additional pads for communication purposes. Onboard controllers, e.g. where the controller components are integrated within the secondary seal of the IGU, are described in U.S. Pat. No. 8,213,074, titled "Onboard Controller for Multistate Windows," which is hereby incorporated by reference in its entirety. Likewise, second connector 535 would include four pads to provide electrical contact to wires of the wire assembly. In other embodiments, each electrochromic pane may have its own first connector, or two or more redundant first connectors. Further description of an IGU that includes two or more electrochromic panes is given in U.S. patent application Ser. No. 12/851,514 (now U.S. Pat. No. 8,270,059), titled "MULTI-PANE ELECTROCHROMIC WINDOWS," filed Aug. 5, 2010, which is hereby incorporated by reference in its entirety.

Figure 6:
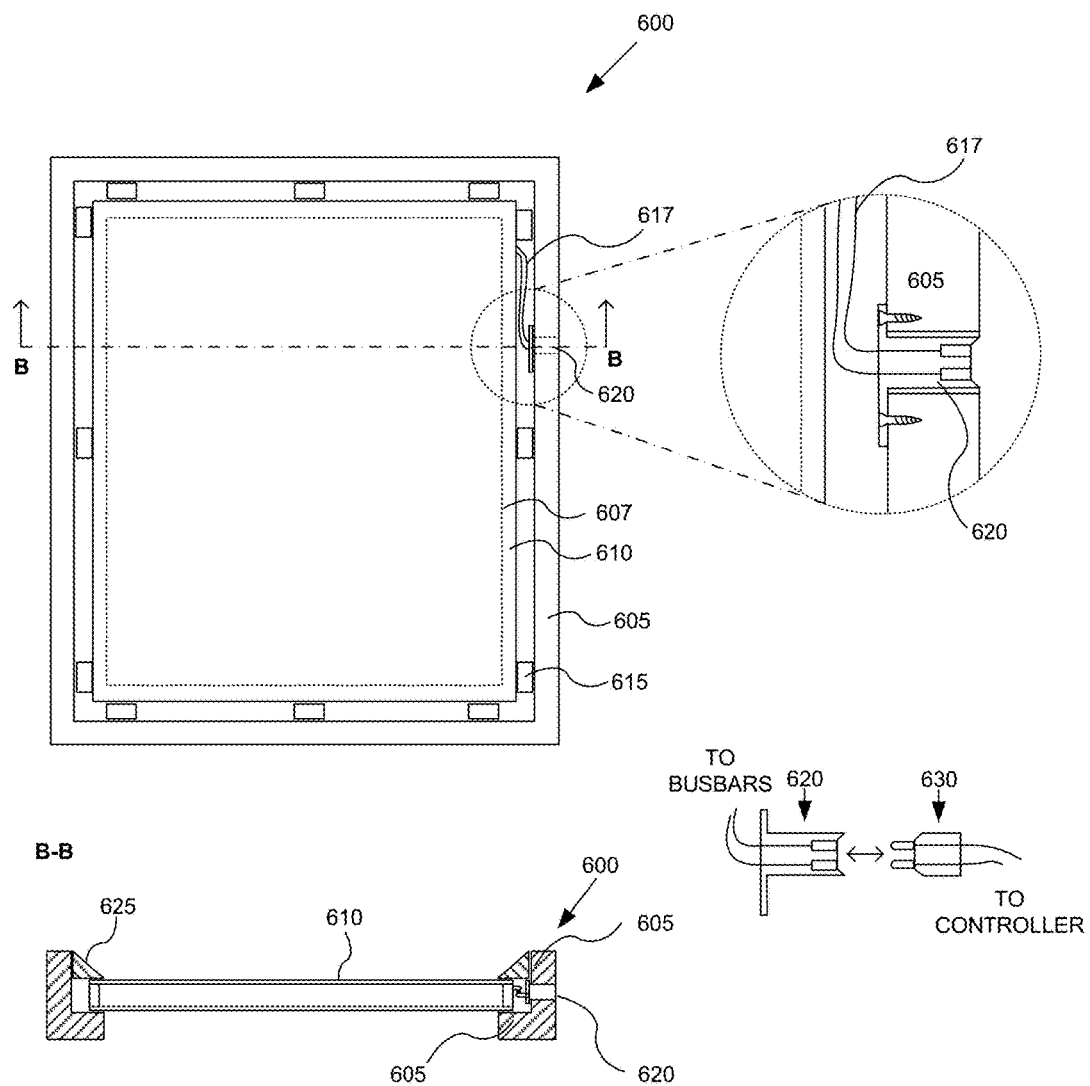
FIG. 6 shows examples of schematic diagrams of an IGU including an electrochromic pane in a frame with a floating connector installed in the frame.

Certain embodiments include connectors that are external to the IGU and provide electrical communication from a framing structure to the IGU (either directly wired to the IGU or wired to a first and second connector assembly as described above). FIG. 6 shows examples of schematic diagrams of a window assembly, 600, including an IGU, 610, which includes an electrochromic pane. IGU 610 resides in a frame, 605. A connector, 620, is wired to IGU 610, and as installed attached to a frame 605; at least part of connector 620 (the nose, infra) passes through an aperture in frame 605. FIG. 6 includes a top-down schematic diagram (top left, looking at window assembly 600 from a major face, but with some aspects missing so as to show internal detail of the assembly) as well as a cross-section (bottom left) B of window assembly 600. The cross-section B is indicated by cut B on the top-down diagram. Dashed line 607 indicates the front edge of frame 605 (behind the IGU as depicted); the portion of IGU 610 within dashed line 607 corresponds to the viewable area of IGU 610 that one would see when the frame is assembled, i.e., that which would function as the window. Glazing blocks 615 between IGU 610 and frame 605 serve to support IGU 610 within frame 605. Glazing blocks 615 may be compliant to account for differences in the coefficients of thermal expansion between frame 605 and IGU 610. For example, the glazing blocks 615 may be a foam material or a polymeric material. Framing material, 625, holds IGU 610 against frame 605. Note that framing material 625 is not shown in the top-down schematic of window assembly 600. Note also that IGU 610 may be in contact with frame 605 and framing material 625 on each face, respectively, as shown but there may also be some sealant between the glass and the framing material. The cross section shows that this IGU contains two glazings separated by spacers.

IGU 610 includes a wire assembly 617 including at least two wires electrically coupled to the two bus bars (not shown) of an electrochromic device (not shown) on the electrochromic pane of the IGU. Note that wire assembly 617 is not shown in the cross section of window assembly 600. The wires of wire assembly 617 terminate at a floating connector 620 at a distal end of the wire assembly. Floating connector 620 includes two female sockets that are electrically coupled to the wires. Further details regarding embodiments of floating connectors are given below with respect to FIG. 7. A fixed connector, 630, including two male pins may be plugged into floating connector 620. The fixed connector may be fixed to a frame or building in which window assembly 600 is mounted, for example. With fixed connector 630 being electrically coupled to a window controller, the optical state of the electrochromic device of IGU 610 may be changed.

While floating connector 620 and fixed connector 630 as shown in FIG. 6 are pin/socket type connectors, other types of connectors may be used. For example, in some embodiments, a face of the nose of the floating connector may be flat and include magnetic pads presented on the face of the floating connector. Wires of wire assembly 617 may be coupled to these magnetic pads. Fixed connector 630 may also include magnetic pads that are configured or shaped for mechanical and electrical contact with the pads of the floating connector. Alternatively, floating connector 620 and fixed connector 630 may be similar to the connectors described above in relation to FIG. 5A.

Floating connector 620 may be attached to frame 605 with screws, nails, or other devices, or may be a compression fit with no additional affixing members. A nose of the floating connector may be flush with the outer edge of frame 605. The nose of the floating connector may be circular, rectangular, or other shape.

While wire assembly 617 is shown as being directly connected to floating connector 620, other mechanisms may be used to connect wire assembly 617 to floating connector 620. For example, in some embodiments, the connection of wire assembly 617 to floating connector 620 may be made with connectors similar to the connectors described above in relation to FIG. 5A.

Further, similar to the connectors and the wire assembly described in FIG. 5A, floating connector 620, fixed connector 630, or the distal end of the wire assembly, of which the fixed connector 630 is a part, may include a memory device and/or an integrated circuit device. The device may store information for identifying and/or controlling the electrochromic pane in IGU 610, as described above.

In some embodiments, IGU 610 may include two electrochromic panes. In this embodiment, the floating connector may include four female sockets that are electrically coupled to the bus bars of each of the electrochromic panes (i.e., each electrochromic pane would include at least two bus bars). Likewise, fixed connector 630 would include four male pins to be plugged into the floating connector.

Figure 7:
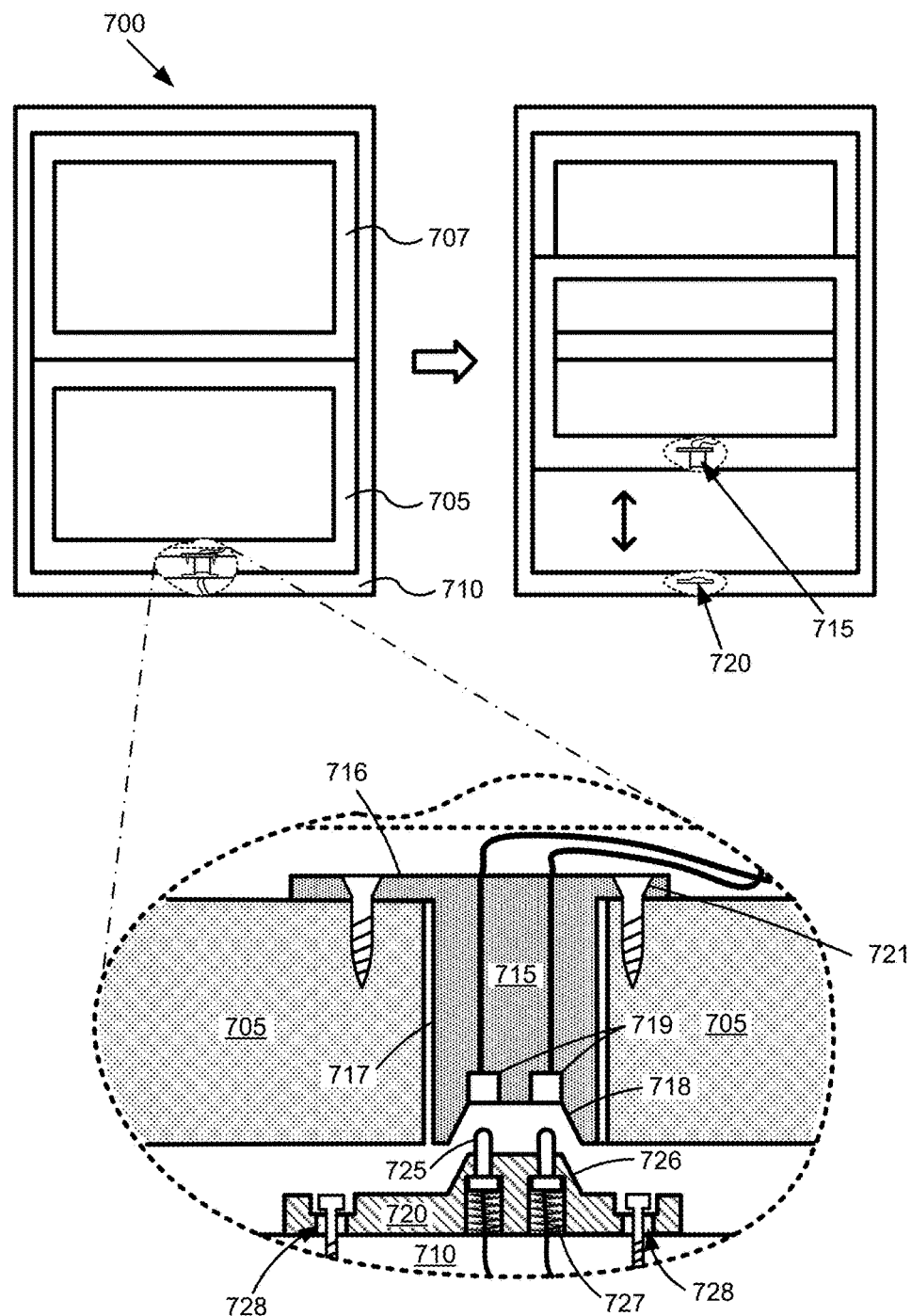
FIG. 7 shows examples of schematic diagrams of a window unit incorporating an IGU including an electrochromic pane with detail of a connection configuration for powering the IGU.

FIG. 7 shows examples of schematic diagrams of a window unit, 700, incorporating an IGU including an electrochromic pane. Window unit 700 includes a frame, 710, in which a fixed frame, 707, and a movable frame, 705, are mounted. Fixed frame 707 may be fixedly mounted in frame 710 so that it does not move. Movable frame 705 may be movably mounted in frame 710 so that it may move from a closed position to an open position, for example. In the window industry, the window unit may be referred to as a single hung window, the fixed frame may be referred to as a fixed sash, and the movable frame may be referred to as a movable sash. Movable frame 705 may include an IGU (not shown) including an electrochromic pane (not shown), with connection of the electrochromic pane to a window controller being provided by a floating connector, 715, and a fixed connector, 720. While FIG. 7 shows a window unit including one movable frame with connectors for connecting the electrochromic pane of the movable frame to a window controller, the connectors also may be used with a window unit including two movable frames. Also, one of ordinary skill in the art would appreciate that the described embodiments with one or two movable frames could include horizontally-sliding windows.

When movable frame 705 is in an open position, floating connector 715, affixed to the movable frame 705, may not be in contact with fixed connector 720, which is affixed to the frame 710. Thus, when movable frame 705 is in an open position, the electrochromic pane of the IGU mounted in movable frame 705 may not be able to be controlled by a window controller. When movable frame 705 is in a closed position, however, floating connector 715 makes contact with fixed connector 720. The mating of floating connector 715 and fixed connector 720 provides electrical communication, and thus allows for actuation of the electrochromic pane of the IGU in movable frame 705. For example, the fixed connector may be coupled to a window controller, with the window controller being configured to transition the electrochromic pane of the IGU between a first optical state and a second optical state.

Floating connector 715 and fixed connector 720 are one example of a pair of connectors for electrically coupling an electrochromic pane to a window controller. Other pairs of connectors are possible. Floating connector 715 has a flange, 716, and a nose, 717, extending from the flange. Nose 717 may have a length about equal to a thickness of movable frame 705. Nose 717 includes a terminal face, 718, that includes two exposed female contacts, 719. Floating connector 715 may be affixed to movable frame 715 through mounting holes 721 in the flange 716 using screws, nails, or other attachment devices and/or press fit (i.e., secured by compression only). Because female contacts 719 of floating connector 715 may have opposite polarities, both floating connector 715 and fixed connector 720 may have offset mounting holes and/or be shaped or configured so that they can be installed in only one way, e.g., having an asymmetrical element associated with the shape of the connector and/or a registration notch or pin. That is, for example, one mounting hole 721 in flange 716 may be located closer to nose 717 than another mounting hole 721. With the mounting holes arranged in this offset manner, the exposed contacts may be arranged in a defined orientation when floating connector 715 is affixed to movable frame 705. For example, movable frame 705 may include holes that are drilled or formed in the movable frame when it is made. When installing the IGU in the movable frame, one may mount floating connector 715 in movable frame 705 such that offset holes 721 in flange 716 are arranged to match the holes pre-formed in movable frame 705. This offset arrangement of mounting elements prevents the IGU from being connected to a window controller incorrectly, which may damage the electrochromic pane of the IGU.

Another mechanism instead of, or in addition to, screws or nails may be used to affix floating connector 715 to movable frame 705. For example, in some implementations, nose 717 of floating connector 715 may further include protrusions. Such protrusions may engage with movable frame 705 and hold nose 717 of floating connector 715 when the nose is passed through a hole or an aperture in the movable frame to expose terminal face 718 of nose 717. In some implementations, the protrusions from nose 717 may be incompressible. The incompressible protrusions may engage with and deform the inside of the hole or aperture in movable frame 705 when nose 717 is passed through the hole during installation (e.g., the nose is partially inserted into the hole and then the remainder of the nose tapped in with a rubber mallet). When the incompressible protrusions engage with and deform inside the hole, they may hold floating connector 715 in movable frame 705. In one example, the protrusions are barbs or similar "one-way" protrusions that are configured to hold the nose in the aperture once inserted therein. In another example, the protrusions, although incompressible and configured to hold the nose in the aperture, allow the nose to be removed with some amount of force that will not damage the connector. In other implementations, the protrusions from nose 717 may be compressible. The compressible protrusions may compressively engage with the inside of a hole or an aperture in movable frame 705 when nose 717 is inserted into the hole. When the compressible protrusions engage with the hole, they may hold floating connector 715 in movable frame 705.

Fixed connector 720 includes two male contacts 725. When movable frame 705 is in a closed position, male contacts 725 of fixed connector 720 contact the two female contacts 719 of floating connector 715. This allows electrical communication with the electrochromic pane in movable frame 705. Springs 727 or other mechanical devices are used to cause male contacts 725 to extend from the raised surface 726 of fixed connector 720. Springs 727 or other mechanical devices also allow male contacts 725 to recede into raised surface 726 of fixed connector 720 when a force is applied to male contacts 725. Springs 727 in fixed connector 720 may aid in protecting male contacts 725 during use of window unit 700. For example, without springs 727, male contacts 725 may be exposed and otherwise damaged by a user opening and closing the window in some cases. Male contacts 725 are one type of pogo pin electrical contact.

In some embodiments, terminal face 718 of floating connector 715 may include a circumferential rim and an interior recessed region where exposed female contacts 719 are presented. The circumferential rim may have a slope directed inwardly towards the interior recessed region. The inwardly directed slope of the circumferential rim may facilitate mating of raised surface 726 of fixed connector 720 with terminal face 718 of floating connector 715. Raised surface 726 may aid in guiding male contacts 725 of fixed connector 720 to register with female contacts 719 of floating connector 715.

Similar to floating connector 715, fixed connector 720 may be affixed to frame 710 through mounting holes 728 in fixed connector 720 using screws, nails, or other attachment devices. Fixed connector 720 also may have offset mounting holes. That is, for example, one mounting hole, 728, in fixed connector 720 may be located closer to raised surface 726 than another mounting hole, 728. With the mounting holes arranged in this offset manner, male contacts 725 may be arranged in a defined orientation when fixed connector 720 is affixed to frame 710. For example, frame 710 may include holes that are drilled or formed in the frame when it is made. An installer of fixed connector 720 in frame 710 may mount the fixed connector to the frame such that offset holes 728 are arranged to match the holes formed in the frame. This prevents the IGU from being connected to a window controller incorrectly, which may damage the electrochromic pane of the IGU.

In this example, mounting holes 728 in fixed connector 720 also allow for movement of fixed connector 720, that is, fixed connector 720 is movably affixed to frame 710. For example, each of mounting holes 728 includes an open volume around the screw that passes through it. This open volume may be a slot that allows fixed connector 720 to translate orthogonally (in the plane of the page as drawn) to the motion of movable frame 705 in order to align with floating connector 715 when movable frame 715 moves towards a closed position and thereby connectors 715 and 720 "dock" with each other. The slot is sized so that the heads of the attaching screws cannot pass through the slots, thus fixed connector 720 is "slideably" attached to frame 710.

Fixed frame 707 of window unit 700 also may include an IGU (not shown) including an electrochromic pane (not shown). Connectors, such as connectors 715 and 720 described above, may be used to connect the electrochromic pane of fixed frame 707 to a window controller. A fixed connector having springs 727, or other mechanical devices that may protect the male contacts 725, may not need to be used in the connectors for fixed frame 707, however, as fixed frame 707 may remain fixed and not move from an open position to a closed position.

In some embodiments of a fixed connector and a floating connector for a movable frame mounted in a frame, springs or other mechanisms are not used to cause male contacts 725 to extend from raised surface 726 of fixed connector 720. Instead, for example, a magnetic force is used to cause male contacts 725 of fixed connector 720 to couple with female contacts 719 of floating connector 715. The magnetic force may be provided by either or both of female contacts 719 in floating connector 715 and/or male contacts 725 in fixed connector 720 including magnetic elements, for example. The magnetic elements may be neodymium magnets, for example. A magnetic force between male contacts 725 and female contacts 719 causes male contacts 725 to extend from raised surface 726 and couple to female contacts 719 in floating connector 715 when floating connector 715 and fixed connector 720 are in close proximity to one another. When fixed connector 720 and floating connector 715 are a distance apart from one another, a mechanical device may impart a force on male contacts 725 that causes male contacts 725 to recede into the fixed connector 720, for example, springs that cause male contacts 725 to recede into fixed connector 720 when the magnetic force is sufficiently diminished by separation of fixed connector 720 and floating connector 715.

It should be noted that, as described thus far, when movable frame 705 of window unit 700 is closed, electrical contact is made via the contacts as described. In one embodiment, the movable frame containing the IGU and the frame in which the movable frame resides have a wireless power generator and receiver. In this way, the electrochromic pane can be transitioned even if the movable frame is in an open position. It is convenient to have the wireless power generator in the frame and the receiver in the movable frame containing the IGU and the electrochromic pane, but embodiments are not so limited. Wireless powered electrochromic windows are described in U.S. patent application Ser. No. 12/971,576, filed Dec. 17, 2010, titled "Wireless Powered Electrochromic Windows," which is hereby incorporated by reference in its entirety. In one embodiment, the frame contains a radio frequency (RF) generator for transmitting wireless power and the movable frame contains a receiver for transforming the wirelessly transmitted energy into electrical energy to power the electrochromic pane. In another embodiment, one or more wireless power generators are located away from the electrochromic pane while the receiver is in the movable frame. In other embodiments, magnetic induction is used to generate wireless power for the electrochromic pane.

Figure 8:
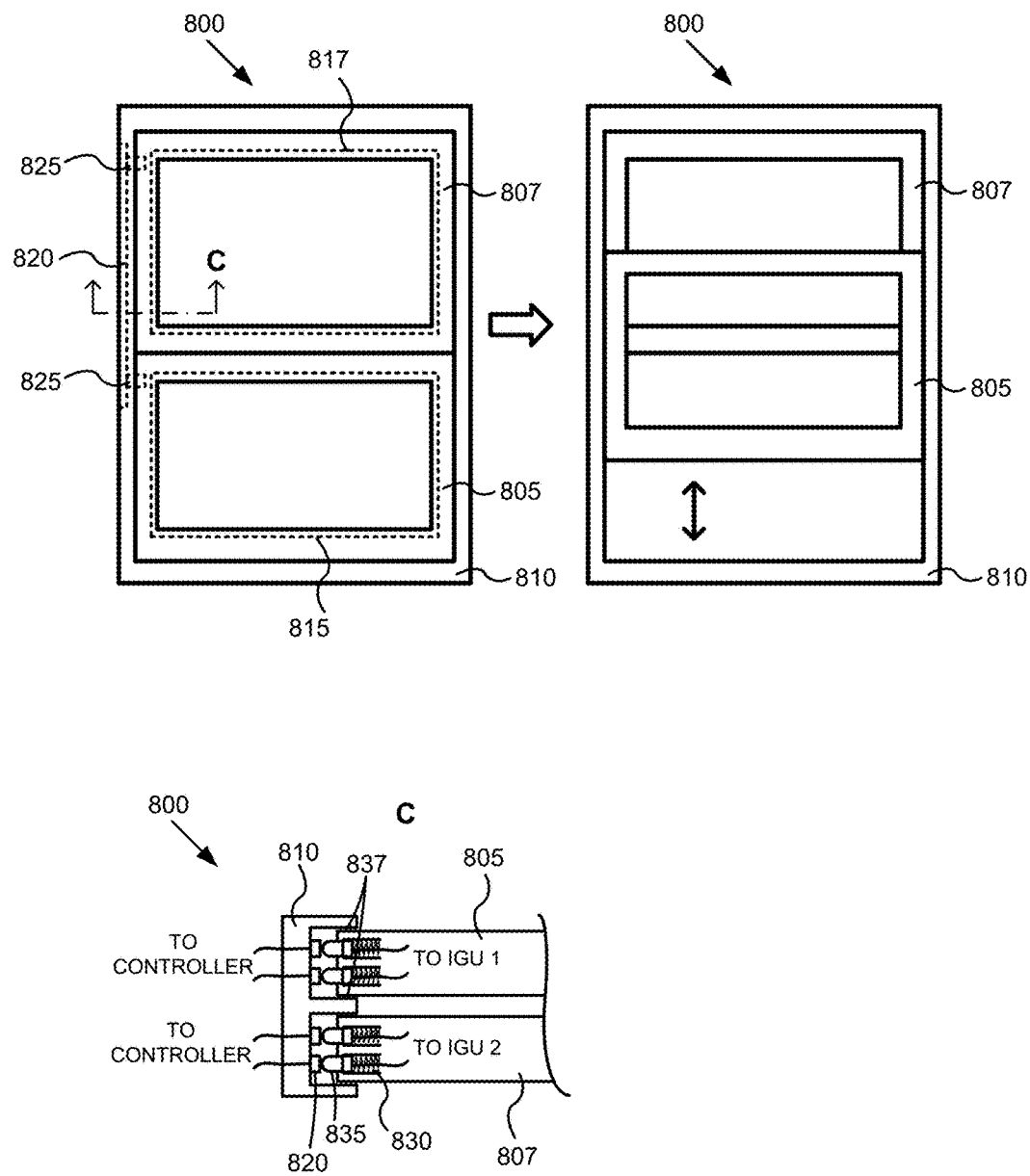
FIG. 8 shows examples of schematic diagrams of a window unit incorporating IGUs including electrochromic panes with detail of a connection configuration for powering the IGUs.

In other embodiments, continuous electrical contact between a frame and a movable frame mounted in the frame is made via connectors with sliding contacts. FIG. 8 includes schematic diagrams of a window unit, 800, which includes IGUs each including an electrochromic pane. FIG. 8 includes front views and a partial cross section of the window unit 800. Cross-section C (lower portion of FIG. 8) is indicated by line C on the front view in the upper left portion of FIG. 8.

Window unit 800 includes a frame, 810, in which a first movable frame, 805, and a second movable frame, 807, are mounted. First movable frame 805 and second movable frame 807 are movably mounted in frame 810 so that they both may move up and down in frame 810. In the window industry, window unit 800 may be referred to as a double hung window and movable frames 805 and 807 may be referred to as movable sashes. First movable frame 805 includes an IGU, 815, including an electrochromic pane (not shown). Second movable frame, 807, includes an IGU 817 including an electrochromic pane (not shown).

To provide electrical connections to the electrochromic panes in each of IGUs 815 and 817, frame 810 includes rails (e.g., two rails for each of movable frames 805 and 807, and additional rails for communication to onboard circuitry if included in the IGU) that are electrically coupled to a window controller when the sashes are installed in frame 810. In this example, each of IGUs 815 and 817 include a floating connector, 825, that electrically connects the bus bars (not shown) of the electrochromic panes to connector pins 835 mounted in movable frames 805 and 807, respectively. Springs 830 or other mechanisms may be associated with connector pins 835 to force connector pins 835 into contact with rails 820 when movable frames 805 and 807 are mounted in frame 810. Note that rails 820 need not, and in this example do not, traverse the entire height of frame 810. This is due to the positioning of connectors 825 mounted in movable frames 805 and 807. By virtue of this placement, electrical connection between pins 835 and rails 820 is maintained throughout the entire slidable range of the movable frames. In some embodiments, rails 820 traverse the entire height of the frame 810, depending on the positioning of connectors 825 in each of the movable frames 805 and 807.

In some embodiments, rails 820 may be a metal. In other embodiments, rails 820 may be carbon or other conductive material, e.g., carbon brushes or woven carbon fibers, e.g., in the form of a compressible tube. In some embodiments, connector pins 835 may be a metal or carbon. Connector pins 835 may also be in the form of brushes. In some embodiments, the interface between rails 820 and connector pins 835 may serve as a weather seal. Further, the motion of movable frames 805 and 807 in frame 810 may serve to clean the surfaces where rails 820 contact connector pins 835 so that electrical contact may be maintained.

Other configurations of rails 820 and connector pins 835 are possible. For example, the rails may be positioned at 837 where a movable frame contacts frame 810. Pins 835 or other conductive surface may be arranged to contact rails 820 positioned at 837.

While FIG. 8 shows a window unit including two movable frames with connectors for connecting the electrochromic panes of the movable frames to a window controller, the connectors also may be used with a window unit including one movable frame or horizontally sliding windows.

In some embodiments of IGU 815 or 817, the IGU may include two electrochromic panes. In this embodiment, to provide electrical connections to the electrochromic panes in each of IGUs 815 and 817, frame 810 may include rails (e.g., four rails for each of the moveable frames 805 and 807, as each electrochromic pane would include at least two bus bars). The rails in the frame may be electrically coupled to a window controller. In one embodiment, the four rails for each movable frame are configured as two pairs, each pair on opposite sides of the movable frame so as to avoid contact due to any play the movable frame may have in the frame in which it resides. In another embodiment, the four (or more) rails associated with each IGU are on the same side of the movable frame, substantially parallel but spaced apart sufficiently so as to avoid contact with another rail's floating connector contacts. Another way to maintain continuous electrical communication between a movable frame mounted in a frame is by direct wiring. Embodiments described herein use flexible wiring, e.g. ribbon cable, to make the electrical connections.

Figure 9A:
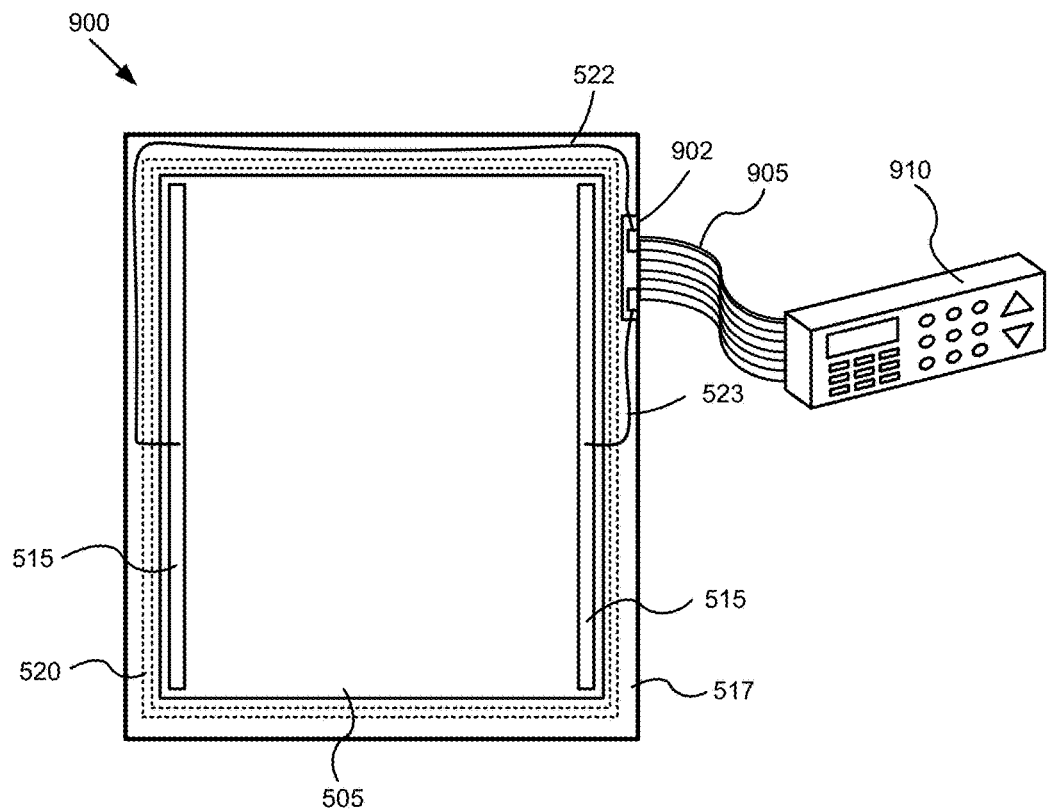
FIGS. 9A-9D show examples of schematic diagrams of IGUs and window units with ribbon cable connector embodiments as described herein.

FIG. 9A shows a schematic diagram of an IGU 900 including an electrochromic pane 505 and an associated ribbon cable 905. The IGU 900 includes an electrochromic pane, 505, having bus bars, 515, which are in electrical communication with an electrochromic device, 517 (for an exemplary cross-section see FIG. 2). Electrochromic pane 505 is matched with another pane (not shown) and attached to the other pane with a separator, 520 (indicated by the dotted lines). Outside of separator 520 is a secondary sealing area. Wires 522 and 523 are connected to bus bars 515 and extend through IGU 900 to a connector, 902. Connector 902 is capable of being connected to a ribbon cable, 905. Ribbon cable 905 may be connected to a window controller, 910. In some embodiments, the ribbon cable may be a cable with many conducting wires running parallel to each other on the same plane. The ends of the ribbon cable may include connectors for connecting to connector 902 and to window controller 910.

In some embodiments, connector 902 may be similar to connector 525 (i.e., connector 902 may include one or more ferromagnetic elements) and ribbon cable 905 also may include one or more ferromagnetic elements for engaging connector 902 with ribbon cable 905. Other mechanisms also may be used to engage connector 902 with ribbon cable 905.

In some embodiments, connector 902 may include a memory device and/or an integrated circuit device. Ribbon cable 905 may include more wires or electrically conductive paths than the two paths needed to electrically connect to bus bars 515 of electrochromic pane 505 so that the window controller can communicate with the memory device and/or the integrated circuit device. In some embodiments, the ribbon cable may have electrically conductive paths for controlling more than one electrochromic pane, as described below. Ribbon cables have advantages including the capability of having multiple parallel wires for carrying power, communication signals etc., in a thin, flexible format.

In some embodiments, IGU 900 includes two or more electrochromic panes. Connector 902 may be capable of providing electrical contact to the bus bars of each of the electrochromic panes (i.e., each electrochromic pane would include at least two bus bars). Thus, in the example of an IGU having two electrochromic panes, the ribbon cable may include four conducting wires running parallel to each other on the same plane for powering the electrochromic panes.

Figure 9B:
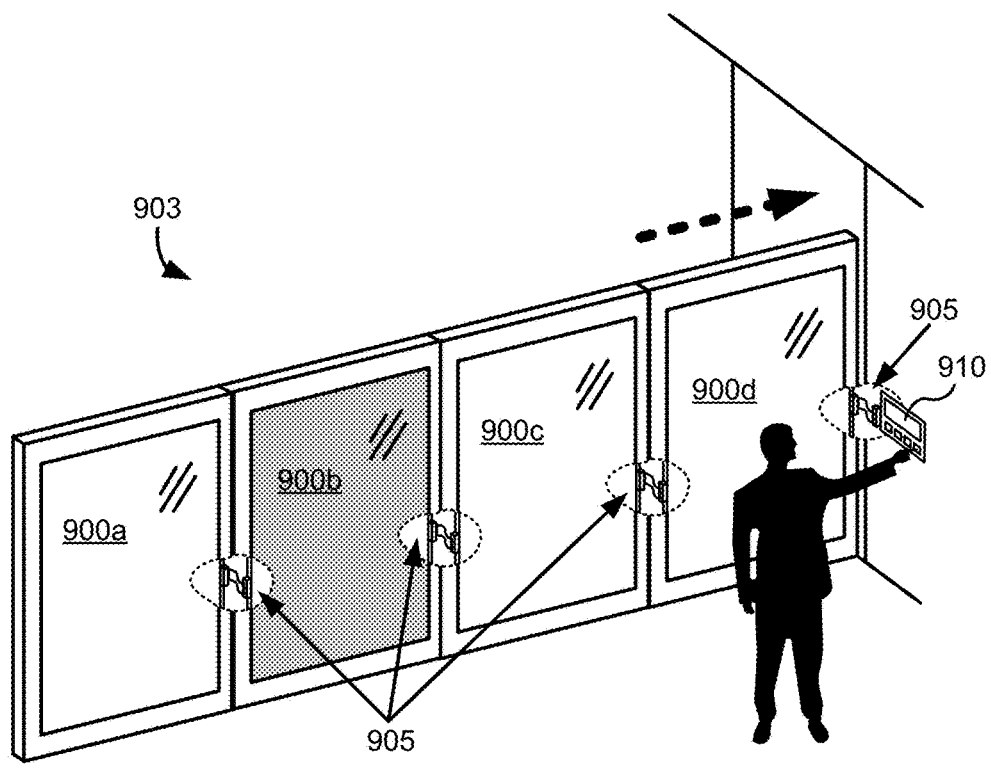
Figure 9B:
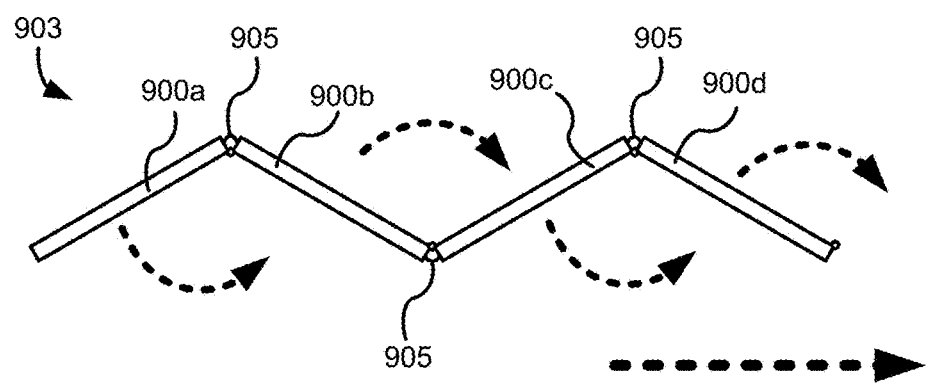

As described above, in certain embodiments, an IGU may include more than one connector. In one embodiment, a second connector or further connectors are redundant and serve the same function as the first connector, such as for facilitating installation of the IGU by providing more flexibility in wiring configurations to the IGU. In other embodiments, the second or further connectors are for connecting the IGU to other IGUs in series or in parallel. In one example, the IGUs are linked via connectors and wiring assemblies in order to function, for example, independently, according to the commands of a single controller. The controller may also include capability to control physical movement of one or more of the IGUs via a movement mechanism. The movement mechanism can include, e.g., components to open or close a window which includes an IGU, and/or components for positioning a folding assembly containing two or more IGUs in windows and/or doors. An illustration of this is depicted in FIG. 9B, which shows a system including a plurality of IGUs, in this case four IGUs, 900*a-d*, incorporated into a folding door system, 903. In this example, system 903 includes four doors, each containing an IGU, 900*a-d*, respectively. The system could include more or less doors and/or IGUs and may include windows as well as doors. The IGUs of system 903 are each independently controlled by a controller 910, e.g., as indicated in FIG. 9B by IGU 900*b* being in a colored state while IGUs 900*a*, 900*c*, and 900*d* are transitioned to a bleached state.

System 903 may be used, for example, in a large conference room as an optional divider when the room is to be bifurcated into two smaller conference rooms. As indicated in the top view (FIG. 9B, lower schematic) the doors containing IGUs 900*a-d* are hinged in order to fold in an accordion fashion and also to translate (as indicated by the heavy dashed arrow), e.g., into a recess in a wall for storage. In this example, controller 910 controls not only the independent transitioning of IGUs 900*a-d*, but also the folding/unfolding of the doors as well as the translation of the doors into the storage position. The mechanism(s) for folding and translating the doors is not depicted in FIG. 9B; however, one of ordinary skill in the art would appreciate that such mechanisms may be commercially available and well known. The mechanisms may include components that require powering via one or more of the doors, and thus the electrical communication in such instances may pass through wiring assemblies, such as ribbon cable assemblies 905 between IGUs 900*a-d*, but this is not necessary. In some embodiments, a controller controls not only the transition of an electrochromic device (i.e., the electrochromic device associated with an IGU), but also, independently, an associated movement of the IGU via a movement mechanism(s).

Referring back to FIG. 9B, controller 910 can accept input manually as depicted and/or wirelessly (e.g., via a remote control device). Controller 910 is in electrical communication with each of IGUs 900*a-d* via ribbon cable assemblies, 905. In this example, each of IGUs 900*b*-900*d* has two connectors, e.g., IGU 900*d* is connected both to controller 910 and to IGU 900*c* via ribbon cables 905 and corresponding connectors in IGU 900*d*. In turn, each of IGUs 900*b* and 900*c* also contain two connectors to which ribbon cables 905 are connected in order to continue the chain of electrical communication. The IGU 900*a* has at least one connector in order to electrically connect to IGU 900*b* via ribbon cable 905. The IGU 900*a* may also have additional connectors, e.g., if it is convenient to produce IGU 900*a* in the same manner as IGUs 900*b-d*, but this is optional, as in this example IGU 900*a* need only have one associated connector.

In this example, independent control of the electrochromic panes in IGUs 900*a-d* is accomplished by connecting the IGUs to the window controller in series. Each of ribbon cables 905 has an appropriate number of wires and associated contacts to accommodate electrical communication, and thus independent control, from controller 910. In certain embodiments, the ribbon cable may include any number of different wires, depending on the IGUs to be controlled, the window controller specifications, the manner in which the IGUs are coupled and, optionally, sensors and also any associated movement mechanisms that must be controlled via the electrical communication lines through the IGUs. In some embodiments, the ribbon cable may include 4, 8, 18, 24, or even more wires. For example, the ribbon cable may include two wires if a number of IGUs are coupled to one another in series and there are not any sensors associated with the IGUs. As another example, the ribbon cable may include four wires if two IGUs are coupled to one another and both IGUs are directly coupled to a window controller.

Figure 9C:
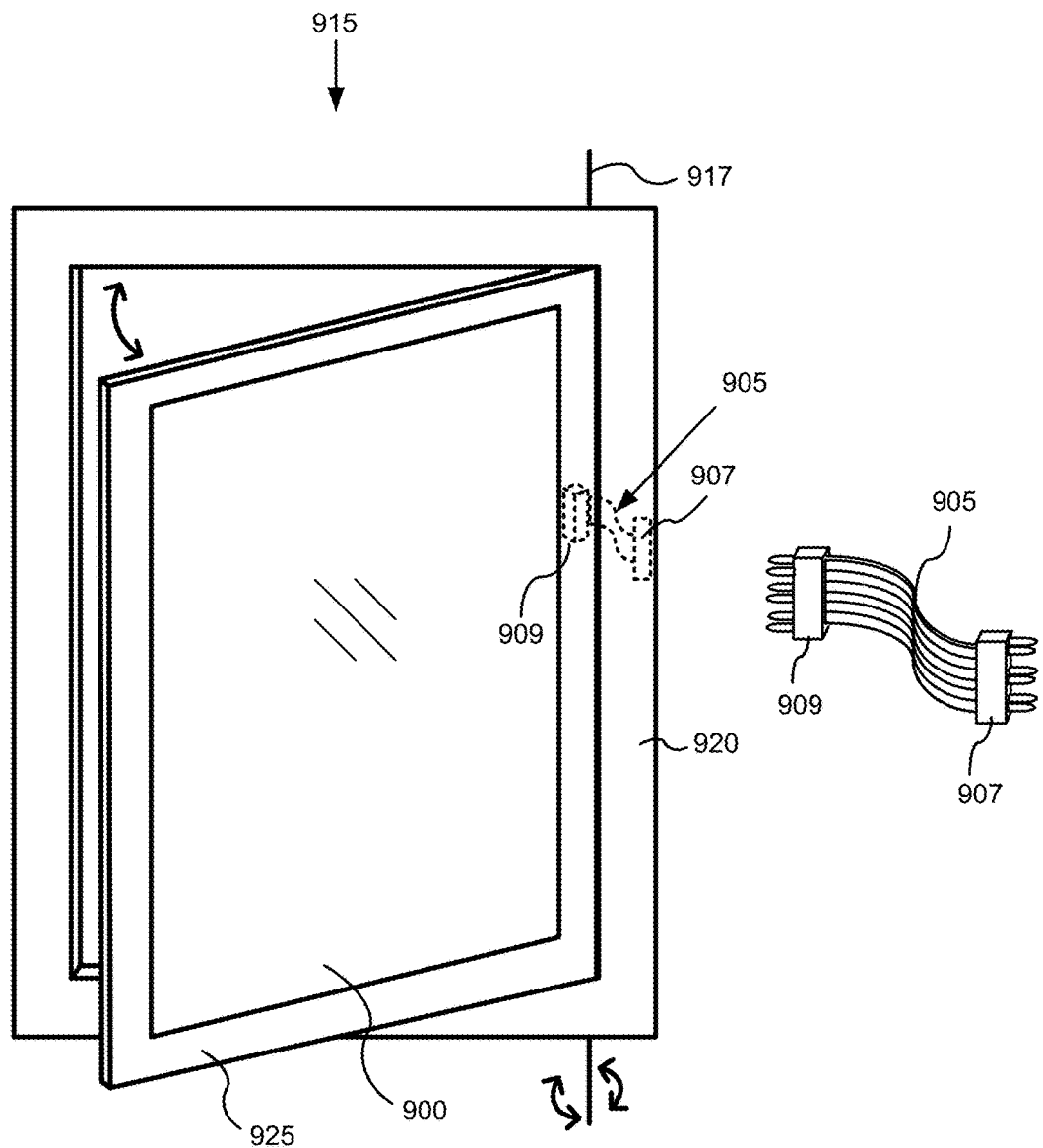

FIG. 9C shows an example of a window unit, 915, incorporating an IGU, 900, including an electrochromic pane. Window unit 915 includes a frame, 920, in which a movable frame, 925, which holds an IGU 900, is mounted. Movable frame 925 may be movably mounted in frame 920 so that it may rotate along an axis of rotation, 917, from a closed position to an open position, for example. In the window industry, window unit 915 may be referred to as a casement window and frame 920 may be referred to as a hinged sash. Movable frame 925 may include IGU 900 including an electrochromic pane (not shown), with electrical connection of the electrochromic pane to a window controller being provided through a ribbon cable, 905. Ribbon cable 905 may allow for rotation of movable frame 925 with respect to frame 920. In some cases, the window controller may not only control the optical transitions of IGU 900, but also, optionally, control a movement mechanism for the window to open and close and related intermediate positioning.

In the illustrated example, ribbon cable 905 includes two male connectors, 907 and 909, for coupling IGU 900 in movable frame 925 to a window controller coupled to frame 920. Many other different types of connectors may be used for a ribbon cable, however. For example, in some other embodiments, the ribbon cable may include a male connector and a female connector, two female connectors, and/or a connector including one or more ferromagnetic elements as described herein.

In some embodiments, the ribbon cable may be a commercially available ribbon cable, and in some embodiments, the ribbon cable may be a specially fabricated ribbon cable having specific connectors. The ribbon cable may include any number of different wires, depending on the IGU 900 and the window controller. For example, the ribbon cable may include up to 4, 8, 18, 24, or even more wires. Two wires may be used to connect a window controller to the bus bars of the electrochromic pane, and the further wires may be used to connect the window controller to sensors, for example, associated with the IGU 900. FIG. 9C depicts a rather simple window movement mechanism, i.e., rotating on an axis in order to open and close. There are more complicated movement mechanisms for which controllers described herein may control and for which more sophisticated wiring assemblies are configured. Some of these are further described below.

Figure 9D:
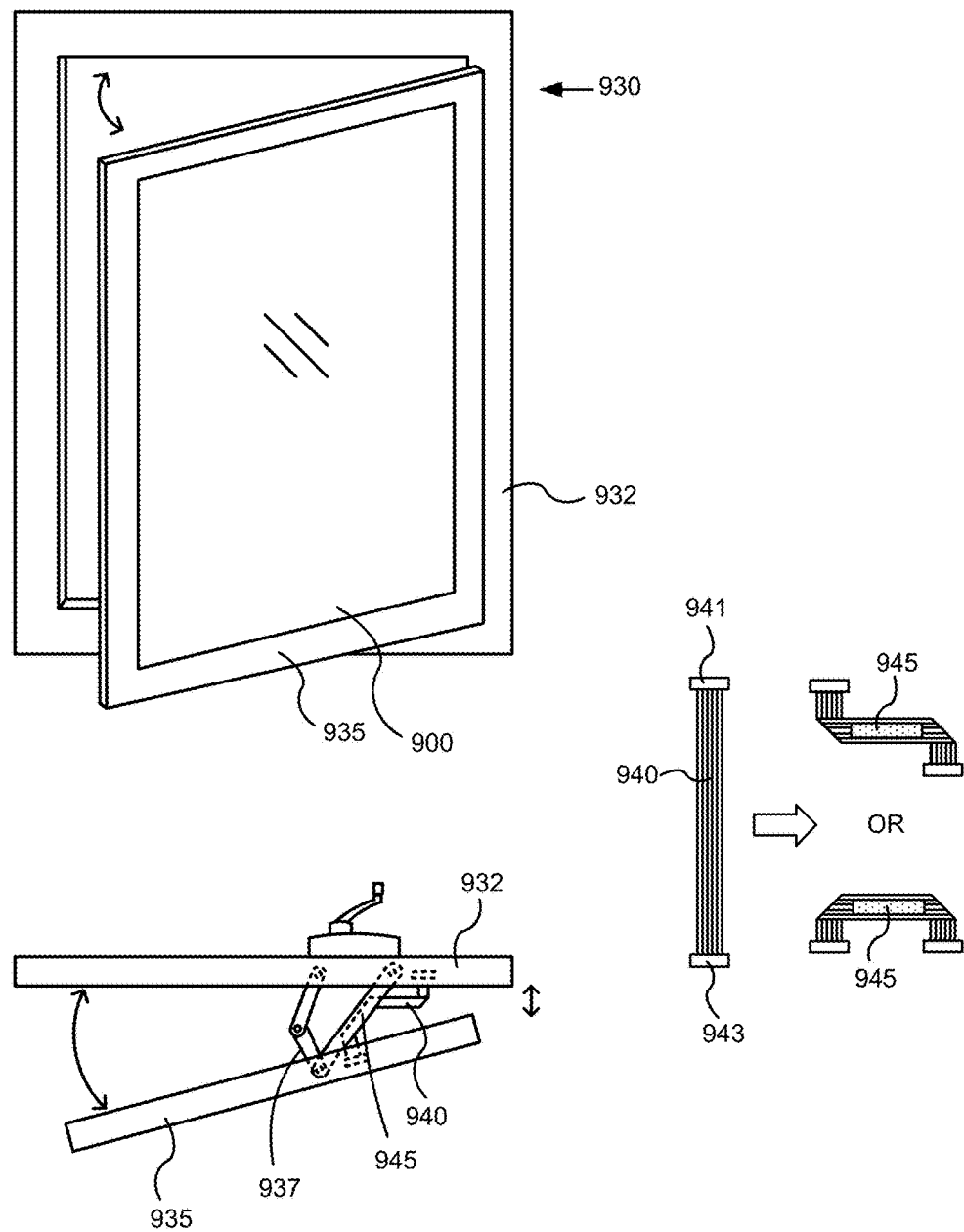

FIG. 9D shows schematic diagrams of a window unit, 930, incorporating an IGU, 900, including an electrochromic pane (not specifically depicted). Window unit 930 includes a frame, 932, in which a movable frame, 935, is mounted. Movable frame 935 is movably mounted in frame 932 so that it may rotate and translate via a movement mechanism, 937, from a closed position to an open position, for example. Although shown with three arms, mechanism 937 may include any number of arms that allow for this rotation and translation. In this example, movement mechanism 937 is a manually operated mechanism, but in other embodiments, the mechanism is driven electrically and, optionally, the controller that controls the transitions of the electrochromic pane(s) in the IGU 900 also controls movement mechanism 937 for a prescribed rotation and translation.

The electrochromic pane(s) of the IGU 900 is in electrical communication with a window controller through a ribbon cable, 940. By virtue of its configuration, ribbon cable 940 allows for rotation and translation of movable frame 935, with respect to frame 932, without becoming entangled in mechanism 937 and also while being aesthetically unobtrusive (i.e. it is at least partially hidden to the user by mechanism 937). Ribbon cable 940 may include two connectors 941 and 943, similar to ribbon cable 905, for coupling the electrochromic pane in IGU 900 in movable frame 935 to a window controller, e.g. via wiring through frame 932. Again, many different types of connectors may be used for the ribbon cable 940. In some embodiments, ribbon cable 940 may be partially or fully attached to an arm or arms of mechanism 937. Ribbon cable 940 may be attached to an arm of movement mechanism 937 with an adhesive, 945, for example. Other ways of attaching the ribbon cable to a component of mechanism 937 are possible, however, including brackets, clips and Velcro, for example. As shown, ribbon cable 940 may include one or more folds such that it conforms to accommodate the configuration of mechanism 937. For example, ribbon cable 940 may include the folds shown in the two illustrations in FIG. 9D, rightmost portion. Ribbon cables are well suited for such applications because they are relatively flat and can be folded without breaking the wires within the ribbon.

In certain embodiments, a ribbon cable similar to the ribbon cable 905 or 940 is used for a window or door unit including a movable frame that translates, which is typically referred to as a "slider" in the window and door industry. In these embodiments, the slider unit (also called a sliding door assembly) may comprise a fixed outer frame and a movable window or door frame sliding coupled within the fixed outer frame. The slider further comprises a fixed window or door frame, which is mounted to the fixed outer frame. The movable frame may include an IGU including a pane with an optical device such as an electrochromic pane. The movable frame may be movably coupled within the fixed outer frame so that it may translate, generally, but not necessarily, in a horizontal translation. For example, a "double hung" window could also be considered a slider in this context, and thus would be configured for vertical translation. A ribbon cable allows for translation of the movable frame with respect to the fixed frame, while maintaining electrical communication between a controller and the optical device in the movable door or window.

Figure 9E:
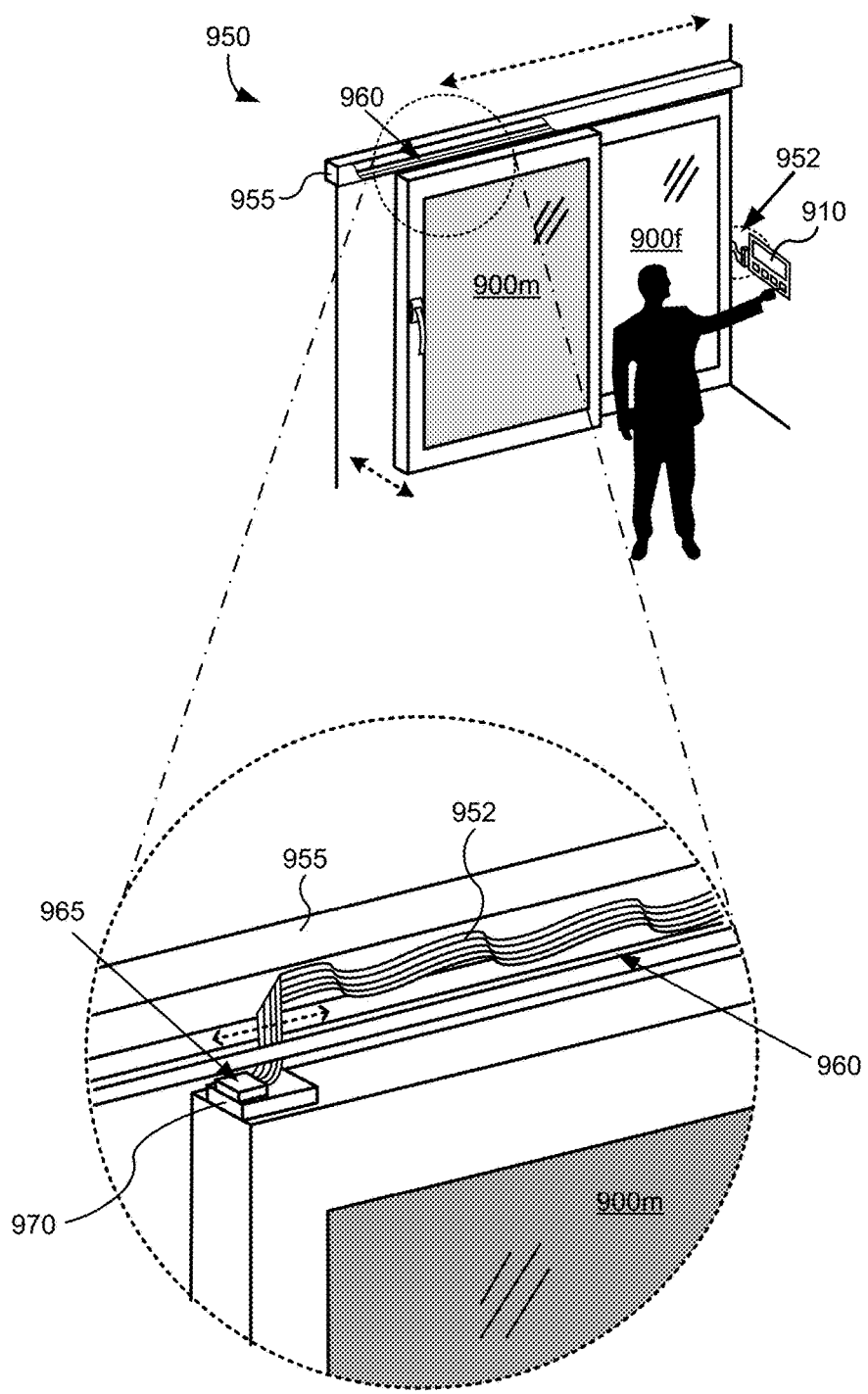
FIG. 9E shows an example of a schematic diagram of a sliding door with a ribbon cable connector system.

FIG. 9E depicts a schematic including an embodiment of a sliding door assembly, 950. Assembly 950 includes a fixed door, 900f, and a movable door, 900m. Movable door 900m is slideably engaged with a guide, 955, e.g., a track in which a skate connected to movable door 900m can move within guide 955. Guide 955 includes a slot, 960, which allows a portion of a ribbon cable 952 (for clarity, the ribbon cable 952 and connector 965 components are shown only in detail in the bottom portion of FIG. 9E) to pass unobstructed during translation of movable door 900m. In this rendering, the front face of guide 955 is depicted as removed to reveal slot 960. In this example, movable door 900m may travel parallel to fixed door 900f, as indicated by the long dotted arrow above doors 900f and 900m. In other embodiments, movable door 900m, with appropriate configurational modifications to guide 955, may also travel orthogonally to a plane parallel to the doors, as indicated by the small dotted arrow near the bottom left corner of movable door 900m in the upper portion of FIG. 9E. For example, like doors common in Europe, the movable door 900m may also translate "in" and "out" orthogonally to the path parallel to the fixed door (or wall), such that the two doors are substantially in the same plane when the slider unit is closed, and parallel and adjacent when the slider unit is open. During this "in" and "out" motion, the face of movable door 900m may be parallel to the fixed door (or wall if there is only one door), or it may be at an angle, where one end, e.g. the top or bottom end, of the door translates in or out but the other end remains substantially in the same position, thus "tilting" doors are contemplated. In some of these embodiments with "in" and "out" motion, guide 955 may also have an additional slot (not depicted), e.g., in the (front) side depicted as open to reveal slot 960, and a portion of the base and top, to allow ribbon cable 952 to disengage with the guide 955 and travel outward with the movable door 900m. In one embodiment, there is also a mechanism to ensure that the movable door 900m can only tilt back along substantially the same path so that the cable must pass back through the additional slot in order to again be positioned within slot 960.

The bottom portion of FIG. 9E shows further detail, including ribbon cable 952 a portion of which passes through slot 960. A major portion of ribbon cable 952 resides inside a recess of the guide 955, which may be, e.g., a rectangular channel, having slot 960 at the base and running the length of the channel. Near the end portion of the ribbon cable 952 that connects to movable door 900m, a fold is made in ribbon cable 952 so that the cable's flat portion can run parallel to (as indicated by the dotted arrow) and translate through slot 960 when movable door 900m is translated. A connector, 965, at this end of ribbon cable 952, such as, for example, a pin connector (e.g., 5-pin connector) as described herein, engages with a socket, 970, in order to deliver power and communications to the EC device(s) or other optically switchable device(s) in movable door 900m. Appropriate clips, clamps and the like may be used to ensure the fold in ribbon cable 952 remains and that the portion of ribbon cable 952 that traverses slot 960 (from inside guide 955 to outside and under in this case, guide 955) does not rub against the edges of slot 960. Guide 955 may support the weight of movable door 900m via a skate or other mechanism; there may be a mechanism (not shown), e.g., rollers, under movable door 900m, or both. Movable door 900m may be driven by an electric drive, which also may be part of the window control system, 910. In one embodiment, the face of ribbon cable 952 is configured substantially horizontal inside guide 960. In another embodiment, the face of ribbon cable 952 is configured substantially vertical inside guide 960. It has been found that ribbon cable 952, by virtue of is inherently serpentine and flexible nature, remains inside the body of guide 955 and does not pass through slot 960 when oriented vertically. That is, the bottom edge of the major portion of ribbon cable 952 may rest on the base of guide 955 during translation of movable door 900m and not pass through slot 960 because the serpentine nature of the ribbon cable ensures that its bottom edge only crosses slot 960, it does not align parallel with the slot and therefore fall through slot 960. Thus the portion of ribbon cable 952 that passes through slot 960 in order to engage with connector 965 is the only portion that passes through slot 960. Because of this, and the relatively light and robust construction of the ribbon cable, generally very little, if any, wear to the ribbon cable occurs, as a result of using the slider mechanism.

In one embodiment, the ribbon cable exits the guide through one of the ends of the guide. For example, as depicted in FIG. 9E, ribbon cable 952 exits channel 955 at the end distal to movable door 900m, and is configured appropriately in the wall, and connects to controller 910. The other end of ribbon cable 952 bears a connector, similar if not the same as connector 965, in order to connect with controller 910.

Figure 9F:
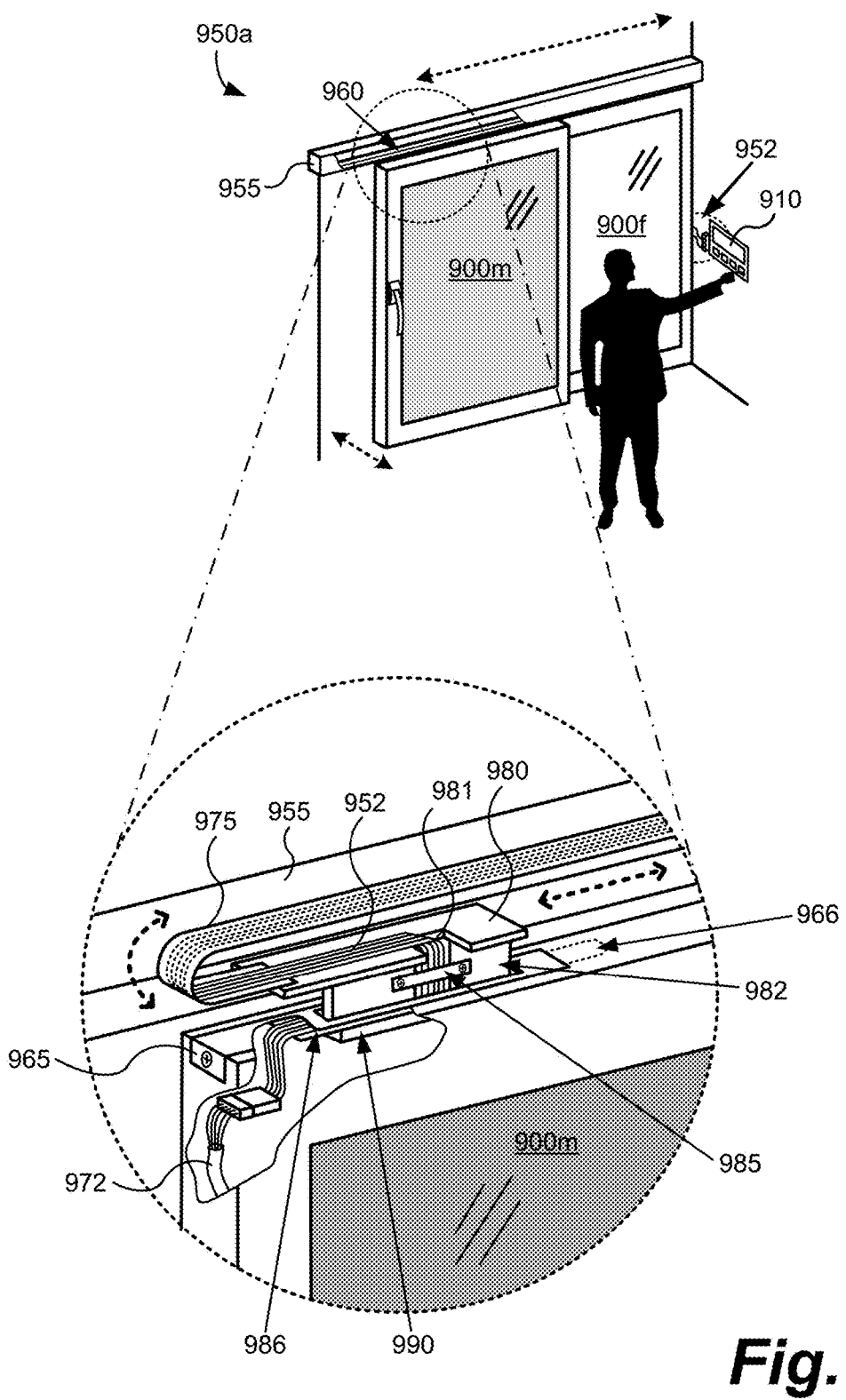
FIG. 9F shows an example of a schematic diagram of a sliding door with another ribbon cable connector system.

FIG. 9F is a schematic drawing depicting an embodiment including a sliding door assembly, 950a, comprising an electrical connection system. Although this example and others are described with reference to a movable door, a movable window may be used. Sliding door assembly 950a comprises a fixed door, 900f, and a movable door, 900m. Movable door 900m is slideably engaged with a guide, 955, e.g., a track in which a shuttle, 980, slideably connected to movable door 900m, can move within guide 955. Guide 955 includes a lengthwise slot, 960, which allows a portion of a ribbon cable 955 (for clarity, the ribbon cable 955 and connector 965 components are shown only in detail in the bottom portion of FIG. 9F) to pass unobstructed during translation of movable door 900m. In the top portion of FIG. 9F, the front face and top of guide 955 are depicted as removed to reveal slot 960. In this example, movable door 900m may travel parallel to fixed door 900f, as indicated by the long dotted arrow above doors 900f and 900m. In other embodiments, movable door 900m, with appropriate configurational modifications to guide 955, may also travel orthogonally to a plane parallel to the doors, as indicated by the small dotted arrow near the bottom left corner of door 900m in the upper portion of FIG. 9F. For example, like doors common in Europe, the movable door 900m may also translate "in" and "out" orthogonally to the path parallel to the fixed door (or wall), such that the two doors are substantially in the same plane when movable door 900m is closed, parallel and adjacent when movable door 900m is open. During this "in" and "out" motion, the face of movable door 900m may be parallel to the fixed door (or wall if there is only one door), or it may be at an angle, where one end, e.g. the top or bottom end, of the door translates in or out but the other end remains substantially in the same position, thus "tilting" doors are contemplated. In some of these embodiments, guide 955 may also have an additional slot (not depicted), e.g., in the (front) side depicted as open to reveal slot 960, and a portion of the base and top, to allow ribbon cable 952, along with shuttle 980, to disengage with the guide 955 and travel outward with the movable door 900m. In one embodiment, there is also a mechanism to ensure that the movable door 900m can only tilt back along substantially the same path so that the cable and shuttle 980 must pass back through the additional slot in order to again be positioned within slot 960 of guide 955. During movement of the sliding door or window, the one or more wires are configured with the other components of the movable door 900m to try to avoid interaction of the one or more wires with the guide and/or with the moving components of the sliding door assembly, 950a. In this case, the interaction being avoided may refer to, for example, the one or more wires contacting and located between two or more moving components, or the one or more wires contacting the guide and/or contacting one or more moving components.

The bottom portion of FIG. 9F shows further detail, including a ribbon cable, 952, a portion of which passes through shuttle 980 in order to deliver power and communications to the EC device(s) or other optically switchable device(s) in movable door 900m. A major portion of ribbon cable 952 resides in a recess inside guide 955. The guide 955 may be, for example, a rectangular channel and the ribbon cable 952 may reside within the recess of the rectangular channel section. The guide 955 comprises a slot 960 at the base and running the length of the channel. In this illustrated example, ribbon cable 952 is electrically connected to a connector cable, 972, which includes a connector for mating with a connector of ribbon cable 952. The connector cable 972 goes to a round cable having five wires that terminates in a 5-pin connector (not shown) for mating with the connector (e.g., a pigtail connector) at an end the IGU wiring to the bus bars of the EC device(s) or to other optically switchable device(s) of the movable door 900m. In other embodiments, the connector cable 972 connects directly to ribbon cable 952. Connector cable similar to connector cable 972 may also be used at the other end of ribbon cable 952 after it exits guide 955, and/or may also be used within guide 955 and then exits guide 955.

Referring to the detailed, lower portion of FIG. 9F, only the rear side of slot 960 is depicted so that details of a shuttle, 980, are shown. Near an end portion of the ribbon cable 952 that connects to the movable door 900m, shuttle 980 includes a horizontal top surface onto which a portion of a flexible tape, 975, is affixed. Ribbon cable 952 is affixed to flexible tape 975. Ribbon cable 952 is affixed to the top surface of the portion of the flexible tape 975 that is affixed to the top of shuttle 980. Flexible tape 975 is bent back forming a bend portion, along a curve (indicated by the curved double headed arrow). This bending allows flexible tape 975 and the ribbon cable 952 affixed thereon to pass back over itself and reside substantially parallel to itself and to the top surface of guide 955 where it is affixed, e.g., at the distal end of guide 955. In addition, this bending allows the flexible tape 975 and the ribbon cable 952 affixed thereon to extend inside guide 955 and parallel to the top surface of guide 955. Thus ribbon cable 952 is affixed to the underside of that portion of flexible tape 975 (as indicated by the dotted lines). Ribbon cable 952 extends along the top surface of shuttle 980, and a fold is made in cable 952 so that a portion of the ribbon cable's flat portion is substantially vertical to pass through a vertical channel 981 in shuttle 980 and through an aperture in a base plate, 965, for shuttle 980. Base plate 965 is affixed to door 900m e.g., via a screw (depicted) and a tab, 966, that inserts into a portion of movable door 900m in order to secure that end of base plate 965. A cover, 985, may be used to secure the vertical portion of ribbon cable 952 that passes through the vertical channel 981 in the body of the shuttle 980. In this illustrated example, a vertical portion of the shuttle body with vertical channel 981 passes through an aperture in base plate 965, so that shuttle 980 can be moved vertically within the aperture for ease in installing the shuttle 980 into slot 960 of guide 955 (e.g. guide 955 is open on the end so that shuttle 980 may be inserted into slot 960 and then an end cap installed on guide 955).

The body of shuttle 980 is configured to couple to movable door 900m and slideably engage with slot 960 in guide 955. A top portion of the body of shuttle 980 prevents shuttle 980 from passing vertically downward through slot 960, and a bottom portion of the body of shuttle 980 prevents shuttle 980 from passing vertically upward through the aperture in base plate 965 affixed to movable door 900m. In this way, shuttle 980 may slideably engage with movable door 900m while movement of the shuttle 980 in the vertical direction may be restricted. The body of the shuttle 980 is also configured to slideably engage within slot 960 to slide in the horizontal direction. That is, while engaged with movable door 900m, the shuttle 990 may slide in the horizontal direction within the slot 960. Shuttle 980 may be constructed of a plastic material so as to slide easily within slot 960, but sturdy enough to support the weight of movable door 900*m*.

In another embodiment, the sliding door assembly 950*a* may comprise another shuttle, similar to shuttle 980, at the opposite top end of movable door 900*m* that also resides in slot 960. This other "dummy" shuttle need not make any contact with the ribbon cable 952, but rather may serve as an additional support for the weight of movable door 900*m* and as a sliding mechanism for the movable door 900*m*. In this case, the first shuttle 980 may not need to support the full weight of movable door 900*m*, or may support little to no weight of movable door 900*m*.

Referring back to FIG. 9F, after passing through the vertical channel 981 in shuttle 980, ribbon cable 952 is folded back on itself so as pass through a guide slot, 986, on the underside of base plate 965. Ribbon cable 952 may pass through a horizontal channel in the bottom portion of shuttle 980 that prevents shuttle 980 from passing vertically through the aperture in base plate 965. Thus the ribbon cable is protected from interaction between the underside of base plate 965 and shuttle 980. Ribbon cable 952 is also protected by virtue of being affixed to flexible tape 975, which may be, e.g., a curved spring steel tape, similar to those used for tape measures. In other embodiments, the material used for the ribbon cable 952 may be sufficiently rigid, yet flexible, (e.g., similar to a curved spring steel tape) such that flexible tape 975 is not needed. In other embodiments, an energy chain is used to support wiring such as a ribbon cable 952, rather than a flexible tape. In such embodiments, the mechanisms are substantially the same, but ribbon cable 952 may be substituted for standard wires as the energy chain will both protect and support the wire(s) within its body. Energy chains are commercially available, e.g., in plastic form, by Igus, Inc. of Providence R.I. Although flexible tape 975 is used in this example, other flexible members may be used.

In one embodiment, the ribbon cable exits the guide through one of the ends of the guide. For example, as depicted in FIG. 9F, ribbon cable 952 may exit guide 955 at an end distal to movable door 900*m*, which is configured appropriately in the wall, and ribbon cable 952. The distal end of ribbon cable 952 bears a connector, which may be similar if not the same as connector 965 (shown in FIG. 9E). The connector is used to connect with a controller 910, which is electrically connected to a power source, or to connect directly with a power source.

Certain embodiments pertain to a ribbon cable connection system for a sliding door or window. The ribbon cable connection system comprises a guide, the guide is configured to house a ribbon cable, wherein a first portion of the ribbon cable exits the guide through a slot in the guide. The first portion of the ribbon cable is configured to traverse along and within the slot during translation of a connector when the connector is affixed to the sliding door or window. In one embodiment, the slot is at the base of the guide. In one embodiment, the guide is a rectangular channel. In one embodiment, the guide further includes an aperture at one end for the ribbon cable to exit the guide. In one embodiment, the guide is configured to allow translation of the first portion of ribbon cable both parallel with the length of the guide and also perpendicular to the length of the guide. In one embodiment, the sliding door or window includes a switchable optical device. In one embodiment, the switchable optical device is an EC device. In one embodiment, the sliding door or window includes an alarm system. In some cases, a ribbon cable comprises an over-molded jacket.

Systems and apparatus described herein for sliding door and/or window applications need not be mounted and the movable door/window moved horizontally as, for example, depicted and described in relation to FIGS. 9E-9H. One of ordinary skill in the art would recognize that, e.g., vertically mounted, vertically moved and/or vertically oriented systems and apparatus are also contemplated herein. Also although FIGS. 9B-F describe apparatus that include a ribbon cable, embodiments where a non-ribbon type cable may be used are also contemplated. An example of a cable management system for sliding windows and/or door applications with, e.g., a non-ribbon type cable is described in relation to FIGS. 9G and 9H.

Figure 9G:
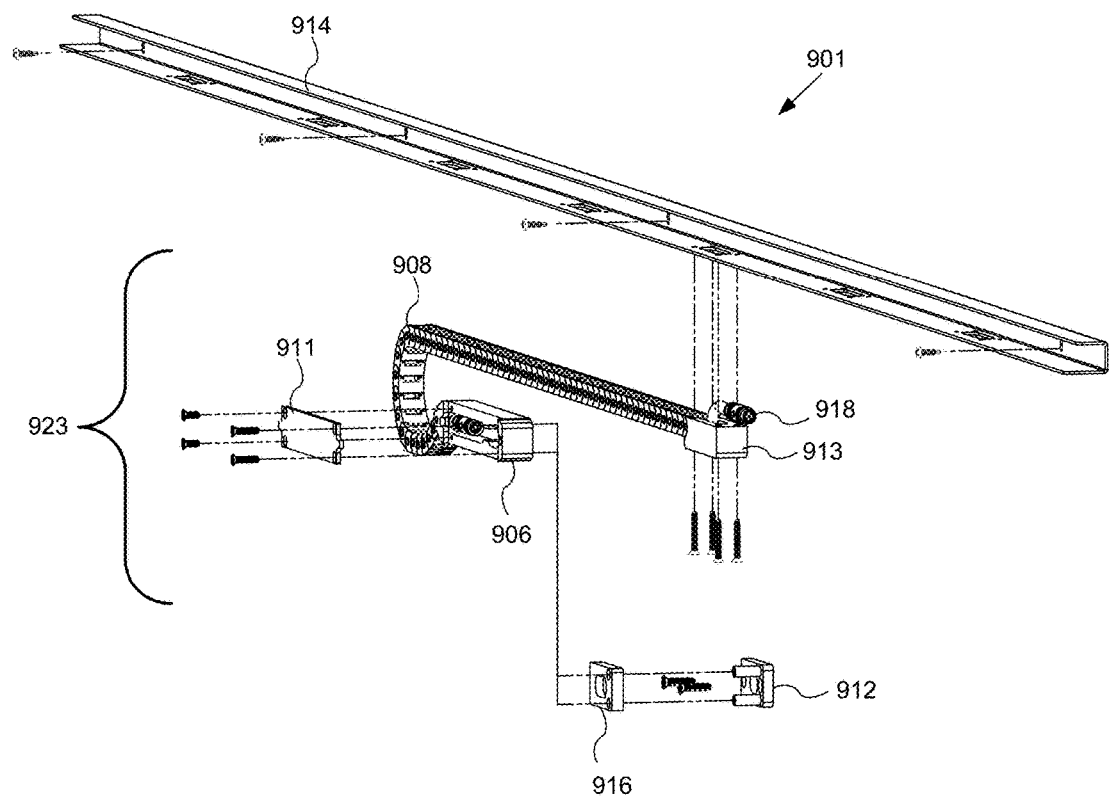
FIGS. 9G and 9H depict perspective views of a power/communications cable management system for movable doors or windows.
Figure 9H:
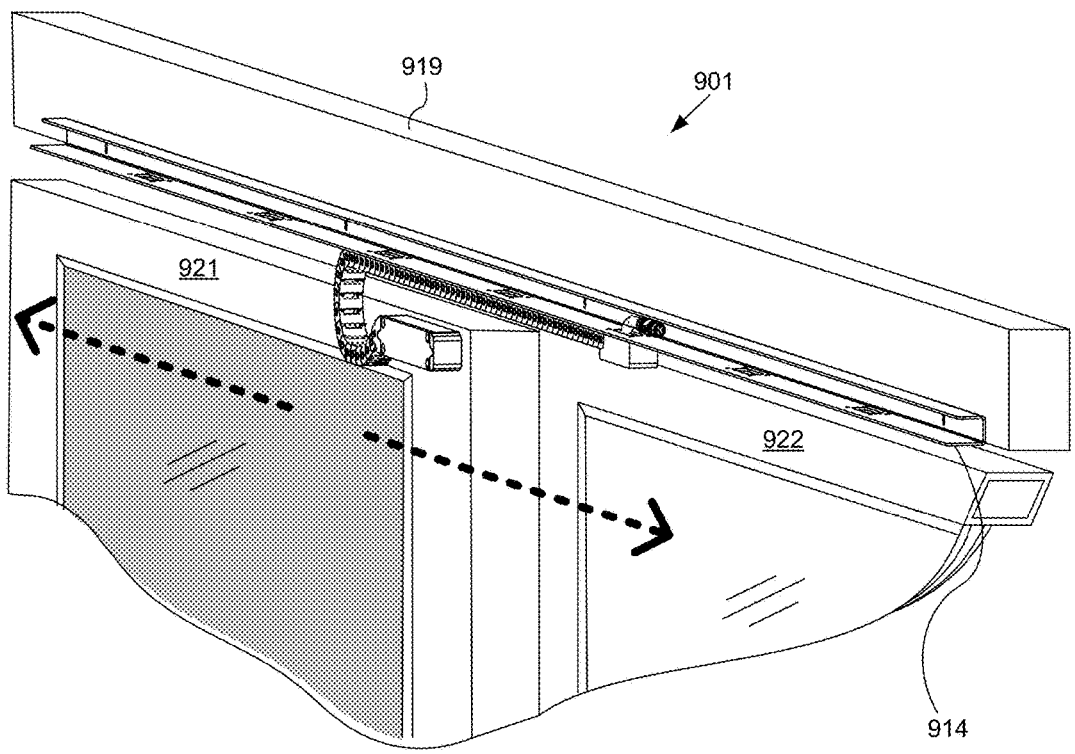

FIGS. 9G and 9H depict drawings of an embodiment including a cable management system, 901. Referring to FIGS. 9G and 9H, cable management system 901 can refer to a sliding IGU cable management system that provides a flexible connection for power and control to a movable door or window. FIG. 9G is an exploded view drawing of cable management system 901. FIG. 9H is a drawing of a perspective view of cable management system 901 attached to a movable (sliding) door, 921. Cable management system 901 is configured to guide movement of and protect an IGU connector cable, 918, as movable door 921 is opened and closed (as indicated by the heavy dashed arrows in FIG. 91H) e.g., past a fixed door 922. This is accomplished, in the embodiment depicted, using a connector cable carrier 923 comprising a base bracket 913, a chain guide 908, a cover plate, 911 and a frame bracket 906. The connector cable carrier 923 is mounted on one end, using frame bracket 906 to the rail or stile of the frame (door or window) of movable door 921, and on the other end, using base bracket 913, to an optional base rail, 914, that is installed, typically, on a door header, 919, that provides connection to an IGU controller (not shown).

A cover, also not shown, is typically installed over the connector cable carrier 923 and base rail 914 to conceal the mechanism to the end user, for aesthetics, and to prevent users from interaction with the system. Although the base rail 914 is an optional, it may be desirable to include this feature in the cable management system 901 since it may protect the cable running from the door header 919 into connector cable carrier 923.

In this illustrated example, connector cable carrier 923 includes a chain guide, 908. Chain guide 908 may be made of plastic, for example. Chain guide 908 may connect frame bracket 906 to base bracket 913. Connector cable carrier 923 may include a recess or other feature that can house a portion (e.g., middle portion between two opposing ends) of the IGU connector cable, 918. As movable door 921 translates, chain guide 908 protects IGU connector cable 918 while flexing and allowing free horizontal movement of the movable door 921. The IGU connector cable 918, in this example, is a 5 wire shielded cable, with 5-pin connectors at each end. A portion of IGU connector cable 918 protrudes from base bracket 913 for introduction into base rail 914 via an aperture in base rail 914. Base rail 914 is typically configured with a plurality of such apertures, as depicted in FIGS. 9G-9H, for flexibility in installation applications. Although the IGU connector cable 918 is depicted as a 5 wire shielded cable in the illustrated example, other connector cables, such as a ribbon cable, can be used.

In the illustrated example, the other end of IGU connector cable 918 is nested in a cavity of frame bracket 906. An optional cover plate, 911, may be used to enclose the cavity once the IGU connector cable 918 is connected. Base rail 914 allows a cable from a window controller to run within the base rail 914 and connect to IGU connector cable 918. Although shown as a U-channel section, the base rail 914 could also be a pipe or square channel or an angle stock, for example, where the cable rests on a horizontally configured side of the angle stock.

Although not shown, typically an IGU pigtail will emanate from an aperture in the door stile and pass through an aperture in mount 912, which is affixed to the door stile. That is, a cable from an IGU controller is run through base rail 914 where it connects with connector cable 918 and the other end of connector cable 918 connects to an IGU pigtail. An optional spacer, 916, may be used between mount 912 and frame bracket 906 if needed. Connector cable carrier 923 allows movement of the movable door 921 while protecting IGU connector cable 918.

In certain embodiments, cable carrier 923 does not include chain guide, 908. In one embodiment, a flexible cable conduit protects the IGU connector cable running between frame bracket 906 and base bracket 913. The flexible cable conduit may or may not be attached to the frame bracket 906 and/or the base bracket 913. In certain embodiments, the connector cable 918 itself is the only component running between frame bracket 906 and base bracket 913. In one embodiment, a ribbon cable with an over-molded jacket is used.

In certain embodiments, an electrical connection system of a sliding door assembly comprises a guide (e.g., 955) and a shuttle (e.g., 950). Although described with respect to a movable door, the electrical connection system can be used with a movable window. The guide comprises a recess within which pass one or more wires for electrical communication between at least a power source and an optically switchable device in the sliding door or window. The guide further comprises a bottom surface and a lengthwise slot in the bottom surface. The shuttle is configured to couple to the movable door or window and slideably engage with the lengthwise slot in the guide, the shuttle further configured to pass the one or more wires from the sliding door or window, through a body of the shuttle into the recess in the guide, wherein during movement of the sliding door or window, the one or more wires are protected from interaction with one or more moving components. In some cases, the electrical connection system further comprises a flexible member (e.g., (e.g., flexible tape 975 or chain guide 908) affixed at one end to the shuttle. In these cases, the one or more wires may be coupled to the flexible member and the flexible member comprises a bend portion allowing the flexible member to pass back over itself and reside substantially parallel to the length of, and inside, the guide. In one case, the one or more wires are a ribbon cable and the flexible member is a spring steel tape. In another case, the flexible member is a chain guide made of a non-electrically conducting material, and the one or more wires reside within the body of the chain guide. In either of these cases, the shuttle may be slideably engaged with the sliding door or window in the vertical direction. For example, a vertical portion of a body of the shuttle may pass through an aperture in the base plate affixed to the sliding door or window. In one case, the guide further comprises an open end so that the shuttle may be inserted into the slot through the open end of the guide during assembly of the electrical connection system.

In certain embodiments, an electrical connection system of a sliding door assembly comprises a frame bracket (e.g., 906) and a base bracket (e.g., 913). The frame bracket may be configured to couple to the sliding door or window. The base bracket may be configured to couple to a header of the sliding window or door, or to a base rail. In these embodiments, the frame bracket and base bracket are configured to house opposing ends of an IGU connector cable (e.g., 918). In one embodiment, the IGU connector cable is a ribbon cable. In one example, the ribbon cable may comprise an over-molded jacket. In another embodiment, a middle portion of the IGU connector cable (i.e. a portion between the opposing ends) is housed with a flexible conduit between the frame bracket and the base bracket. In another embodiment, the electrical connection system further comprises a base rail (e.g., 914). In one example, the base rail may comprise a U-channel. In another example, the base rail may comprise comprises one or more apertures, wherein at least one aperture is configured to register with an aperture in the base bracket such that one end of the IGU connector cable passes through the aperture in the base bracket and the at least one aperture of the base rail. In another embodiment, the frame bracket comprises an aperture for receiving an IGU pigtail into a recess of the frame bracket to electrically connect to an end of the IGU connector cable housed within the recess. In one case, the aperture is in outer surface of the frame bracket coupled to a frame of the sliding door or window and/or the frame bracket further comprises a separate mounting element for coupling to a frame of the sliding door or window. In some cases, the IGU connector cable is a 5 wire cable. As described above, where a connector is configured within an IGU may be important when considering where to attach wiring connectors to the IGU. Flexibility in attaching wiring assemblies to an IGU can significantly reduce wiring complexity and length, and thus save considerable time and money, both for fabricators and installers. One embodiment is an electrical connection system including a track, the track including two or more rails that provide electrical communication, via wiring and bus bars, to the electrodes of an electrochromic device of the IGU. The track is, e.g., embedded in the secondary sealing area of the IGU. An associated connector engages the rails and thereby makes electrical connection to the rails. A non-limiting example of the track described above is described in relation to FIGS. 10A and 10B.

Figure 10A:
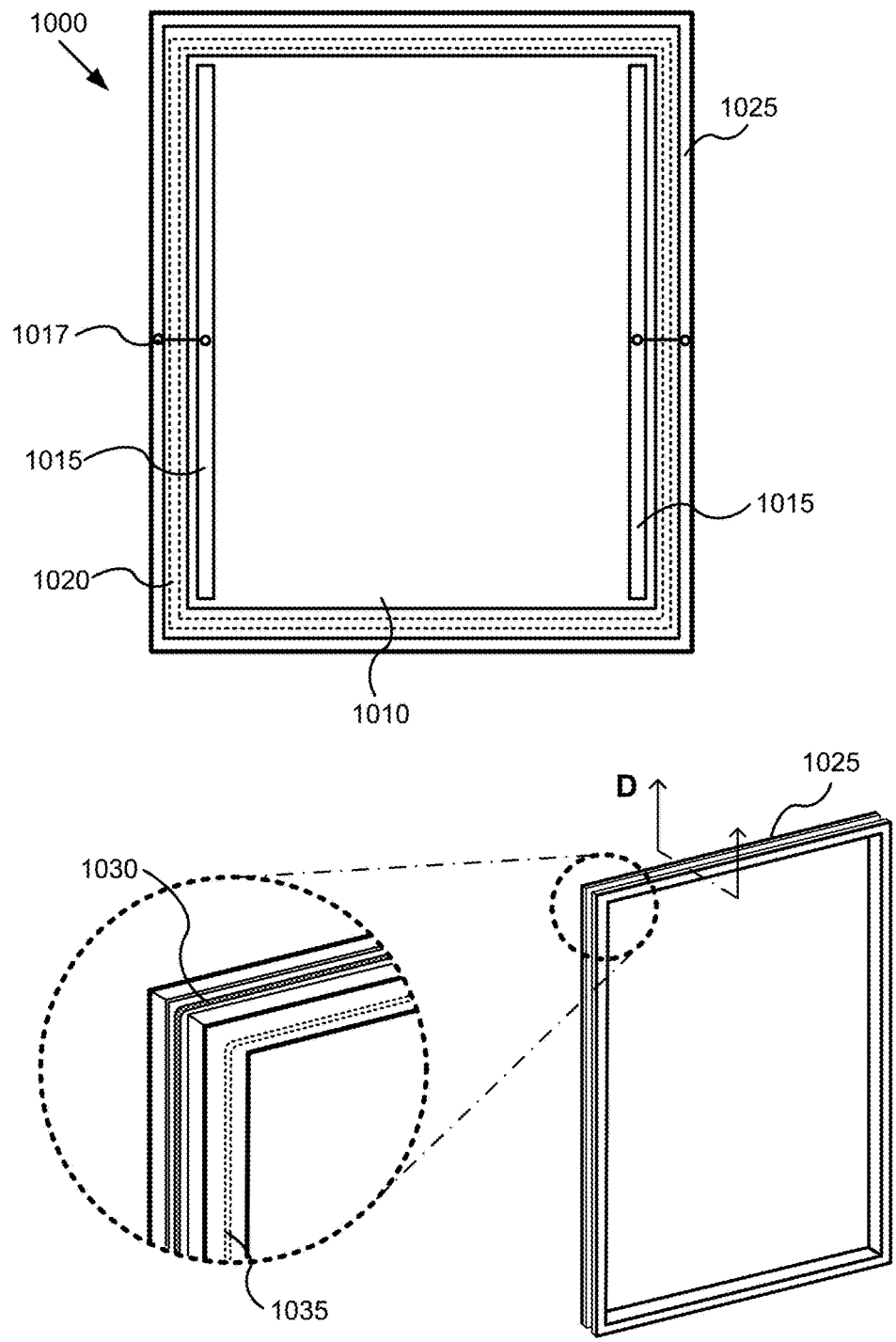
FIGS. 10A and 10B include schematic diagrams of an IGU with a frame that may serve as both as a secondary sealing element and an electrical connector for an electrochromic pane of the IGU.
Figure 10B:
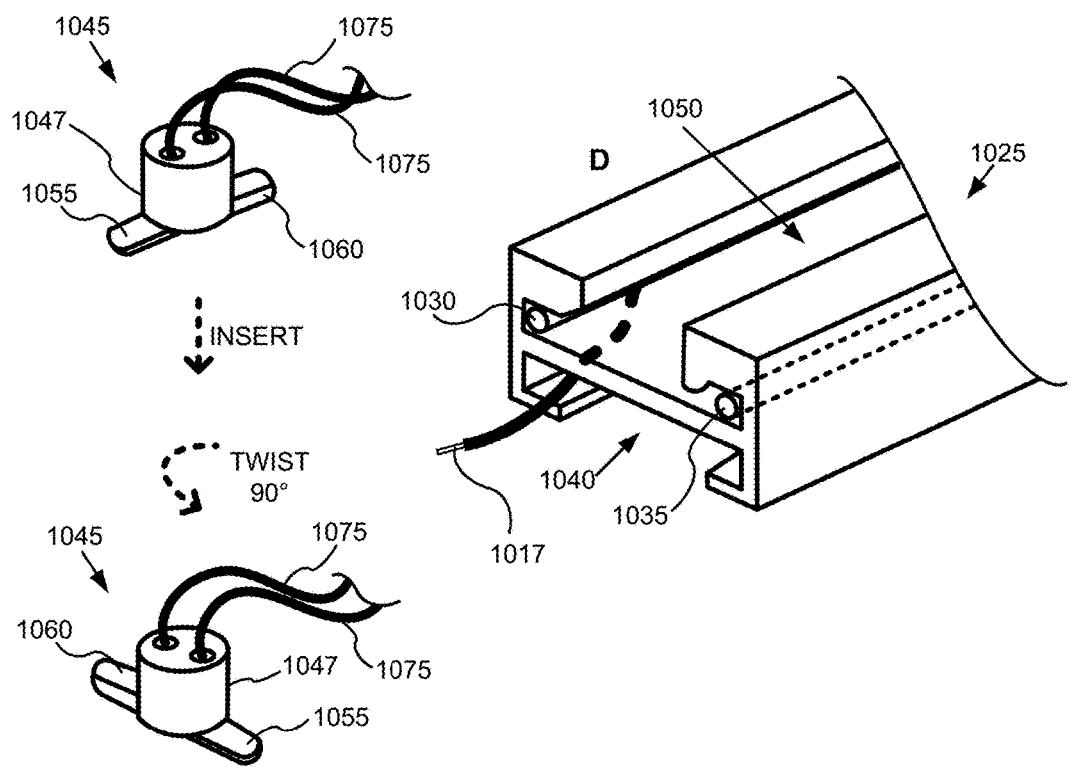

FIGS. 10A and 10B depict aspects of an IGU, 1000, including a track, 1025, and an associated connector, 1045. In this example, track 1025 is also a spacer that may serve as both a secondary sealing element and an electrical connector for an electrochromic pane of the IGU, although the sealing function is not necessary. In this description, "track" is used as a short hand to describe a unitary structure, e.g. where a track is formed as part of a frame made of single material having a unitary body, or a "track" is a component of an equivalent structure having a "frame" where the track is a sub-structural component thereof, e.g. made of the same or a different material. In other words a "track" is either a structural feature of a unitary body or frame, or a "track" is a component of a frame. In the context of this description, a frame may or may not serve the function of a spacer or separator for an IGU. For example, track 1025 may reside in the secondary seal region of the IGU and also serve a sealing function as between itself and the glass panels of the IGU, or track 1025 may simply be embedded in the secondary seal without also functioning as a sealing element itself.

FIG. 10A is a schematic diagram of IGU 1000 including an electrochromic pane, 1010. Electrochromic pane 1010 includes bus bars, 1015. Electrochromic pane 1010 is matched with another pane (not shown) and together the panes sandwich a separator, 1020, with a primary seal being formed between separator 1020 and the inside surfaces of the panes along with an adhesive. In this example, track 1025 is used to form a secondary seal, similar to the primary seal formed between the glass panes and separator 1020, with an adhesive between the inner surfaces of the glass panes and track 1025. Thus, in this example, the primary and secondary seals are formed in the same fashion. Track 1025 adds additional rigidity and strength to the IGU structure as well as a sealing function. In certain embodiments, the track is embedded in a traditional secondary sealant without also serving as a sealing element itself; in these embodiments, the track need not traverse the entire perimeter of the IGU.

Track 1025 also includes rails, in this example in the form of wires, 1030 and 1035, which provide electrical communication to bus bars 1015 via wires, 1017. That is, wires 1017 connect bus bars 1015 to wires 1030 and 1035 in track 1025. Track 1025 is described further in relation to FIG. 10B. FIG. 10A, in the bottom portion, shows only track 1025. Included is an expanded view of a corner portion of track 1025, showing detail of a channel in which reside wires 1030 and 1035. In this example, wires 1030 and 1035 run all the way around the channel of track 1025. In other embodiments, wires 1030 and 1035 run only in a portion (e.g., one side, two sides, or three sides) of track 1025. The rails of the track may be other than wires, so long as they are conductive material, although wires are convenient because they are common and easily configured in a track, e.g., track 1025 may be an extruded plastic material into which wires may be molded, or the wires may be inserted into the track after extrusion or molding.

FIG. 10B shows a cross-section D, as indicated in FIG. 10A, of track 1025 showing the details of wires 1030 and 1035 and finer detail of track 1025. Track 1025 may be a non-conducting material, such as an extruded polymer, for example, that holds wires 1030 and 1035 in place. In one example, track 1025 is made of an extruded plastic channeled material. The channeled material is cut and formed, e.g., ultrasonically welded, to form a unitary body as depicted. As shown in FIG. 10B, wires 1030 and 1035 are located within recesses in track 1025 and, in this example, each wire is insulated on three sides (due to the non-conductive nature of the polymeric material which surrounds the wires on three sides). As mentioned, the wires may be inserted into the recesses after the track is fabricated. Track 1025 includes two slots or channels, 1040 and 1050. Slot 1050 allows for electrical connection of an electrical connector, e.g., from a window controller to IGU 1000. Wires 1017 from bus bars 1015 of the electrochromic pane 1010 may be housed in slot 1040. Wires 1017 may pass though the material of track 1025, e.g., passing from slot 1040 through an aperture and into slot 1050, so that the each of the wires 1017 may contact its respective wire 1030 or 1035 (one wire 1017 depicted, aperture through track not shown). In this context, "wires" 1017 may be other means of electrical communication through the track's body, such as metal bars, tabs, shunts, and the like. The aperture through which wires 1017 pass may be sealed prior to fabrication of the IGU, or during fabrication of the IGU, e.g., using adhesive sealant residing in slot 1040. In one example, a sealant is applied to the gap between the wire and the aperture. When made of polymeric material, wires that lead from the bus bar to the rails of the track may be formed in the molded polymer, so that they are sealed by virtue of being integrated into the polymeric material, e.g. cast into or included in an extrusion process.

Slot 1040 also may allow for additional wires and/or interconnections to be made to the IGU as well as housing electrochromic controller components. In one embodiment, slot 1040 houses electrochromic controller components. In one embodiment, the electrochromic controller components are entirely housed in the track body, whether in slot 1040 or not. In other embodiments, where no track is used, the electrochromic controller is housed in the spacer, at least in part, in some embodiments the electrochromic controller is wholly within the spacer (separator). Controller embodiments with relation to spacers are described in more detail below.

In one example, track 1025 is assembled with wires 1017 being attached to rails 1030 and 1035 prior to being attached to bus bars 1015. That is, one embodiment is a track including rails and wires connected to the rails, the wires passing through the track such that the track, once sandwiched between two panes of glass, optionally with an adhesive sealant, forms a hermetic seal. In one such embodiment, assembly of the IGU includes 1) attaching wires 1017 to the bus bars, and 2) then simultaneously forming the primary and the secondary seal using separator 1020 and track 1025.

Electrical connections may be made to electrochromic pane 1010 with connector 1045. Connector 1045 may include a non-conducting body 1047 with two conducting tabs, 1055 and 1060. In this example, each of the two conducting tabs 1055 and 1060 is connected to a single incoming wire, 1075. Each of the single wires may be coupled to a connector, as described herein, and ultimately connected to a window controller. In this example, to establish electrical connection, connector 1045 is inserted into slot 1050 and then twisted about 90 degrees so that each of the conducting tabs, 1055 and 1060, makes contact with a wire, 1035 and 1030, respectively. In some embodiments, to ensure that a correct wire is in contact with the correct tab, tabs 1055 and 1060 and the recesses housing wires 1030 and 1035 are asymmetrical. As shown in FIG. 10B, tab 1060 is thicker than tab 1055. Further, the recess housing wire 1030 is smaller than the recess housing wire 1035. Connector 1045 enters slot 1050 and then, by virtue of the configuration of the recesses and tabs, the connector can be turned only so that tab 1060 contacts wire 1030 and tab 1055 contacts wire 1035. Varying tab thickness and recess size is one way to help to insure that the connector 1045 is in contact with the correct wires, but other mechanisms to achieve this are also possible.

In another embodiment, track 1025 is metal and the wires and/or rails of the system are insulated. Tabs 1055 and 1060 of connector 1045 are configured to penetrate the insulation on the rails or wires in order to establish electrical connection. Track 1025 may be a hybrid of materials, for example, a metal frame with a polymeric insert for the portion that houses the rails or wires 1030 and 1035. One of ordinary skill in the art would appreciate that the rails must be insulated from the body of the track otherwise a short circuit would occur. There are various configurations in which to achieve this result. In another embodiment, the body of the frame portion is an electrically insulating foam material and the portion which houses the rails is a rigid polymeric material. Spacers and/or frames described herein may also be fabricated from fiber glass.

One embodiment is an electrical connection system for an IGU including an optical device requiring electrical powering, the electrical connection system including: a frame, the frame having a unitary body and including; a track including two or more rails, each of the two or more rails in electrical communication with; a wire configured to pass through the frame for connection to an electrical power distribution component of the optical device; and a connector configured to establish electrical connection to the two or more rails and supply electrical power to each of the two or more rails. In one embodiment, the frame includes an electrically insulating conductive polymeric material. In one embodiment, the track includes an electrically insulating conductive polymeric material and each of said two or more rails comprise copper. The electrical connection system can be configured for use as the only spacer for the IGU (i.e. a structural component that forms the primary seal). In one embodiment, the connector is a twist-type connector that fits into a recess in the track, and upon twisting, engages with the two or more rails in order to establish electrical communication. The optical device may be an electrochromic device. In certain embodiments, the frame comprises at least some of the electrical components of a controller configured to control the optical device. The electrical connection system may be configured as a secondary sealing element in the IGU.

One of ordinary skill in the art would appreciate that other configurations of track 1025 are possible. For example, in one embodiment, track 1025 is a linear track that is inserted along one side of the IGU in the secondary sealing area. Depending upon the need, one, two, three or four such linear tracks, each along an independent side of the IGU, are installed in the IGU. In another embodiment, track 1025 is U-shaped, so that when installed in the secondary sealing area of the IGU, it allows electrical connection via at least three sides of the IGU.

As described above, in certain embodiments, track 1025 can itself serve as the IGU spacer (forming the primary seal), rather than as a complimentary structure to a spacer as described above (serving as a secondary sealing element or not). When used as the only spacer, the frame of the track can be wider than a typical spacer for an IGU might be. That is, a conventional IGU spacer is approximately 6 millimeters in width (along the primary sealing surface). The spacers described herein, may be of conventional width or up to about two times to about two and one half times (about 2× to about 2.5×) that width. For example, spacers described herein may be about 10 millimeters to about 25 millimeters wide, about 10 millimeters to about 15 millimeters wide, and in one embodiment about 10 millimeters to about 12 millimeters wide. This additional width may provide a greater margin of error in a sealing operation compared to a conventional spacer. This provides a more robust seal between the spacer and the glass lites of the IGU. In certain embodiments, when wires for the bus bars run through the spacer itself, rather than through the primary seal, this makes for an even more robust primary sealing area.

One embodiment is an electrical connection system for an IGU including an optical device requiring electrical powering. The electrical connection system includes a frame having a unitary body and including a track including two or more rails. Each of the two or more rails is in electrical communication with a wire configured to pass through the frame for connection to an electrical power distribution component of the optical device and with a connector configured to establish electrical connection to the two or more rails and supply electrical power to each of the two or more rails. The electrical power distribution component of the optical device may be a bus bar. In one embodiment, the frame includes an electrically insulating conductive polymeric material. In certain embodiments, the track includes an electrically insulating conductive polymeric material and each of said two or more rails include copper. In one embodiment, the connection system is configured for use as the only spacer for the IGU. In one embodiment, the connector is a twist-type connector that fits into a recess in the track, and upon twisting, engages with the two or more rails in order to establish electrical communication. The optical device may be an electrochromic device, a photovoltaic device, a suspended particle device, a liquid crystal device and the like. In one embodiment, the frame includes at least some of the electrical components of a controller configured to control the optical device. In one embodiment the frame includes an onboard controller, e.g. as described in U.S. Pat. No. 8,213,074. In certain embodiments, the electrical connection system is configured to be used as a secondary sealing element in the IGU. In one embodiment, the electrical connection system is configured to be used as a primary sealing element of the IGU.

Using track 1025 as a spacer for an IGU is one example of a "pre-wired" spacer embodiment. That is, wires can pass through the body of the spacer itself in order to make contact with bus bars, rather than running between the spacer and the glass, through the primary seal. Moreover the length of the wires can run through the interior of the spacer, rather than around it in the secondary sealing area. These and other embodiments are described in more detail below. Certain embodiments are described in terms of electrochromic devices; however, other optical devices are applicable.

Figure 11A:
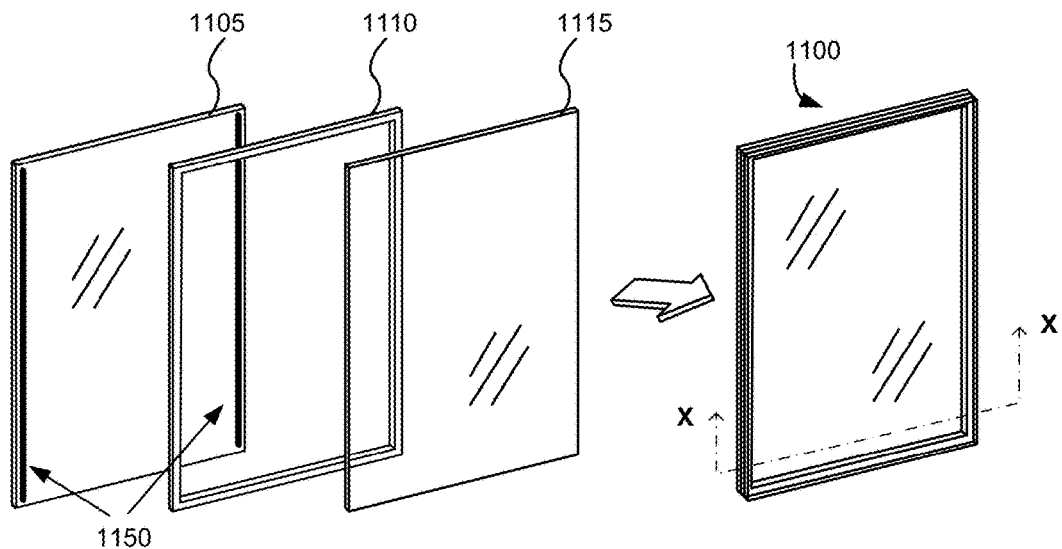
FIGS. 11A-E depict aspects of IGU wiring schemes.

FIGS. 11A-E depict aspects of IGU wiring schemes, where the IGU includes an optical device, such as an electrochromic device. Certain embodiments described herein refer to a single optical device; however, another embodiment is where the IGU includes two or more optical devices. Electrical connection systems described herein include configurations to power one or more optical devices in a single IGU. Referring to FIG. 11A, an IGU, 1100, is constructed by mating an electrochromic lite, 1105, with a spacer, 1110, and a second lite, 1115. In this example, bus bars (an electrical power distribution component of the electrochromic device on lite 1105) 1150 are configured outside spacer 1110 in the final construct. This is described in more detail in relation to FIG. 11B.

Figure 11B:
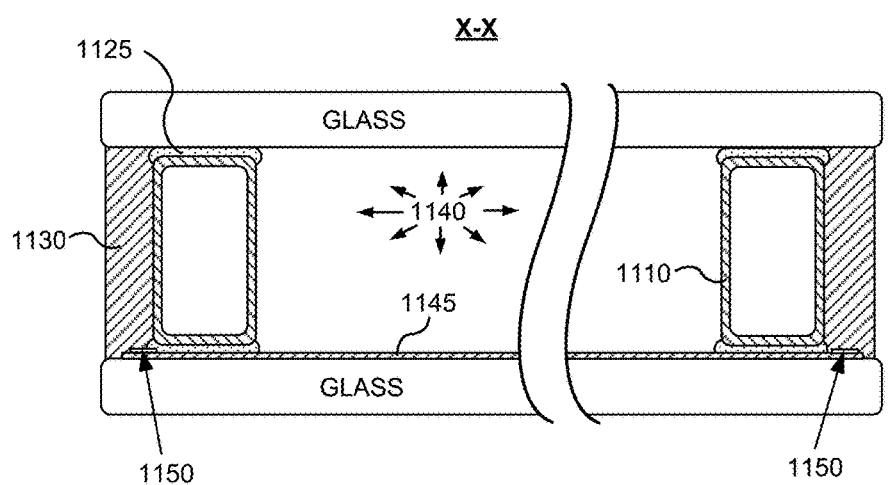

FIG. 11B shows cross section X-X of IGU 1100. In this depiction, electrochromic lite 1105 is the lower lite and lite 1115 is the upper lite. Spacer 1110 is mated on opposite sides to the lites with an adhesive sealant, 1125, which defines the primary seal of the IGU, i.e., the top and bottom (as depicted) surfaces of spacer 1110 define the primary sealing area of the spacer. Once mated, there is a volume, 1140, defined within the IGU; typically this is filled with an inert gas or evacuated. The spacer may have desiccant inside (not shown). Outside the perimeter of spacer 1110, but typically not extending beyond the edges of the glass lites, is a secondary sealant material, 1130, which defines the secondary seal of the IGU. The electrochromic device, 1145, on lite 1105 is a thin film coating, on the order of hundreds of nanometers up to a few microns thick. Bus bars 1150 supply electricity to coating 1145, each to a different transparent conductive layer so as to create a potential across layers of device 1145 and thereby drive the optical transitions. In this example, the bus bars are outside the spacer, in the secondary seal. If all the bus bars are outside the primary seal, then wiring to the bus bars does not involve nor is there a likelihood that, the wiring will interfere with the primary seal of the IGU. Embodiments described herein provide electrical powering systems to deliver electricity to the bus bars when they are either in the primary seal and/or inside the sealed volume 1140 of the IGU. One of ordinary skill in the art would appreciate that an IGU may have one bus bar in the secondary seal and, e.g., a second bus bar in the primary seal or in the sealed volume of the IGU. Embodiments include systems for delivering power to such configurations as well.

Figure 11C:
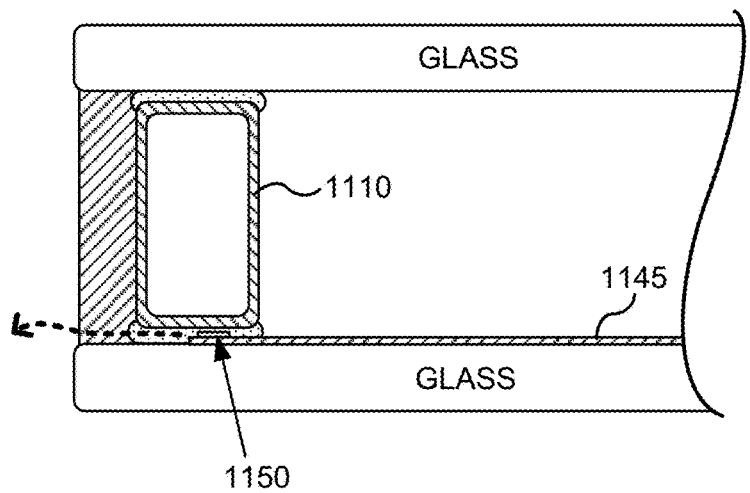
Figure 11D:
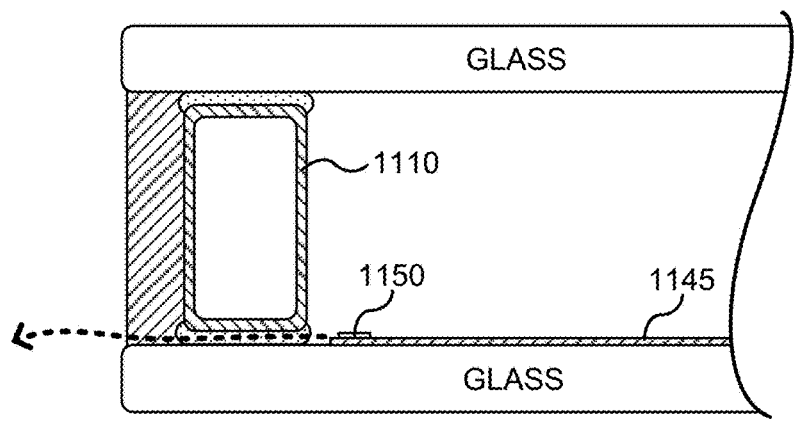
Figure 11E:
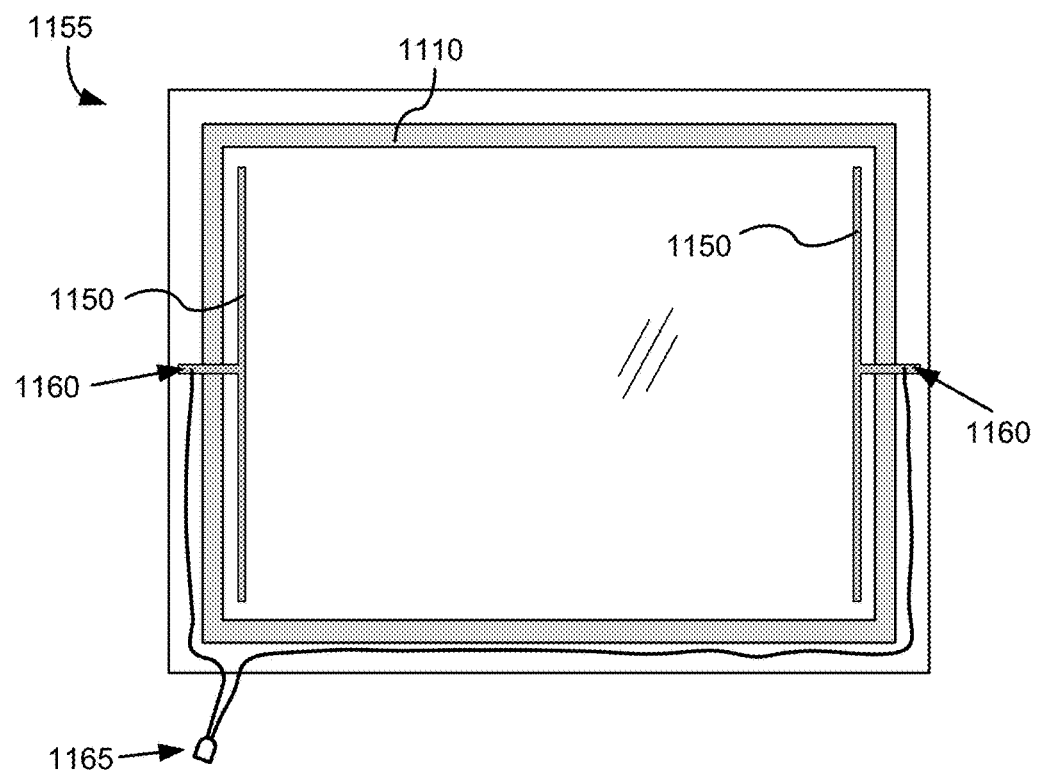

FIGS. 11C and 11D show that when the bus bar is within the primary seal, then, in conventional apparatus, wiring to the bus bar passes through the primary seal. This is depicted by the dotted arrow in the figures. If both lites have optical devices, then the risk of a compromised primary seal is doubled, because either the wiring for each lite passes through the primary seal proximate each lite, or the wiring for both lites must pass through the primary seal proximate a single lite. FIG. 11E shows that, e.g., the conductive ink (e.g. silver-based) used for bus bars can be used as a shunt, 1160, across the primary seal and wiring connected to the shunt. This may help maintain the integrity of the primary seal somewhat, but still there is an increased likelihood of primary seal failure due to this traversal of the primary seal by the ink. That is, the primary seal is optimized for adhesion between the spacer and the material of the lite, e.g., glass. When a different material, such as wire or conductive ink is introduced, there may not be as good a seal. When this different material traverses the primary seal, there is a much greater likelihood that the primary seal will fail at that region. FIG. 11E also shows that it is common for wiring to the bus bars to run outside the spacer and within the secondary seal region to a "pigtail" connector 1165 which is a length of wire with a connector at the end.

Embodiments described herein provide for electrical connection systems for IGUs. Particularly, described embodiments include "pre-wired" spacers, that supply electricity to the bus bars (or equivalent power transfer components) of optical devices, when the bus bars are within the primary seal or within the sealed volume of the IGU. This allows for maintaining the integrity of the primary seal, as well as simplifying fabrication of the IGU. One embodiment is a spacer for an IGU, the spacer configured to supply electricity to an optical device on a lite of the IGU, via one or more electrical power distribution components of the optical device, where at least one of said one or more electrical power distribution components is either within the primary seal or within the sealed interior volume of the IGU, and where the electricity supplied to said at least one of said one or more electrical power distribution components does not traverse the primary seal of the IGU.

Figure 12A:
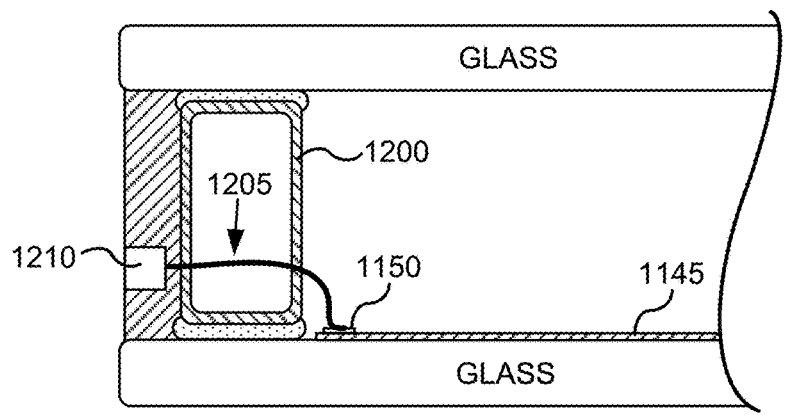

FIG. 12A is a cross-sectional drawing depicting a pre-wired spacer, 1200. Spacer 1200 has a wire, 1205, that passes through it. Wire 1205 delivers electricity from an external component, 1210, which is in the secondary seal (as depicted), outside the secondary seal, or which has portions both inside and outside secondary seal. In this example, 1210 is an electrical socket, into which a plug is configured to enter and thereby supply electricity to wire 1205. Wire 1205 is in electrical communication with bus bar 1150 (e.g. soldered to the bus bar). In one embodiment, external component 1210 is track 1025 as described in relation to FIGS. 10A and 10B, e.g., it surrounds spacer 1200 about some, or all, of the perimeter of spacer 1200. In one embodiment, spacer 1200's structure is itself analogous to track 1025, that is, it has a track system for establishing electrical communication with the optical device via wire (or wires) 1205. In the latter embodiment, there may be no secondary seal and spacer 1200 may be wider than a traditional spacer, so that the primary seal is, e.g., double or more of the sealing area of a conventional primary seal.

FIG. 12B shows spacer 1200 from a top view and incorporated into an IGU 1215. In this example, spacer 1200 has wires that pass through the width of the spacer. One of these wires, attached to bus bar 1150a, is also attached to a connector, 1225, which makes electrical communication with a second wire that spans around the spacer, in the secondary seal region, and to, in this example, an onboard controller, 1220. In some embodiments, connector 1225 is not necessary because a single wire connects to bus bar 1150a, passes through spacer 1200 and connects to controller 1220. Controller 1220 is also in electrical communication with bus bar 1150b via the other wire that passes through the spacer. Pre-wired spacer 1200 has the advantage that during IGU fabrication, it can be laid down and quickly soldered to the bus bars and connector 1225, if present.

FIG. 12C shows a partial cross section of spacer 1200, showing that the spacer may be of a conventional construction, i.e., metal such as stainless steel or aluminum, with a wire passing through it. Seal 1230 ensures that there is no gas leakage from the IGU sealed volume through the aperture through which the wire passes. Seal 1230 may be a rubber grommet of sufficient tightness so as to seal as described or seal 1230 may be a polymeric or epoxy sealant added after the wire is run through the apertures in the spacer. FIG. 12D shows spacer 1235, made of a foam or solid polymeric material. A good hermetic seal is achieved since the wire is cast into the spacer or the foam is blown or formed with the wire in it.

Figure 13A:
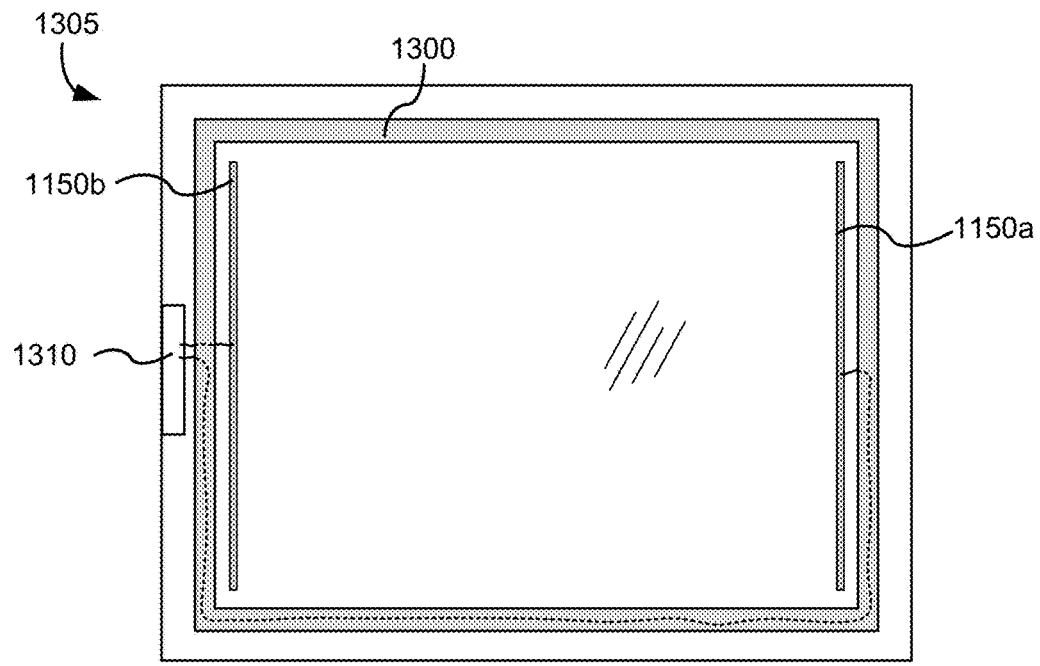
FIGS. 13A and 13B depict aspects of a pre-wired spacer.
Figure 13B:
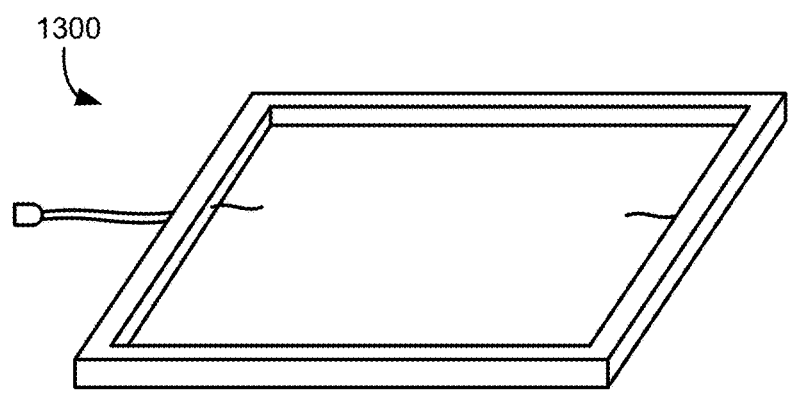

FIG. 13A depicts another IGU, 1305, having a pre-wired spacer 1300. In this example, the wires passing through spacer 1300 are almost entirely contained within the body of the spacer. That is, the wire in electrical communication with bus bar 1150a emanates from spacer 1300 only at its ends, to connect with bus bar 1150a and to connect with external component 1310, respectively. In this example, the other wire that passes through spacer 1300 is shorter and passes more or less directly through spacer 1300 in order to make electrical connection to bus bar 1150b. Also, in this example, component 1310 is a socket. Socket 1310 is configured to accept controller components, or an entire onboard controller. That is, in the latter embodiment, the controller is a "plug in" module. The IGU is constructed as depicted in FIG. 13A with socket 1310 in the secondary seal. The controller (not depicted) is a plug in module that may or may not fit entirely within the secondary seal (not beyond the edges of the IGU). In this manner, IGUs can be constructed independently of onboard controllers, and the onboard controllers can be easily upgraded and/or switched out of the IGU. This may avoid having to replace an IGU that had an onboard controller permanently affixed to the secondary sealing material. FIG. 13B depicts spacer 1300 where a pigtail connector (rather than socket 1310) is used as the common end of the wires that pass through the spacer.

In one embodiment, a pre-wired spacer as described herein may also include a controller for at least one optical device of an IGU. The controller may be exterior to the spacer, for ultimate configuration in the secondary seal or outside the IGU, or the controller may be inside the spacer itself. The spacer may be metal or a polymeric material, foam or solid.

One of ordinary skill in the art would appreciate that spacer 1300, being prewired, makes fabrication of the IGU much simpler. That is, one need only register the lites with the spacer, solder the wires to the bus bars and then seal the IGU. Depending upon which pre-wired spacer is used, one can then add the secondary sealing material, or not.

Figure 14A:
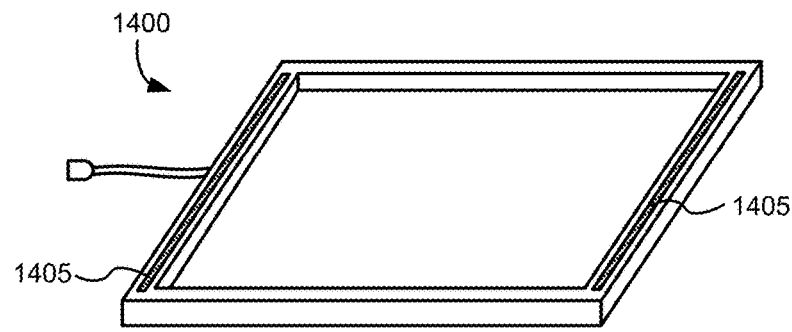
FIGS. 14A and 14B depict aspects of another pre-wired spacer.

FIG. 14A depicts a pre-wired spacer, 1400. Spacer 1400 has a pigtail connector as described herein, but rather than wires emanating from the interior faces of the spacer, e.g. as spacer 1300 had, spacer 1400 has contact pads, 1405, which are in electrical communication with the wires inside the body of pre-wired spacer 1400. In one embodiment, the pre-wired spacer may be made of an electrically insulating material, such as a polymer, either solid or foam. The contact pads are metal, such as copper, but may include gold, silver or other metal for better electrical contact. Contact pads 1405 may be co-planar with the sealing surface of pre-wired spacer 1400, extend beyond the sealing surface, or be below the sealing surface, depending upon the need. Typically, but not necessarily, the contact pads do not span the width of the sealing surface of the spacer, so that there is at least some of the spacer material, e.g. on either side of the contact pad, to make a good seal with the glass. The contact pads depicted here are singular and have a generally rectangular shape, but this is not necessary. For example, there may be multiple contact pads configured to make contact with a single bus bar, e.g., circular pads arranged linearly along one side of the spacer, and similar configurations of shapes along one side of the spacer.

Figure 14B:
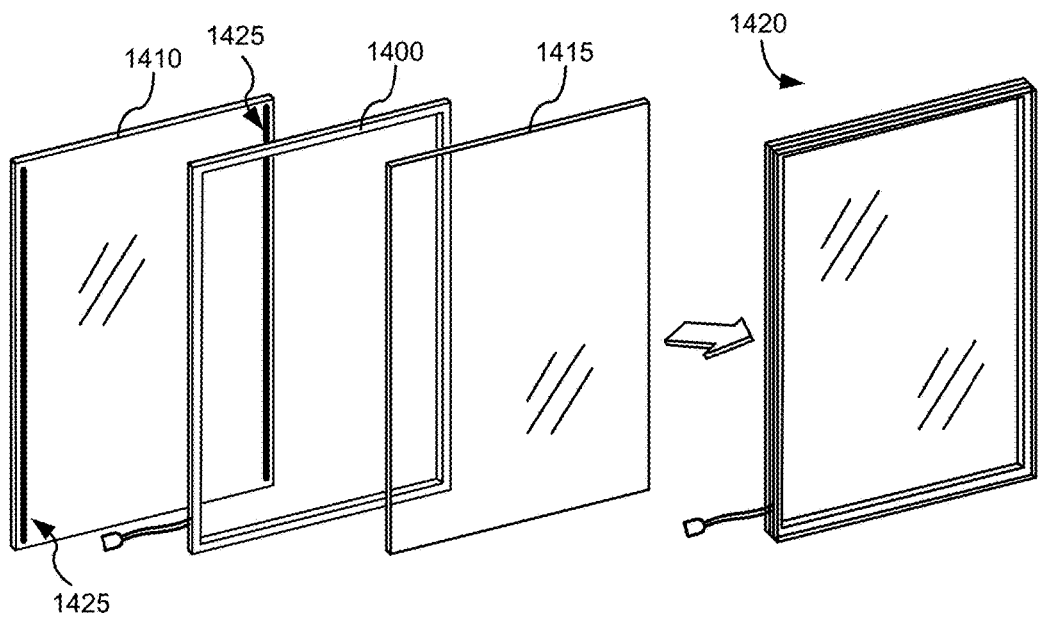

FIG. 14B depicts fabrication of an IGU with pre-wired spacer 1400. Contact pads 1405 (not depicted, they are on the back side of spacer 1400 as drawn) are registered with bus bars 1425 when the spacer is registered with lites 1410 and 1415. Lite 1410 has an optical device, such as an electrochromic device, on the surface that mates with the sealing surface of spacer 1400. Upon mating the lites with the spacer, electrical communication is established between the contact pads and the bus bars. If adhesive sealant is used to form the IGU, then it is applied in such a way so as not to come between (at least not entirely) the contact pad and the bus bars. In certain embodiments, the contact pads are configured so as to penetrate any sealant that comes between the contact pad and the bus bar. For example, the contact pads may have a rough surface and/or protrusions that make good electrical contact with the bus bars despite adhesive sealant coming between the two surfaces during mating. In other embodiments, the spacer is made of metal, and the contact pads are electrically insulated from the spacer body using an electrically insulating material.

In one embodiment, the pre-wired spacer is titanium and no adhesive is used to form the primary seal. That is, a hermetic seal is formed by fusing the titanium to the glass using high localized heat at the interface of the glass and titanium. In one embodiment, this bonding is achieved with a laser irradiation through the glass lite to which the spacer is to be bonded. In one embodiment, a boron compound is applied to the titanium spacer prior to laser irradiation. Titanium is used for certain hermetic sealing embodiments due to the similar coefficient of expansion of titanium and glass, e.g. float glass. Hermetic sealing with a titanium spacer may be used whether or not contact pads are used to make electrical connection to the bus bars.

Figure 15:
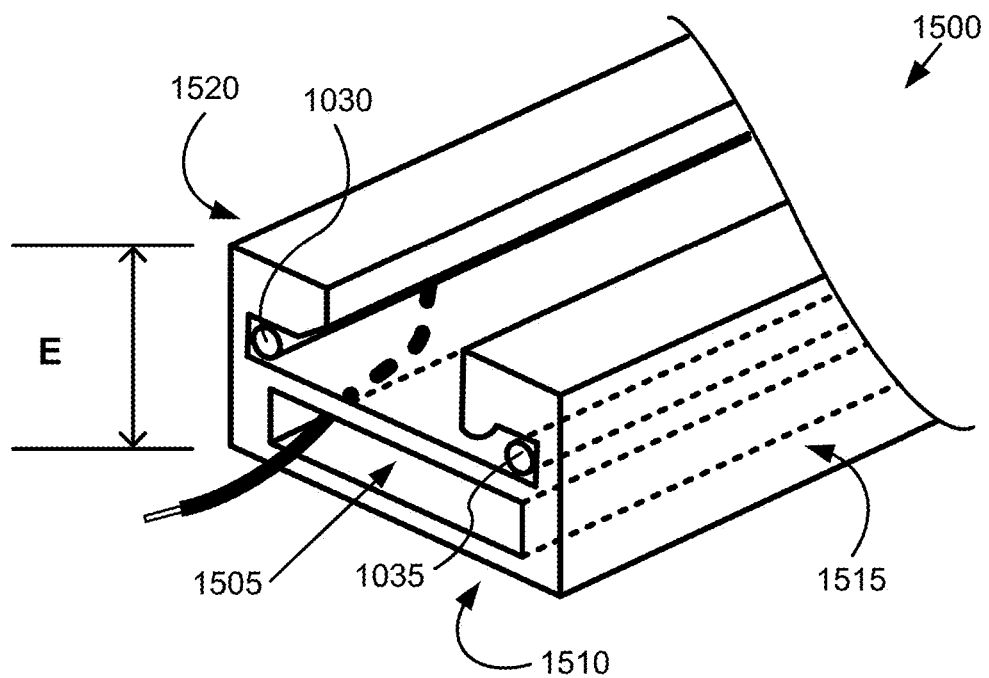
FIG. 15 is a cross-sectional perspective of a pre-wired spacer including electrical connection about the perimeter of the spacer and through-spacer wiring.

As described above, certain pre-wired spacers described herein have a track for establishing electrical communication between a connector, which mates with the track rails, and the optical device. FIG. 15 depicts a pre-wired spacer, 1500, which has a track (like track 1025, see FIGS. 10A and 10B). This figure shows that the width, E, of the spacer can be as a conventional spacer or thicker, such as described above (up to 25 mm wide) in order to form a superior primary seal on sealing surfaces 1515 and 1520. In one embodiment, width E is between about 10 mm and about 15 mm. Spacer 1500 has passage, 1505, similar to channel 1040 of track 1025, through which wires that connect to the rails (1030 and 1035) may pass. The wires may pass through to the interior surface, 1510, of the spacer for soldering to bus bars, or may pass through to the sealing surfaces, 1515 and/or 1520 to contact pads for electrical communication thereto. In one embodiment, the spacer is made of an electrically insulating material, and rails 1030 and 1035 are un-insulated so that a connector, like connector 1045 (see FIG. 10B) can be inserted and establish electrical communication without having to pierce any insulation around the rails.

Figure 16A:
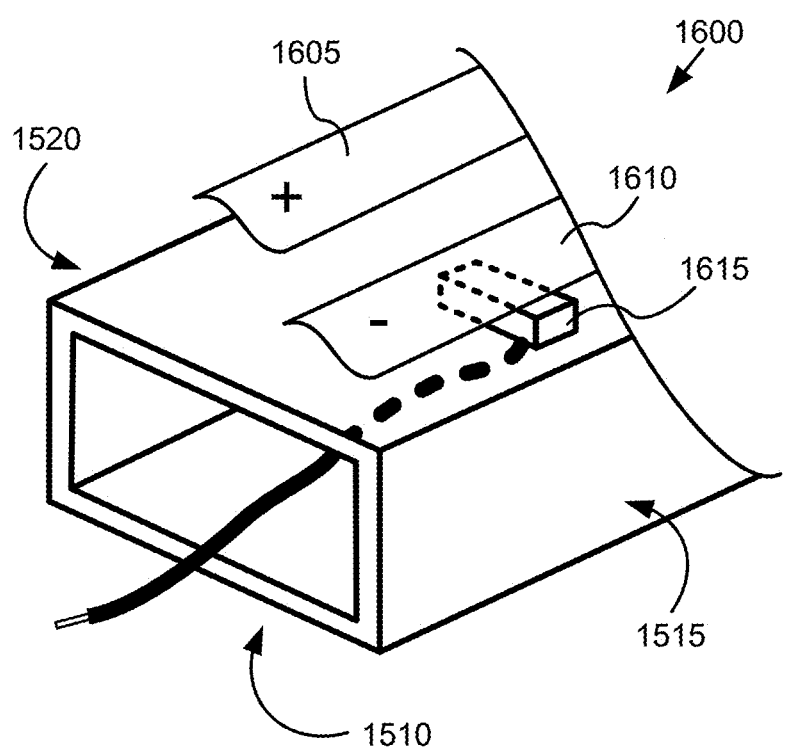
FIG. 16A is a cross-sectional perspective of another pre-wired spacer including electrical connection about the perimeter of the spacer and through-spacer wiring.

FIG. 16A is a cross-sectional perspective of another pre-wired spacer, 1600, including electrical connection about the perimeter of the spacer and through-spacer wiring. In this example, spacer 1600 is hollow as a conventional spacer, but has a wire passing through it as described above. In one embodiment, the spacer is a foam, polymeric material or fiberglass as described herein. The wire may pass through to the interior face, 1510 for soldering to a bus bar, or be connected to contact pads on the sealing surfaces, 1515 and/or 1520 (depending on if one or both lites bear optical devices). In this example, the (in this example, two) wires of the spacer are each connected to a flexible electrically conductive tape, 1605 or 1610. For example, each tape may represent the polarity of applied across an electrochromic device on one lite of the IGU. The tape may be a metal tape, such as copper or other good conductor. For example, tape 1610 is soldered or welded to a junction, 1615, that both supports the tape and makes good electrical connection to both tape 1610 and with the wire. During fabrication of the IGU, the tapes are embedded in the secondary sealant. For example, the tapes are installed, and then the secondary sealant is applied, e.g. using a tip to inject the sealant between and under the tapes, and then over the tapes to encapsulate (and suspend) the tapes in the secondary seal of the IGU. Electrical connection to the tapes is described in more detail in relation to FIGS. 16B-D.

Figure 16B:
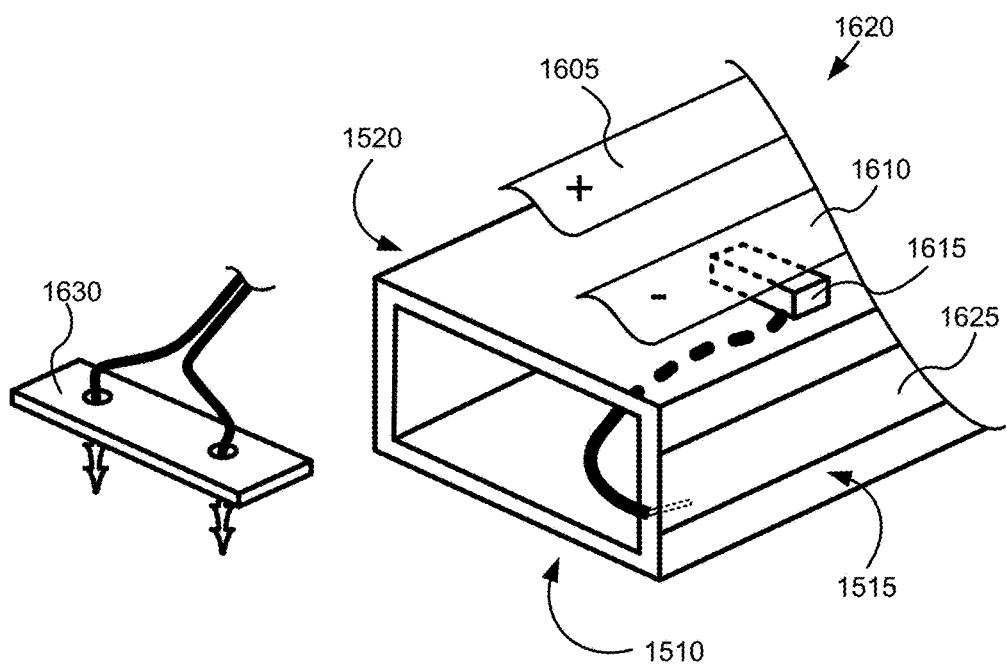
FIGS. 16B-C show aspects of a particular embodiment in accord with the pre-wired spacer described in relation to FIG. 16A.
Figure 16C:
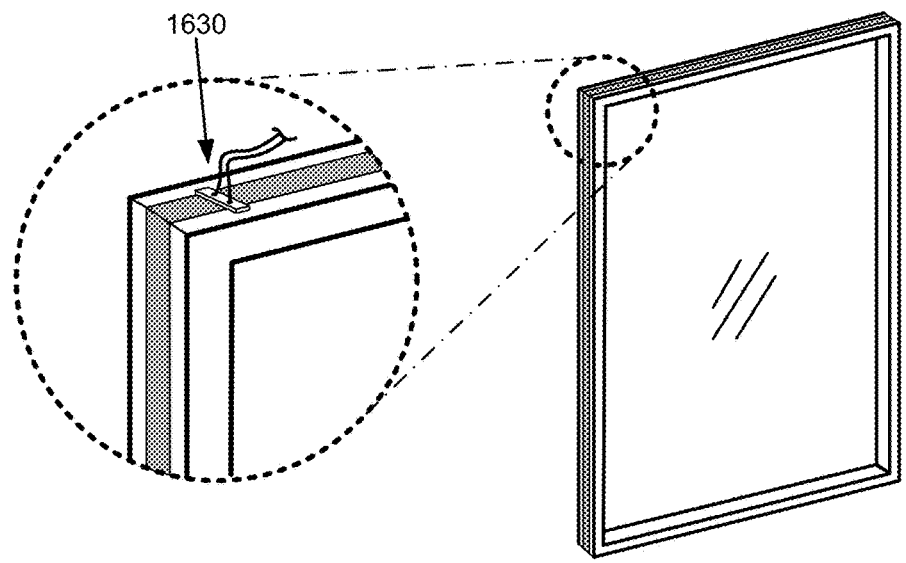

FIGS. 16B-C show aspects of a particular embodiment in accord with the pre-wired spacer described in relation to FIG. 16A. In this example, a spacer, 1620, has conductive tapes 1605 and 1610 (same as spacer 1600). In this example, there is electrical communication between tape 1610 and a contact pad, 1625, on sealing surface 1515 of spacer 1620. Referring to FIG. 16C, the tapes are embedded in the secondary seal as described above, in this example, about the entire perimeter of the IGU. In one embodiment, the tapes span at least about 90% of the perimeter of the IGU. Electrical connection between a power source for the optical device and the tapes is made through a connector, 1630. Connector 1630 is a pin connector, the pins of the connector are pushed through the secondary sealant and thereby establish electrical communication with tapes 1605 and 1610 by touching or piercing them. In this example, the pins each have a wire connected to them from the power source and are barbed pins so that they remain solidly in the secondary sealant and electrically connected to their respective tapes. Using this electrical connection system, the installer can simply pierce the secondary seal, practically anywhere about the perimeter of the IGU (depending upon if there is also a controller embedded in the secondary seal and/or so as to avoid junction 1615) with the pin connector and establish electrical communication. In this example the body of connector 1630 is relatively flat or low profile so as not to take up too much space and also to avoid jarring loose by shearing forces when handling the IGU once the connector is installed. Another advantage of this system is that if the installer decides that placement of the connector is unsatisfactory, e.g., she wants to establish electrical communication on the other side of the IGU, she can simply cut the wires, cover the connector with electrical tape or other insulating sealant, and apply another connector where desired. If there is a controller in the secondary seal or to mark where any junctions reside, there may be color coding or other distinguishing marks applied to the secondary seal to demark that location so as not to apply the connector in that location.

Figure 16D:
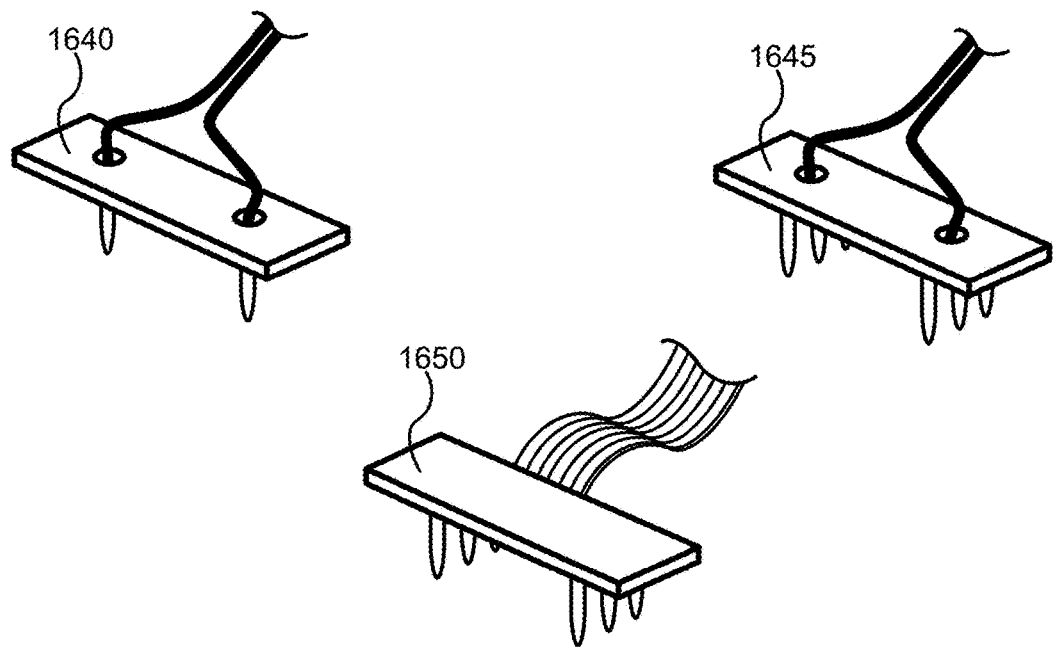
FIG. 16D shows alternative piercing-type pin connectors in accord with the embodiments described in relation to FIGS. 16A-C.

FIG. 16D shows alternative piercing-type pin connectors in accord with the embodiments described in relation to FIGS. 16A-C. Connector 1640 has pins without barbs. The advantage of this configuration is that the connector pins may be inserted into the secondary sealant and removed, without damaging the conductor tapes, and reinserted at another location. Connector 1645 has multiple pins for establishing electrical connection to each conductor tape. That is, there are more than one pin so that electrical communication with each tape is assured. When the pins pass through the secondary sealant, there may remain some of the sealant on the pins, which would interfere with electrical communication. The likelihood of completely blocking electrical communication is much lower, that is, the likelihood of establishing good electrical communication is much higher, when there are more pins to pierce a particular conductor tape. In any pin connector embodiment, the pins may be coated with gold, for example. Connector 1650 has multiple pins and uses ribbon cable rather than traditional wires. In certain embodiments, the tape conductor system is used not only for electrical communication, that is, to deliver electricity, but also for communication lines. There may be two, three, four, five or more tapes and corresponding pins for piercing the tapes and establishing electrical communication.

One embodiment is a method of fabricating an IGU, the method includes registering a pre-wired spacer to a first lite including an optical device, registering a second lite with the pre-wired spacer and the first lite and affixing the pre-wired spacer to the first and second lites. The second lite optionally includes a second optical device. In one embodiment, the pre-wired spacer includes wires emanating from the interior surface of the pre-wired spacer and the wires are soldered to bus bars of the optical device prior, and the second optical device if present, prior to registering with the first or the second lite. The pre-wired spacer may include one or more contact pads on its primary sealing surface or surfaces, the contact pads configured to establish electrical communication with the optical device, the second optical device if present, or bus bars thereon, upon affixing the pre-wired spacer to the first and second lites. In one embodiment, affixing the pre-wired spacer to the first and second lites includes using an adhesive sealant between the sealing surfaces of the pre-wired spacer and the first and second lites. In another embodiment, affixing the pre-wired spacer to the first and second lites includes forming a hermetic metal-to-glass seal, where the pre-wired spacer includes a metal, at least on the sealing surfaces. The metal may be titanium.

Figure 17A:
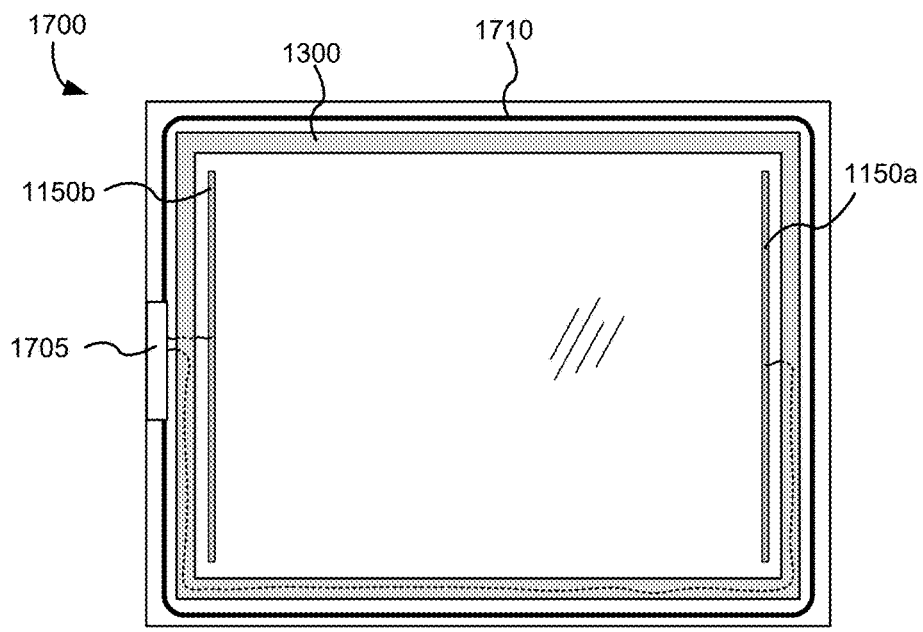
FIG. 17A depicts an electrical connection system where ribbon cable is used in the secondary seal in conjunction with piercing-type connectors as described herein.

In one embodiment, an onboard controller is embedded in the secondary seal and a ribbon cable is embedded in the secondary seal. FIG. 17A depicts an electrical connection system, 1700, where ribbon cable, 1710, is used in the secondary seal in conjunction with piercing-type connectors as described herein. A controller, 1705, is also embedded in the secondary seal. Piercing type connectors are used to establish electrical communication to the two or more, e.g. conductive tapes, of the ribbon cable, the connector having one or more pins for each tape (or wire) of the ribbon cable. This electrical connection system allows flexibility in placement of the connector to the IGU.

Figure 17B:
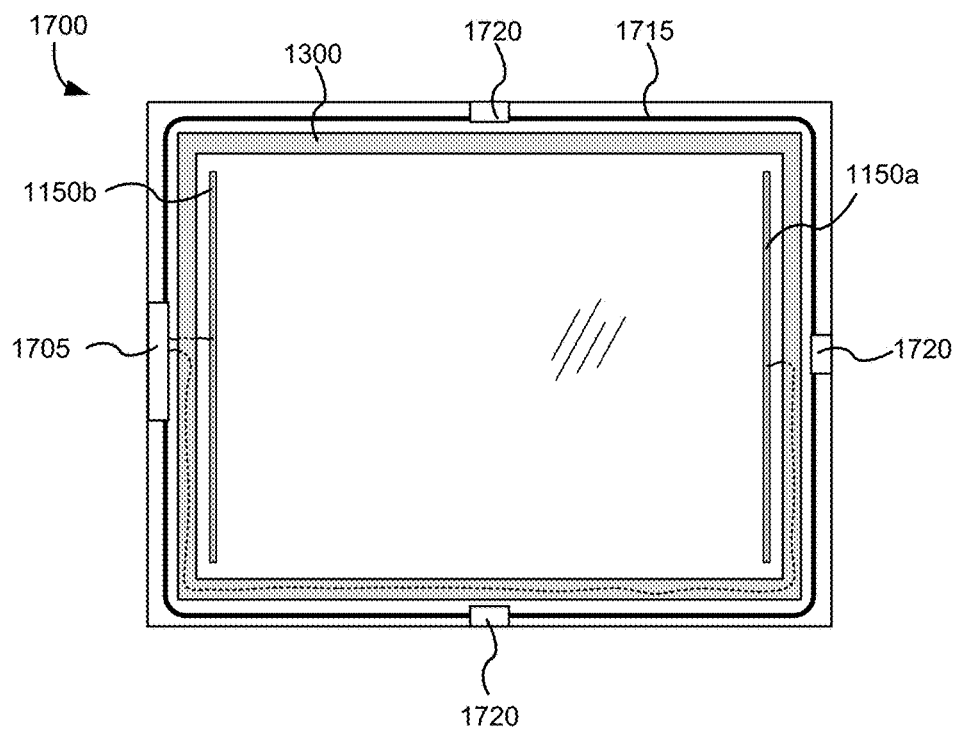
FIG. 17B depicts an electrical connection system where ribbon cable is used in the secondary seal, and pin and socket connectors are configured in the secondary seal as well.

FIG. 17B depicts an electrical connection system where ribbon cable, 1715, is used in the secondary seal, and pin sockets, 1720, are configured in the secondary seal about the perimeter of the IGU. In this embodiment, a pin connector (not shown) may be introduced into any one of pin sockets 1720, as they are redundant to the system. The pin sockets may be of the locking tab type, where once engaged with the pin connector, the tabs lock the union into place. The tabs may be manipulated to allow disengagement of the pin connector from the socket. There is little chance of secondary sealant interfering with electrical communication as the pins and corresponding sockets are free of secondary sealant. Controller 1705 may also have a pin socket 1720. In one embodiment, there is at least one pin socket on each side about the perimeter of the IGU. In certain embodiments, the controller is not embedded in the secondary seal; however, piercing and pin and socket type connections are still suitable. These embodiments are described in more detail below.

One embodiment is an electrical connection system of an IGU including an optical device requiring electrical powering, the electrical connection system including: a ribbon cable embedded in the secondary seal of the IGU and configured to supply electricity to the optical device; one or more pin sockets, also in the secondary seal, and in electrical communication with the ribbon cable, said one or more pin sockets configured in redundant form, each of the one or more pin sockets having the same electrical communication capability with the optical device; and a pin connector configured to mate with each of the one or more pin sockets and deliver electricity to the optical device. In one embodiment, the pin connector and each of the one or more pin sockets are configured to reversibly lock together when mated. In another embodiment, the electrical connection system further includes a controller configured to control the optical device, the controller may be also embedded in the secondary seal and include at least one of the one or more pin sockets. In one embodiment, the IGU includes at least four of said one or more pin sockets in the secondary seal, inclusive of the controller in the secondary seal, or if the controller is exterior to the secondary seal. In certain embodiments, when the controller is exterior to the secondary seal, the controller includes the pin connector. In one such embodiment, the pin connector is configured so that when mated to one of the one or more pin sockets, the controller is adjacent the secondary seal of the IGU. In another such embodiment, the pin connector is attached to the controller via a second ribbon cable. This allows for configuring the controller in the framing system where the controller may or may not be adjacent the edge of the IGU. In any of the above embodiments, the controller's width may be configured so it is not greater than the width of the IGU.

Figure 18A:
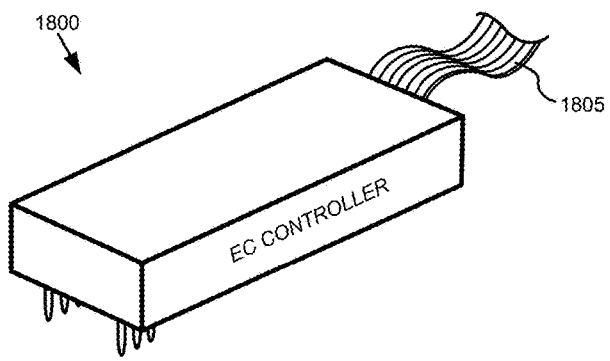
FIG. 18A depicts an electrochromic window controller having piercing-type pin connectors as described herein.
Figure 18B:
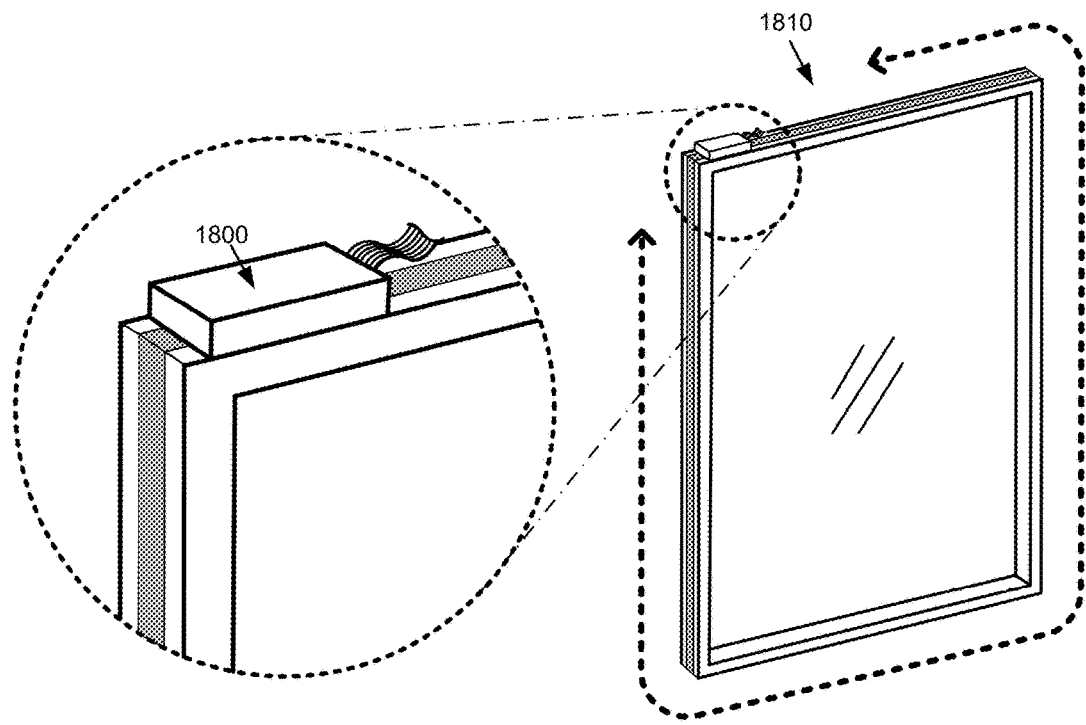
FIG. 18B depicts a close up perspective of a controller as described in relation to FIG. 18A.

FIG. 18A depicts an electrochromic window controller, 1800, having piercing-type pin connectors as described herein. In this example, the electrochromic controller is configured such that it is not thicker than the IGU, but this is not necessary. The controller may be attached to the IGU, as depicted in FIG. 18B, at virtually any point about IGU 1810 (as indicated by the heavy dotted line). Controller 1800 interfaces with a control pad and/or a network controller via a ribbon cable, in this example. Ribbon cables are convenient for this purpose as they can carry power and communication lines while having a flat, low-profile which aides in configuring the cable in framing systems for windows. In one embodiment, controller 1800 does not use piercing type pins, but rather pin and socket type connection to the IGU; i.e., where there are pin sockets embedded in the secondary seal about the perimeter of the IGU (as in FIG. 17B, but where the controller is exterior of the secondary seal and plugs into one of the pin sockets via it's pin connector, either directly attached to the body of the controller or at the end of a ribbon cable). Using pin sockets with locking tabs, the controller can be securely attached to the IGU without further attachment means. In certain embodiments, the controller is not thicker than the IGU on that dimension; that is, when the controller is affixed to the IGU as depicted in FIG. 18B, the faces or surfaces of the controller that are substantially parallel to the exterior major surfaces of the lites of the IGU do not extend beyond the major surfaces. In this way the controller can be accommodated more easily within the framing for the IGU. The controller may be long and thin, e.g. spanning about 6 to about 15 inches in length, and thus may attach to the IGU secondary seal at more than one region of the controller. Attachment to the secondary seal can be both with pin connectors as described to establish electrical communication, as well as with anchors that are specifically configured to attach to the secondary seal material solely for attachment purposes; that is, to affix the controller to the IGU but not to establish electrical communication with the one or more ribbon cables. In one embodiment the controller uses piercing pin-type connectors (that pierce the secondary seal material to make electrical contact to ribbon type conductors) along with these anchors configured solely for anchoring the controller to the secondary seal material. The anchors can, for example, be configured so as to penetrate the secondary seal, e.g. in between the ribbon conductors, or, e.g., through the ribbon conductors, but be made of electrically insulating material so as not to establish electrical communication with the ribbon conductors. In one embodiment, the anchors are barbed pins that do not penetrate the secondary seal deep enough to reach the ribbon conductors, for example.

One embodiment is an electrical connection system for an IGU including an optical device requiring electrical powering, the electrical connection system including: one or more ribbon conductors configured to be embedded in the secondary seal of the IGU and supply electricity to the optical device; and a pin connector configured to establish electrical connection to said one or more ribbon conductors by penetrating the secondary seal material and piercing the one or more ribbon conductors thereby establishing electrical communication with the one or more ribbon conductors. In one embodiment, the pin connector includes barbed pins configured to secure pin connector to the one or more ribbon conductors. The one or more ribbon conductors may supply electricity to the optical device via wiring through the spacer of the IGU. In one embodiment, the spacer of the IGU comprises one or more contact pads on the primary sealing surface of the spacer, said one or more contact pads configured to establish electrical communication with one or more electrical power distribution components of the optical device. The one or more electrical power distribution components of the optical device may be bus bars. The pin connector may be a component of a controller configured to control the optical device. In one embodiment, the controller's width is not greater than the width of the IGU. In another embodiment, the one or more ribbon conductors are configured such that the controller can be affixed to the edge of the IGU about at least 90% of the perimeter of the IGU.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. An electrical connection system for a sliding door or window, the system comprising:
    a) a frame bracket configured to couple to the sliding door or window; and
    b) a base bracket configured to couple to a header of the sliding window or door, or to a base rail;
    wherein the frame bracket and the base bracket are configured to house opposing ends of an IGU connector cable.

2. The electrical connection system of claim 1, further comprising a chain guide configured to house a middle portion of the IGU connector cable between the frame bracket and the base bracket.

3. The electrical connection system of claim 1, wherein the IGU connector cable is a ribbon cable.

4. The electrical connection system of claim 3, wherein the ribbon cable comprises an over-molded jacket.

5. The electrical connection system of claim 1, wherein a middle portion of the IGU connector cable is housed within a flexible conduit between the frame bracket and the base bracket.

6. The electrical connection system of claim 1, further comprising the base rail.

7. The electrical connection system of claim 6, wherein the base rail comprises a U-channel.

8. The electrical connection system of claim 7, wherein the base rail comprises one or more apertures, wherein at least one aperture is configured to register with an aperture in the base bracket such that one end of the IGU connector cable passes through the aperture in the base bracket and the at least one aperture of the base rail.

9. The electrical connection system of claim 1, wherein the frame bracket comprises an aperture for receiving an IGU pigtail into a recess of the frame bracket to electrically connect to an end of the IGU connector cable housed within the recess.

10. The electrical connection system of claim 9, wherein the aperture is in an outer surface of the frame bracket coupled to a frame of the sliding door or window.

11. The electrical connection system of claim 10, wherein the frame bracket further comprises a separate mounting element for coupling to a frame of the sliding door or window.

12. The electrical connection system of claim 1, wherein the IGU connector cable is a 5 wire cable.

* * * * *